(12) United States Patent
Tracy et al.

(10) Patent No.: US 12,442,164 B2
(45) Date of Patent: Oct. 14, 2025

(54) FAUCET SPRAY HEAD ALIGNMENT SYSTEM

(71) Applicant: ASSA ABLOY Americas Residential Inc., New Haven, CT (US)

(72) Inventors: Adam William Tracy, Irvine, CA (US); Oscar Romero, Lake Forest, CA (US); Evan Benstead, Los Angeles, CA (US); Jan Van Leyen, Irvine, CA (US)

(73) Assignee: ASSA ABLOY Americas Residential Inc., New Haven, CT (US)

( * ) Notice: Subject to any disclaimer, the term of this patent is extended or adjusted under 35 U.S.C. 154(b) by 31 days.

(21) Appl. No.: 18/514,033

(22) Filed: Nov. 20, 2023

(65) Prior Publication Data

US 2024/0159027 A1    May 16, 2024

Related U.S. Application Data

(63) Continuation of application No. 17/365,752, filed on Jul. 1, 2021, now Pat. No. 11,859,374, which is a
(Continued)

(51) Int. Cl.
*E03C 1/04* (2006.01)
(52) U.S. Cl.
CPC ................. *E03C 1/0404* (2013.01)
(58) Field of Classification Search
CPC ........ E03C 1/04; E03C 1/0401; E03C 1/0404; E03C 2001/0414; E03C 2001/0415; F16K 19/006
(Continued)

(56) References Cited

U.S. PATENT DOCUMENTS 2,723,056 A    11/1955    Smith
2,793,057 A    5/1957    McGugin
(Continued)

FOREIGN PATENT DOCUMENTS

CN    85201625    2/1986
CN    2179373    10/1994
(Continued)

OTHER PUBLICATIONS

Campbell, "Principles of a Permanent-Magnet Axial-Field D.C. Machine," Proceedings of the Institution of Electrical Engineers, vol. 121, No. 12, Dec. 1974, pp. 1489-1494.
(Continued)

*Primary Examiner* — Paul J Gray
(74) *Attorney, Agent, or Firm* — Merchant & Gould P.C.

(57) ABSTRACT

A faucet includes a faucet body and a faucet spray head being movable from a retracted position adjacent the faucet body, and an extended position away from the faucet body. In the retracted position, the faucet spray head has at least one aligned position with the faucet body. The faucet includes an alignment coupling. The alignment coupling includes first and second alignment elements connected to the faucet body and the faucet spray head, respectively, to align the spray head with the faucet body. The faucet includes a retention coupling that is configured to retain the faucet body and the faucet spray head immediately adjacent one another. The retention coupling includes first and second retention elements connected to the faucet body and the faucet spray head, respectively. The retention coupling is separate from the alignment coupling, and at least one of the first or second retention elements is a magnet.

20 Claims, 50 Drawing Sheets

Related U.S. Application Data continuation of application No. 16/732,880, filed on Jan. 2, 2020, now Pat. No. 11,053,670, which is a continuation-in-part of application No. 16/549,742, filed on Aug. 23, 2019, now Pat. No. 11,346,088.

(60) Provisional application No. 62/849,570, filed on May 17, 2019, provisional application No. 62/722,092, filed on Aug. 23, 2018.

(58) Field of Classification Search
USPC .................................. 137/801; 4/678, 695
See application file for complete search history.

(56) References Cited

U.S. PATENT DOCUMENTS

| | | |
|---|---|---|
| 4,002,937 A | 1/1977 | Anson |
| 4,004,298 A | 1/1977 | Anson |
| 4,253,489 A | 3/1981 | Schleiter, Sr. |
| 4,447,238 A | 5/1984 | Eldridge, Jr. |
| 5,025,510 A | 6/1991 | Basile |
| 5,052,491 A | 10/1991 | Harms et al. |
| 5,200,071 A | 4/1993 | Spiegel |
| 5,244,002 A | 9/1993 | Frederick |
| 5,348,050 A | 9/1994 | Ashton |
| 5,405,487 A | 4/1995 | Galchefski et al. |
| 5,487,370 A | 1/1996 | Miyazaki |
| 5,570,015 A | 10/1996 | Takaishi et al. |
| 5,591,344 A | 1/1997 | Kenley et al. |
| 5,611,368 A | 3/1997 | Hwang et al. |
| 5,699,832 A | 12/1997 | Burchard et al. |
| 5,727,769 A | 3/1998 | Suzuki |
| 5,771,934 A | 6/1998 | Warshawsky |
| 5,817,067 A | 10/1998 | Tsukada |
| 5,823,229 A | 10/1998 | Bertrand et al. |
| 5,858,215 A | 1/1999 | Burchard et al. |
| 5,868,939 A | 2/1999 | Oder et al. |
| 5,911,240 A | 6/1999 | Kolar et al. |
| 5,997,119 A | 12/1999 | Kerr |
| 6,308,446 B1 | 10/2001 | Healy |
| 6,367,126 B1 | 4/2002 | Rivkin |
| 6,381,830 B1 | 5/2002 | Chikuba et al. |
| 6,467,854 B2 | 10/2002 | Frank et al. |
| 6,476,113 B1 | 11/2002 | Chikuba et al. |
| 6,511,214 B1 | 1/2003 | Parsons et al. |
| 6,594,832 B2 | 7/2003 | Yang |
| 6,684,544 B1 | 2/2004 | Buettell |
| 6,705,794 B2 | 3/2004 | Varner et al. |
| 6,757,921 B2 | 7/2004 | Esche |
| 6,793,167 B2 | 9/2004 | Karkos, Jr. et al. |
| 6,808,131 B2 | 10/2004 | Bosio |
| 6,850,140 B1 | 2/2005 | Gleckner |
| 6,877,172 B2 | 4/2005 | Malek et al. |
| 7,104,473 B2 | 9/2006 | Bosio |
| 7,201,337 B1 | 4/2007 | Feola |
| 7,216,820 B2 | 5/2007 | Nelson et al. |
| 7,268,454 B2 | 9/2007 | Wise |
| 7,608,936 B2 | 10/2009 | Shimuzu et al. |
| 7,631,372 B2 | 12/2009 | Marty et al. |
| 7,699,241 B2 | 4/2010 | Benstead |
| 7,753,079 B2 | 7/2010 | Nelson |
| 7,909,061 B2 | 3/2011 | Nelson |
| 8,387,661 B2 | 3/2013 | Nelson |
| 8,413,686 B2 | 4/2013 | Ko |
| 8,496,028 B2 | 7/2013 | Nelson et al. |
| 9,181,685 B2 | 11/2015 | Esche et al. |
| 9,284,723 B2 | 3/2016 | Esche et al. |
| 9,315,975 B2 | 4/2016 | Davidson et al. |
| 9,334,635 B2 | 5/2016 | Keiter et al. |
| 9,404,242 B2 | 8/2016 | Nelson et al. |
| 9,440,246 B2 | 9/2016 | Meehan et al. |
| 9,657,466 B2 | 5/2017 | Esche et al. |
| 9,683,353 B2 | 6/2017 | Myers et al. |
| 10,000,913 B2 | 6/2018 | Esche et al. |
| 10,072,401 B2 | 9/2018 | Nelson et al. |
| 10,132,064 B2 | 11/2018 | Myers et al. |
| 10,240,326 B2 | 3/2019 | Nelson |
| 10,526,773 B2 | 1/2020 | Mu et al. |
| 10,633,841 B2 | 4/2020 | Mu et al. |
| 11,053,670 B2 | 7/2021 | Tracy et al. |
| 11,859,374 B2 | 1/2024 | Tracy |
| 2002/0017239 A1 | 2/2002 | Di Gioia et al. |
| 2002/0160231 A1 | 10/2002 | Schneider |
| 2003/0040129 A1 | 2/2003 | Shah |
| 2004/0010848 A1 | 1/2004 | Esche |
| 2005/0045005 A1 | 3/2005 | Hamilton et al. |
| 2005/0150556 A1 | 7/2005 | Jonte |
| 2005/0189438 A1 | 9/2005 | Bosio |
| 2007/0040380 A1 | 2/2007 | Benstead |
| 2011/0100484 A1 | 5/2011 | Allen et al. |
| 2012/0042973 A1 | 2/2012 | Ko |
| 2012/0267455 A1 | 10/2012 | Hansen |
| 2013/0026041 A1 | 1/2013 | Huh |
| 2013/0320116 A1 | 12/2013 | Jonte et al. |
| 2013/0327853 A1 | 12/2013 | Keiter et al. |
| 2014/0026980 A1 | 1/2014 | Esche et al. |
| 2014/0166124 A1 | 6/2014 | Davidson |
| 2014/0251451 A1 | 9/2014 | Yang et al. |
| 2014/0291419 A1 | 10/2014 | Pitsch |
| 2015/0013812 A1 | 1/2015 | Bosio |
| 2016/0160482 A1 | 6/2016 | Esche et al. |
| 2016/0258143 A1 | 9/2016 | Bosio |
| 2017/0292252 A1 | 10/2017 | Mu et al. |
| 2017/0314241 A1 | 11/2017 | Myers et al. |
| 2019/0040611 A1* | 2/2019 | Zhu .................. E03C 1/0404 |
| 2019/0071849 A1 | 3/2019 | Myers et al. |
| 2019/0292756 A1 | 9/2019 | Zhu et al. |
| 2020/0063408 A1 | 2/2020 | Tracy et al. |

FOREIGN PATENT DOCUMENTS

| | | |
|---|---|---|
| CN | 1125596 | 7/1996 |
| CN | 1137370 | 12/1996 |
| CN | 2786101 | 6/2006 |
| CN | 1807270 | 7/2006 |
| CN | 1980712 | 6/2007 |
| CN | 101063498 | 10/2007 |
| CN | 101537687 | 9/2009 |
| CN | 201844111 | 5/2011 |
| CN | 202302197 | 5/2011 |
| CN | 102695902 | 9/2012 |
| CN | 202432067 | 9/2012 |
| CN | 202546003 | 11/2012 |
| CN | 202597891 | 12/2012 |
| CN | 202691138 | 1/2013 |
| CN | 202927215 | 5/2013 |
| CN | 103485392 | 1/2014 |
| CN | 105756143 | 7/2016 |
| CN | 205894180 | 1/2017 |
| CN | 108290702 A | 7/2018 |
| DE | 4230182 | 3/1993 |
| EP | 0194411 | 9/1986 |
| EP | 0 487 500 | 5/1992 |
| EP | 0 669 285 | 8/1995 |
| EP | 0 676 625 | 10/1995 |
| EP | 0 866 180 | 9/1998 |
| EP | 1 201 836 | 5/2002 |
| EP | 2 110 482 | 10/2009 |
| EP | 2 378 011 | 10/2011 |
| EP | 2 550 938 | 1/2013 |
| EP | 3 228 763 | 11/2017 |
| GB | 1430250 | 3/1976 |
| JP | H0510289 | 2/1993 |
| JP | H0593435 | 4/1993 |
| JP | H05148868 | 6/1993 |
| JP | H11152774 | 6/1999 |
| JP | 2000-237752 | 9/2000 |
| JP | 2001-205272 | 7/2001 |
| JP | 2001-311192 | 11/2001 |
| JP | 2003-268824 | 9/2003 |
| JP | 2004-177151 | 6/2004 |
| JP | 2004-285953 | 10/2004 |
| JP | 2005-40783 | 2/2005 |
| JP | 2006-207255 | 8/2006 |

(56) References Cited

FOREIGN PATENT DOCUMENTS

| | | |
|---|---|---|
| JP | 2007-270538 | 10/2007 |
| JP | 2008-173537 | 7/2008 |
| JP | 2008-175009 | 7/2008 |
| JP | 2009-28140 | 2/2009 |
| JP | 2010-77732 | 4/2010 |
| JP | 2010-95947 | 4/2010 |
| JP | 2010-133131 | 6/2010 |
| JP | 2011-117261 | 6/2011 |
| JP | 2011-185907 | 9/2011 |
| KR | 200395074 | 9/2005 |
| RU | 2168233 | 5/2001 |
| WO | 050796 | 8/2000 |
| WO | 0143973 | 6/2001 |
| WO | 2004/106245 | 12/2004 |
| WO | 2005110549 | 11/2005 |
| WO | 2008/107103 | 9/2008 |
| WO | 2009/006616 | 1/2009 |
| WO | 2010/150499 | 12/2010 |

OTHER PUBLICATIONS

Chinese Office Action and Search Report in Application 201980055538.3, mailed Jun. 20, 2022, 5 pages.

Lorimer et al., "Magnetization Pattern for Increased Coupling in Magnetic Clutches," IEEE Transactions on Magnetics, vol. 33, No. 5, Sep. 1997, pp. 4239-4241.

Moen, Specifications for Extensa® Single Control Kitchen Faucet w/Pullout Spray, Sep. 2011.

Newman Tools, Inc., "Magnetic Pickup Tools," Feb. 7, 2005.

PCT International Preliminary Report on Patentability in Application PCT/US2019/047958, mailed Mar. 4, 2021, 9 pages.

PCT International Preliminary Report on Patentability in Application PCT/US2021/012766, mailed Jul. 14, 2022, 9 pages.

PCT International Search Report and Written Opinion for Application No. PCT/US2019/047958 mailed Nov. 20, 2019.

PCT International Search Report and Written Opinion in International Application PCT/US2021/012766, mailed Mar. 18, 2021.

* cited by examiner

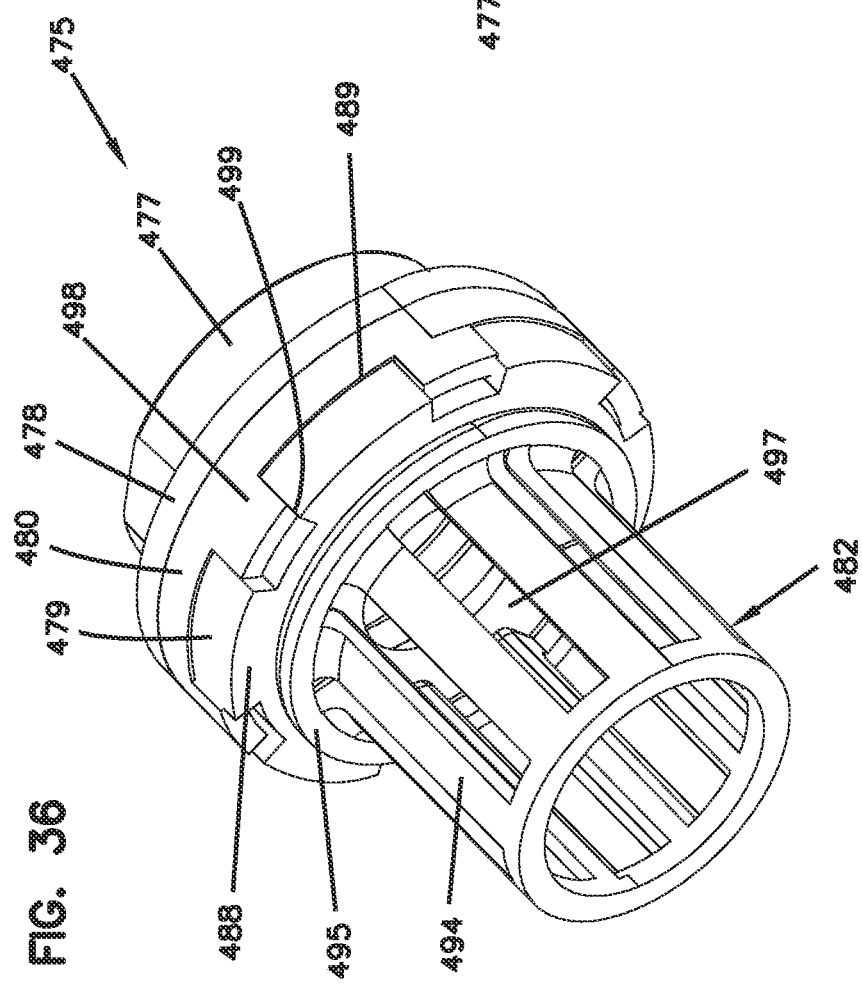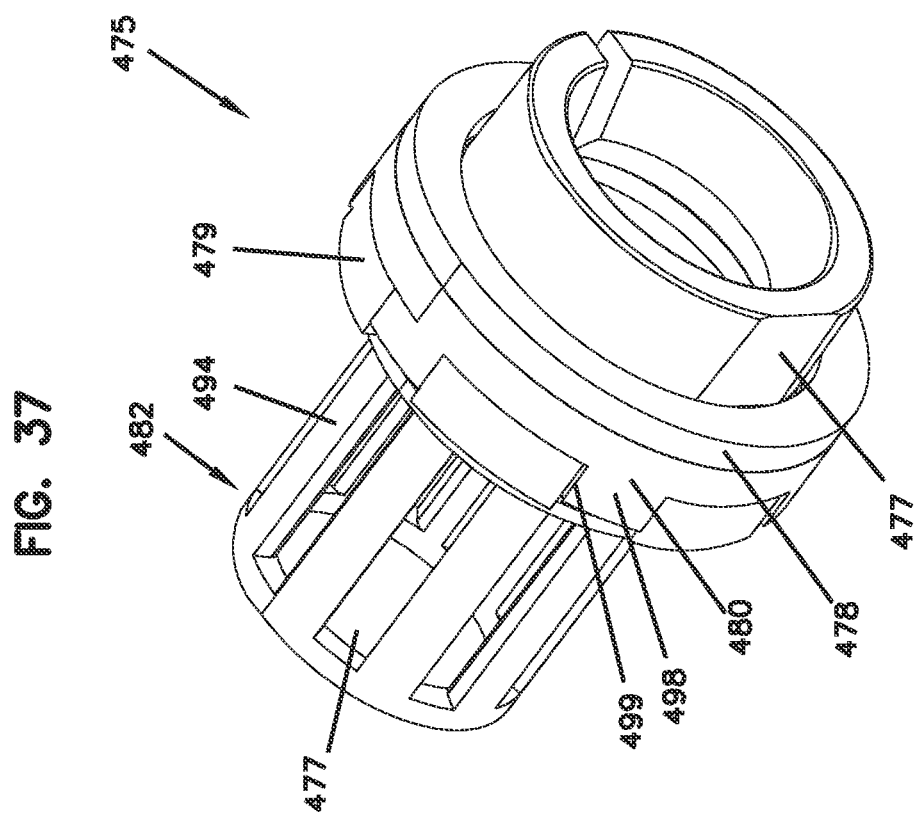

FAUCET SPRAY HEAD ALIGNMENT SYSTEM

CROSS-REFERENCE TO RELATED APPLICATIONS

This application is a continuation of U.S. patent application Ser. No. 17/365,752, filed Jul. 1, 2021, now U.S. Pat. No. 11,859,374, which is a continuation of U.S. patent application Ser. No. 16/732,880, now U.S. Pat. No. 11,053,670, filed Jan. 2, 2020; which is a continuation-in-part of U.S. patent application Ser. No. 16/549,742, now U.S. Pat. No. 11,346,088, filed Aug. 23, 2019; which claims the benefit of U.S. Provisional Patent Application Nos. 62/849,570, filed May 17, 2019; and 62/722,092, filed Aug. 23, 2018, which applications are hereby incorporated by reference in their entireties.

BACKGROUND

Fluid dispensing devices, specifically faucets, can be found in many different rooms of a building, including, but not limited to, bathrooms and kitchens. Many typical kitchen faucets utilize pull-down functionality that allow the spray head to be detached and undocked from the faucet body. This allows the user to manipulate the spray head. When the user is done using the spray head, the spray head often utilizes a pullback system (e.g., weights on the water hose) to allow for retraction of the spray head back toward a docked position with the faucet body.

Faucets are often designed to have an aesthetic look to go with a particular user style or the style of a particular room/dwelling. For example, faucets can have a variety of different finishes, shapes, etc. to allow the user to furnish a particular room to their liking. Some faucets are designed with an asymmetrical spray head to achieve a particular stylistic look of the faucet when the spray head is docked with the faucet body. However, this creates a problem when re-docking the faucet head with the faucet body. If a typical pullback system is utilized, the asymmetrical head can dock with the faucet body in a variety of ways, most of which are positions that are misaligned with the faucet body. This results in an undesirable look of the faucet and destroys the aesthetic look the faucet was designed to achieve in the first place. Further, regardless of whether the faucet is asymmetrical or symmetrical, a properly docked and retained spray head is desirable. Improvements are needed.

SUMMARY

The present disclosure relates generally to a fluid dispensing device. In one possible configuration, and by non-limiting example, a pull-down faucet has retention coupling to retain the faucet body and faucet spray head immediately adjacent one another in a docked state.

One aspect of the present disclosure relates to a faucet. The faucet includes a faucet body and a faucet spray head being movable from a retracted position adjacent the faucet body, and an extended position away from the faucet body. In the retracted position, the faucet spray head has at least one aligned position with the faucet body. The faucet includes an alignment coupling. The alignment coupling includes a first alignment element connected to the faucet body and a second alignment element connected to the faucet spray head. The alignment coupling includes a projection and a tapered groove. At least one of the projection or the tapered groove is movable with respect to the other, and the tapered groove guides the projection to a narrowed portion of the tapered groove to guide the faucet spray head to the at least one aligned position. The faucet includes a retention coupling that is configured to retain the faucet body and the faucet spray head immediately adjacent one another. The retention coupling includes a first retention element connected to the faucet body and a second retention element connected to the faucet spray head. The retention coupling is separate from the alignment coupling, and at least one of the first or second retention elements is a magnet.

Another aspect of the present disclosure relates to a faucet. The faucet includes a faucet body having an outlet and a hose positioned within the faucet body and passing through the outlet. The hose is movable within the faucet body. The faucet includes a faucet spray head being connected to the hose and movable between an extended position and a retracted position. When in the extended position, the spray head is spaced away from the outlet of the faucet body, and, when in the retracted position, the spray head is positioned immediately adjacent the outlet. The faucet includes an alignment coupling that includes a first alignment element connected to the faucet body and a second alignment element connected to the faucet spray head. The alignment coupling aligns the faucet spray head with the faucet body. The faucet includes a retention coupling that is configured to retain the faucet body and the faucet spray head immediately adjacent one another. The retention coupling includes a first retention element connected to the faucet body, adjacent the first alignment element and a second retention element positioned in the faucet spray head by, at least partially, the second alignment element. At least one of the first or second retention elements is a magnet.

Another aspect of the present disclosure relates to a faucet. The faucet includes a faucet body and a faucet spray head being positionable at, and separable from, an outlet of the faucet body. The faucet spray head has at least one aligned position with the faucet body. The faucet includes a retention coupling configured to retain the faucet body and the faucet spray head immediately adjacent one another. The retention coupling includes a first retention element connected to the outlet of the faucet body. The first retention element includes a securing feature configured to aid in reducing relative movement between the first retention element and the outlet. The retention coupling includes a second retention element positioned within the faucet spray head by way of a flange. When the faucet body and the faucet spray head are immediately adjacent one another, the flange is positioned between the first retention element and the second retention element. At least one of the first or second retention elements is a magnet.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

FIG. 36 illustrates a perspective view of a portion of a seal assembly, according to one example of the present disclosure.

FIG. 37 illustrates another perspective view of the portion of the seal assembly of FIG. 36.

DETAILED DESCRIPTION

Figure 1:
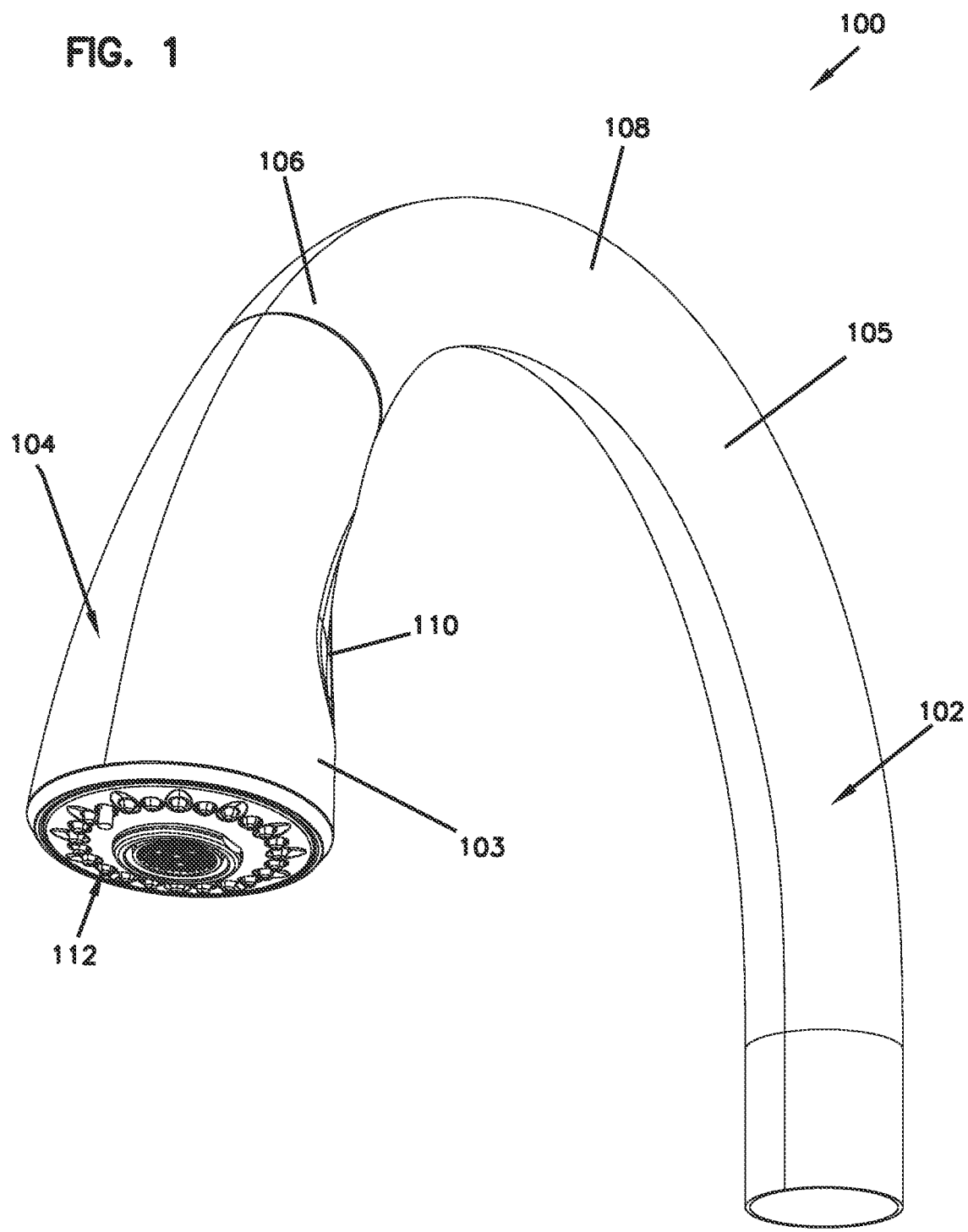
FIG. 1 illustrates a perspective view of a faucet with a spray head in an aligned position, according to one embodiment of the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The present disclosure relates to a faucet that includes an alignment coupling and a retention coupling. The alignment coupling ensures that a spray head of the faucet reliably returns to an aligned position and the retention coupling retains the faucet spray head immediately adjacent a faucet body.

The alignment coupling further facilitates reliable complete docking of the spray head within the faucet body. The alignment coupling includes alignment elements in the faucet body and adjacent the spray head that interface with one another to provide alignment movement. In some examples, at least one of the alignment elements is positioned at least partially around a water hose of the faucet. In another example, the alignment elements include alignment features that include a corresponding projection and a groove (e.g., a v-shaped groove) so that when the groove receives the projection, it guides the projection to a narrowed portion of groove, thereby aligning the spray head with the faucet body. By facilitating reliable alignment and retraction of the spray head, the alignment coupling preserves the aesthetic of the faucet when not in use and further optimizes positioning for particular uses.

The retention coupling further facilitates reliable retention of the spray head adjacent the faucet body. This can be accomplished by use of at least one magnet and a magnetically attracted material, such as steel. In some examples, the retention coupling includes two attracted components that are configured to not contact one another.

FIG. 1 shows a faucet 100 including a faucet body 102 and a faucet spray head 104 that is detachable from a faucet body outlet 106 of the faucet body 102. As shown in FIG. 1, the spray head 104 is docked with the faucet body 102. The spray head 104 is movable away from the faucet body 102 so as to allow the user the ability to manipulate the spray head 104 during use. This is facilitated by a water hose (shown schematically in FIG. 6) having excess length attached to the spray head 104 and positioned within the faucet body 102.

The faucet 100 is configured to dispense water from a water source out of a spray head outlet 112 of the spray head 104. Further, the faucet 100 is configured to be controlled (i.e., on/off, water volume, and water temperature) via traditional methods (e.g., a handle), and/or via gesture or voice. Although the faucet 100 can be a pull-down kitchen faucet, this disclosure encompasses other types of faucets, including but not limited to, pull-out faucets. Although this disclosure will be discussed with regard to a kitchen faucet for purposes of example, the system described herein could be implemented in any type of pull-down faucet and/or a pull-out faucet, including a side auxiliary spray faucet. In some examples, the faucet 100 is a showerhead in a shower. In some examples, the faucet 100 is any fluid dispensing device that is configured to dispense fluid therefrom.

The faucet body 102 can have a variety of different shapes and sizes to provide a variety of different appearances having differing aesthetics. As shown, the faucet body 102 includes an arcuate neck 108 between the outlet 106 and the opposing end of the faucet body 102. The faucet body 102 can be mounted in a variety of different locations, such as, but not limited to, a countertop, a wall, a ceiling, etc. In some examples, the faucet body 102 is fixed to a location, such as near a kitchen sink.

As noted above, the spray head 104 is detachable so that it can be undocked from the faucet body 102 to allow for maneuverability by the user to aim the spray head 104. The spray head 104 can include a user input 110 positioned thereon to allow the user to toggle characteristics of the water expelled at the spray head outlet 112. In some examples, the operation of the user input 110 can facilitate the toggling of a valve (see FIG. 22) positioned within the spray head 104. The user input 110 can toggle characteristics of the expelled water, such as, but not limited to, volume and/or temperature. In some examples, the user input 110 is one of a button, touch sensitive surface, or the like.

An outer profile 103 of the spray head 104 can have a variety of different shapes and sizes to provide a variety of different aesthetic configurations of the faucet 100. In some examples, the spray head 104 can be configured to have an outer profile 103 that cooperates with an outer profile 105 of the faucet body 102. In some examples, the spray head 104 is generally asymmetrical. In other examples, the spray head 104 is generally symmetrical.

In the depicted example of FIG. 1, the spray head 104 has an aligned position when docked with the faucet body 102. The aligned position is a position that the spray head 104 returns to automatically every time it is docked with the faucet body 102. The aligned position can be a variety of different positions depending on the aesthetics of the faucet 100, as well as the particular use of the faucet 100. In the depicted example, the spray head 104 has an asymmetrical outer profile and has an aligned position that aligns the outer profile of the faucet body 102, specifically the neck 108, with the outer profile of the spray head 104. This allows for a consistent outer profile of the faucet 100, including the faucet body 102 and the spray head 104. Further, as shown, when in the aligned position, the user input 110 is positioned facing the faucet body 102, so as to maintain a clean aesthetic from the front of the faucet 100. In some examples, when in the aligned position, the user input 110 is positioned facing the left, right, or away from the faucet body 102.

In some examples, the spray head 104 can include weights (not shown) to alter the center of the gravity of the spray head 104 in a way to urge the spray head 104 to the aligned position. In some examples, the weight can be positioned at a particular side of the spray head 104 so that the weight, by way of gravity, naturally rotates the spray head 104 in a way where the weight becomes positioned at an underside of the spray head 104 when in the aligned positioned. This can be accomplished by placing the weight adjacent the spray head outlet 112 and offset of the longitudinal axis of the spray head 104.

FIGS. 2-5 show the movement of the spray head 104 to the aligned positioned during docking. Such alignment is facilitated by an alignment coupling 114, which includes a first alignment element 116 and a second alignment element 118. At least one of the first alignment element 116 or the second alignment element 118 is movable with respect to the other. In the depicted example, the second alignment element 118 is movable with respect to the first alignment element 116.

The first and second alignment elements 116, 118 can be positioned at a variety of different locations on the faucet 100. In the illustrative example shown, the first alignment element 116 is positioned within the faucet body 102 and the second alignment element 118 is positioned adjacent the spray head 104. In some examples, the second alignment element 118 is attached to the spray head 104. In other examples, the second alignment element 118 is positioned around a water hose (not shown) of the faucet 100. In other examples, the second alignment element 118 is attached to a water hose of the faucet 100. In some examples, the first and second alignment elements 116, 118 are integrally formed in the faucet body 102 and spray head 104. In some examples, the first and second alignment elements 116, 118 are separate parts from the faucet body 102 and spray head 104.

Figure 2:
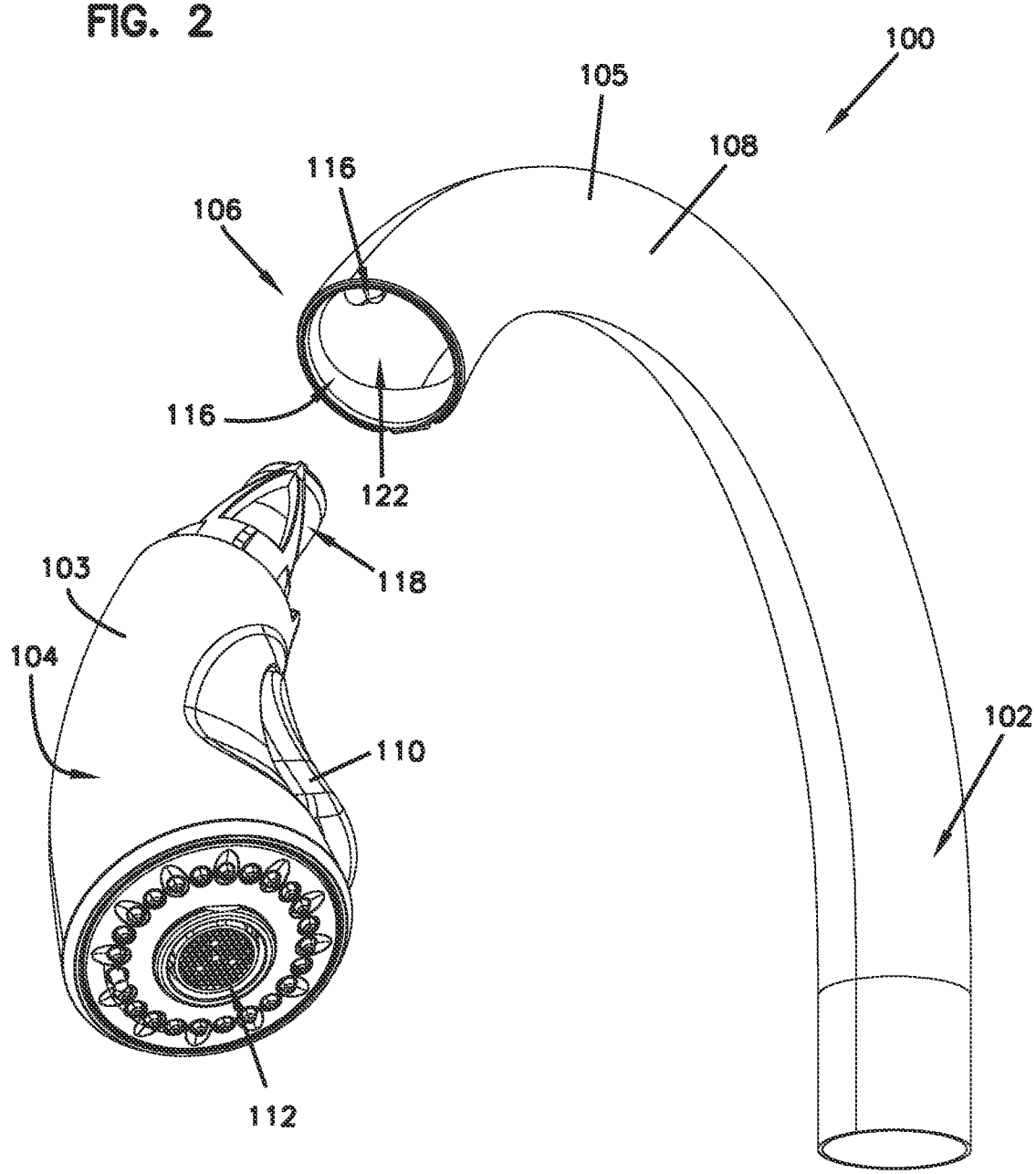
FIG. 2 illustrates a perspective view of the faucet of FIG. 1 with the spray head in an extended, misaligned position, excluding a water hose.

FIG. 2 shows the spray head 104 detached from the faucet body 102. While typically a water hose (not shown) would be connected to the spray head 104 and routed within the outlet 106 of the faucet body 102, the water hose has been omitted for illustration purposes. The outlet 106 allows access to a pathway 122 disposed at least partially within the faucet body 102 so that the water hose can be routed to a water source.

Figure 3:
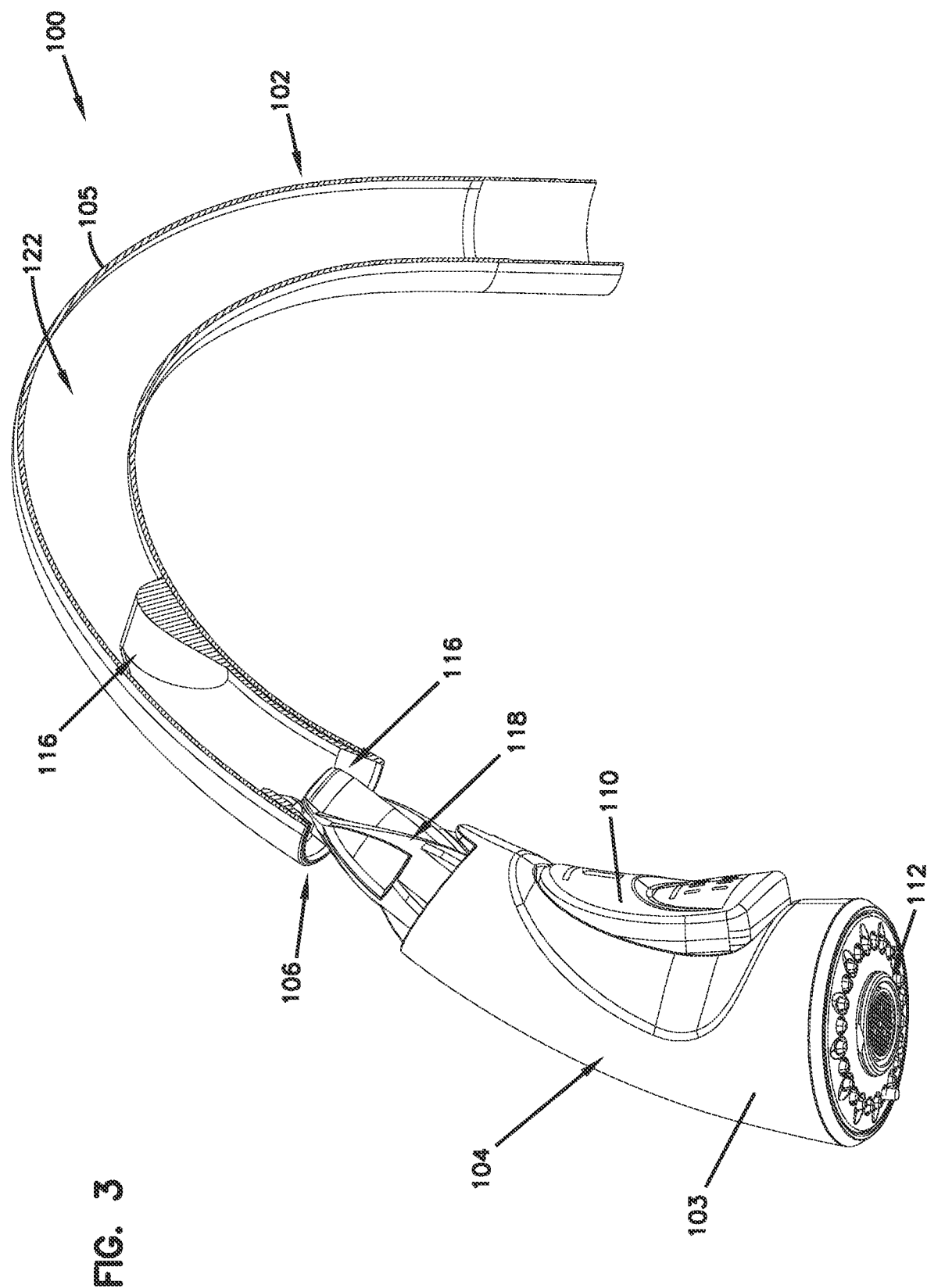
FIG. 3 illustrates a perspective schematic view of the faucet of FIG. 1 with the spray head in an extended, misaligned position.

FIG. 3 shows the spray head 104 partially docked with the outlet 106 of the faucet body 102. For illustration purposes, a cross-sectional isometric view of the faucet body 102 is shown. The spray head 104 is shown rotated along its longitudinal axis in a direction where the user input 110 is facing to a side of the faucet 100. In this particular example, such a position is considered a misaligned position of the spray head 104. The spray head 104 can include a plurality of misaligned positions. In some examples, every position that the spray head 104 has when in contact with the faucet body 102, where the spray head 104 is not in the aligned position, is considered a misaligned position.

Figure 4:
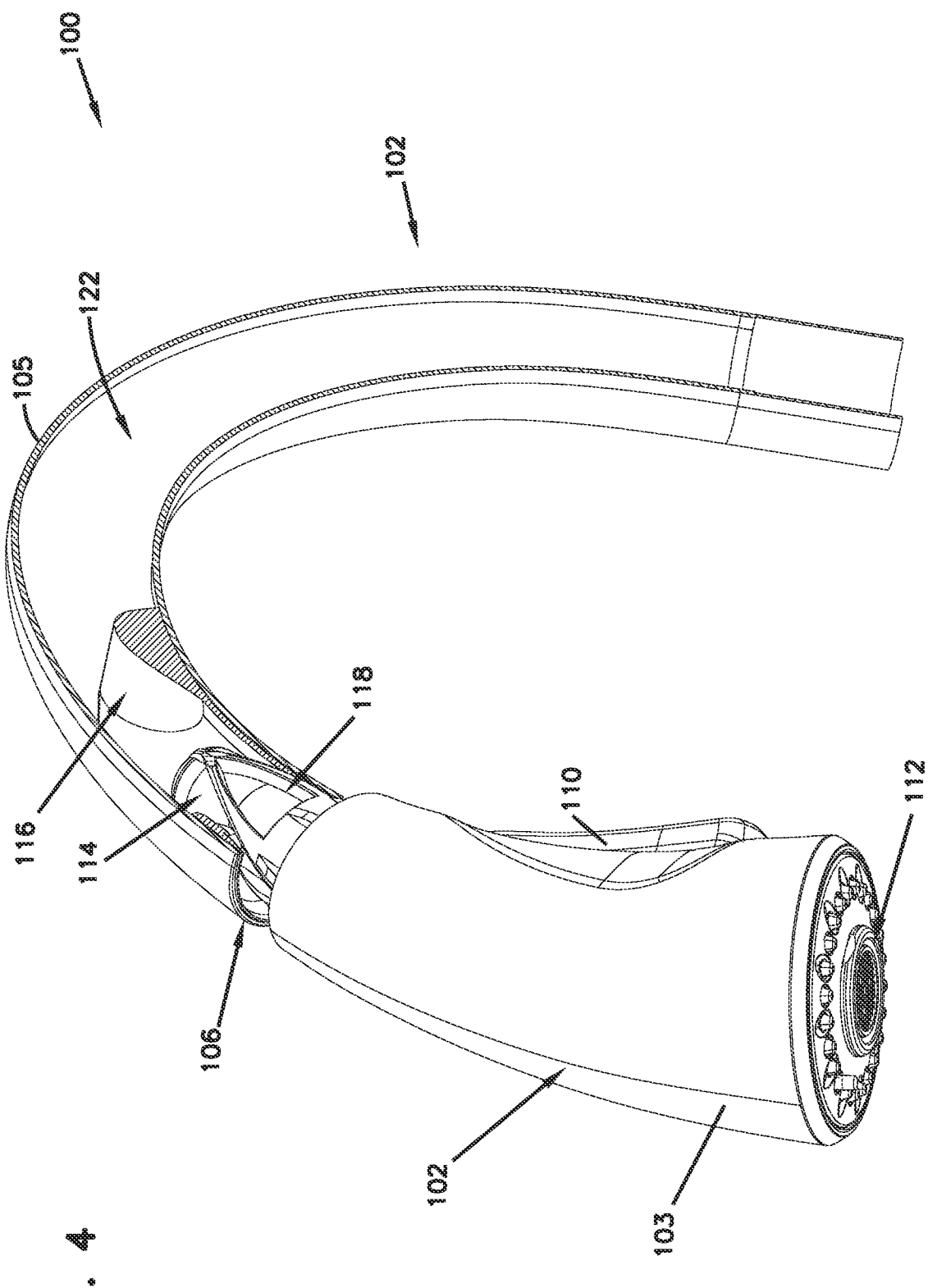
FIG. 4 illustrates a perspective schematic view of the faucet of FIG. 1 with the spray head in an extended, misaligned position.
Figure 5:
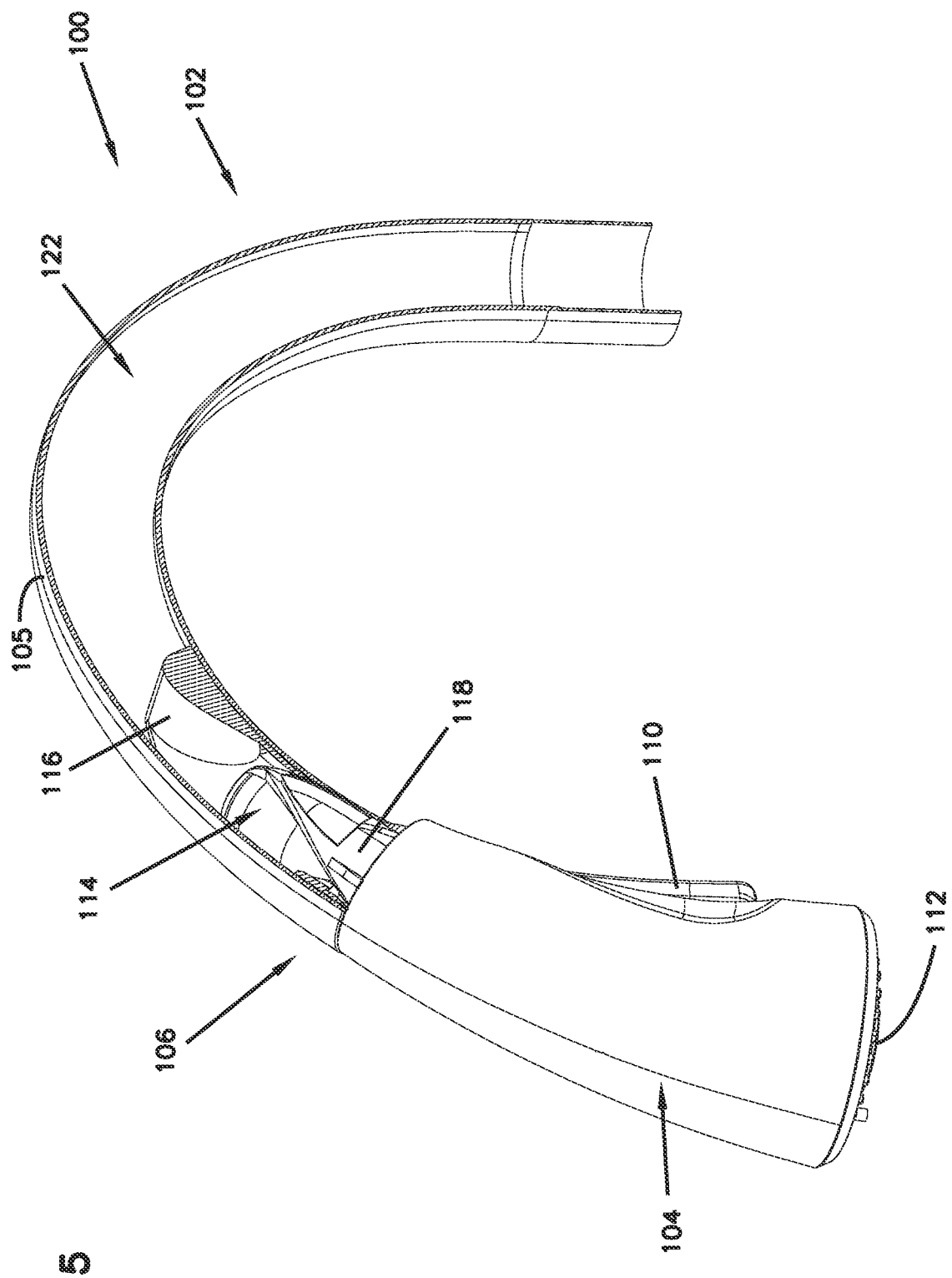
FIG. 5 illustrates a perspective schematic view of the faucet of FIG. 1 with the spray head in the aligned position.

As shown, the first and second alignment elements 116, 118 are shown interfacing with one another to begin an alignment motion caused by the configuration of the alignment coupling 114. As the spray head 104 is drawn closer to the outlet 106, by, for example, a pullback device (e.g., a weight, spring, reel, etc.), the spray head 104 is rotated automatically via the alignment coupling 114 toward the aligned position. As shown in FIG. 4, the spray head 104 is further rotated closer to the aligned position thanks to the interfacing of the first and second alignment elements 116, 118 of the alignment coupling 114. FIG. 5 shows the spray head 104 positioned in the aligned position and fully docked with the faucet body 102.

Figure 6:
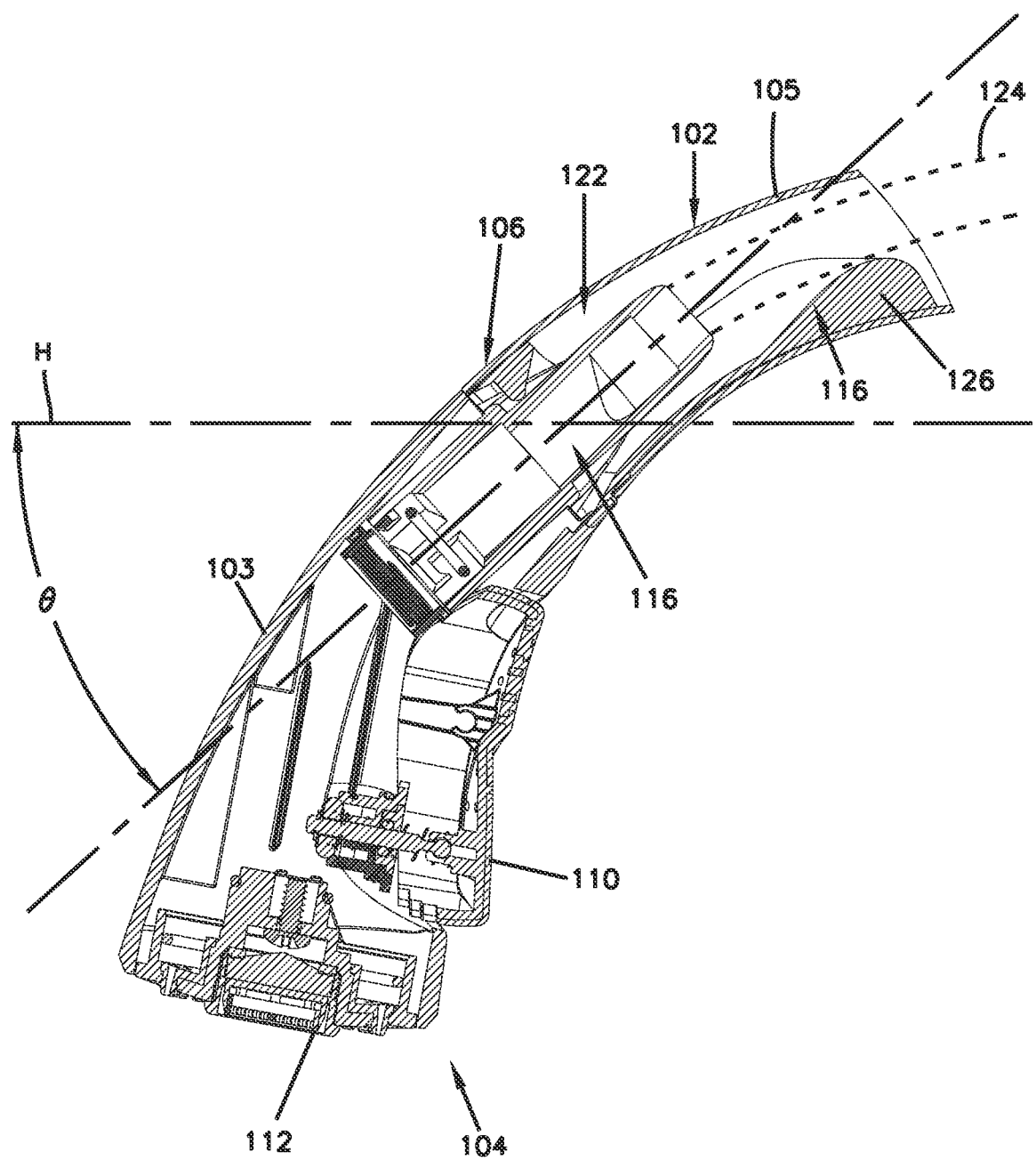
FIG. 6 illustrates a side cross-sectional view of the faucet of FIG. 1 with the spray head in the aligned position.

FIG. 6 shows a cross-sectional view of the faucet 100 with the spray head 104 in the aligned position. FIG. 6 also shows a water hose 124 attached to the spray head 104 and positioned within the pathway 122 of the faucet body 102. The water hose 124 can be attached to the spray head in a variety of ways, including being attached to the second alignment element 118. As shown, the first alignment element 116 of the alignment coupling 114 includes a tongue 126 that interfaces with the hose 124 and elevates the hose 124 from a lower interior surface 120 of the pathway 122. In some examples, the tongue 126 is configured to control an angle θ of entry of the water hose 124 into the pathway 122 with respect to horizontal H. Depending on the orientation and configuration of the faucet 100, the angle θ can be altered. In some examples, the angle θ is between about 30 degrees and 60 degrees with respect to horizontal H. In some examples, the angle θ is 45 degrees with respect to horizontal H.

The water hose 124 can be any of a variety of different types including, but not limited to, a nylon-braided hose, a metal braided hose, a flexible hose, a coated hose, etc.

Figure 7:
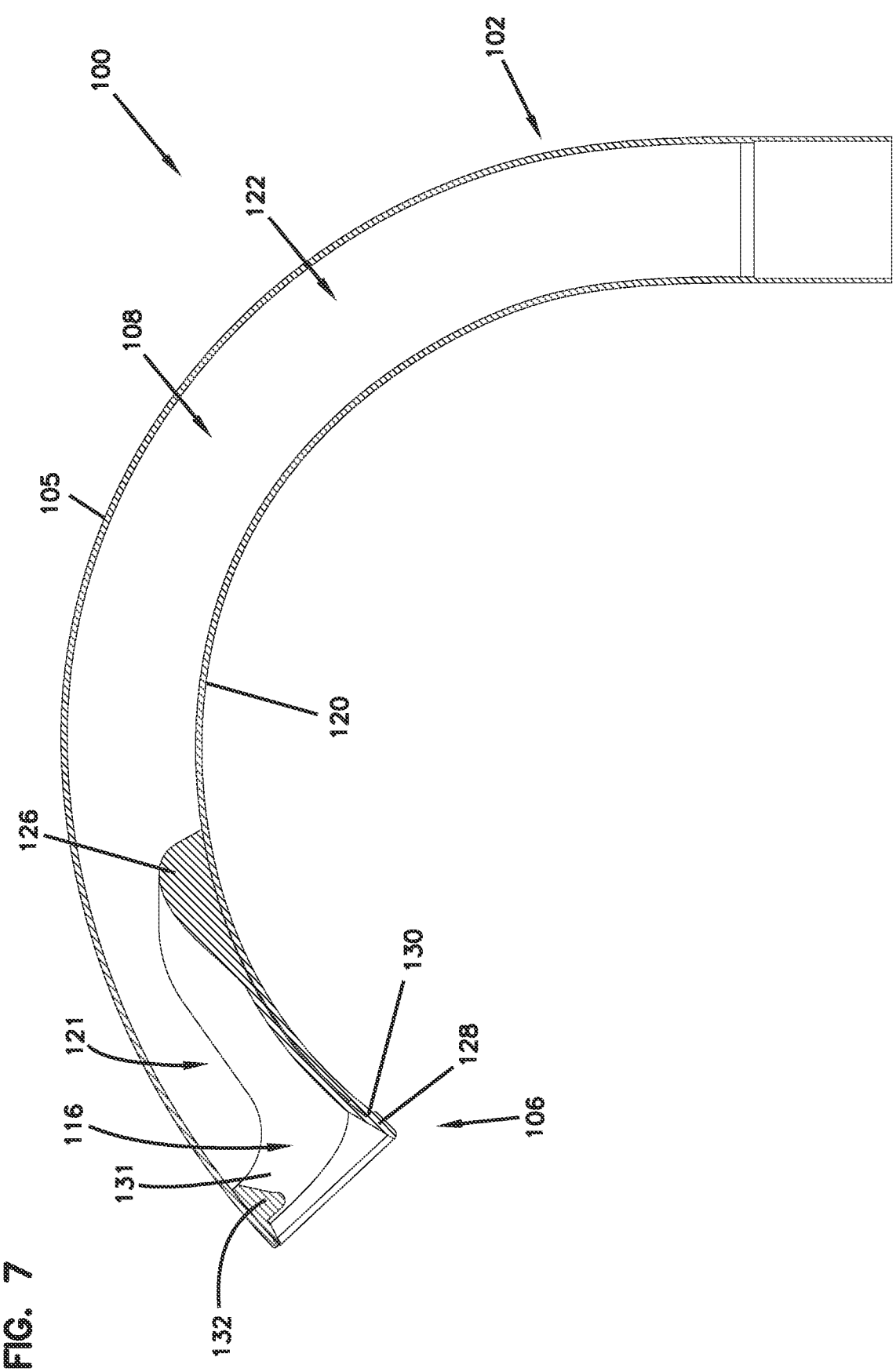
FIG. 7 illustrates a side cross-sectional view of a faucet body and a first alignment element of the faucet of FIG. 1.

FIG. 7 shows a side view of the first alignment element 116 positioned in the outlet 106 of the faucet body 102. In some examples, the first alignment element 116 is positioned within a portion of the neck 108 of the faucet. In some examples, the first alignment element 116 is fixed within the outlet 106 of the faucet body 102. In some examples, the first alignment element 116 is fixed to the faucet body 102 by way of a fastener, such as, but not limited to, at least one screw, bolt, adhesive, and/or the like. As noted above, the first alignment element 116 can be integral with the faucet body 102. In other examples, the first alignment element 116 is fixed to the faucet body 102 by way of a press fit. In other examples still, the first alignment element 116 is fixed to the faucet body 102 by way of brazing, welding, or the like.

In some examples, the first alignment element 116 includes a faucet body alignment portion 128, a projection 132, and a ring 131. In some examples, the faucet body alignment portion 128 facilitates proper alignment of the first alignment element 116 within the outlet 106 of the faucet body 102. The faucet body alignment portion 128 can assist in the proper assembly of the faucet 100, so that the first alignment element 116 is more easily correctly orientated at the outlet 106 to facilitate the desired alignment of the spray head 104 once the faucet 100 is assembled. In some examples, the faucet body alignment portion 128 is one of a projection and a recess. The faucet body alignment portion 128 is engagable with a corresponding projection or recess 130 of the faucet body 102.

As shown, the first alignment element 116 also includes an alignment feature that includes the projection 132 positioned at a top side 121 of the pathway 122 and extending from the top side of the ring 131 of the first alignment element 116. As will be described in more detail herein, the projection 132 is configured to interface with the second alignment element 118 to move the spray head 104 into the aligned positioned during docking. In some examples, the projection 132 is at a side of the first alignment element 116 opposite the tongue 126.

In the depicted example, the first alignment element 116 also includes the ring 131 positioned at the outlet 106 of the faucet body 102. In some examples, the ring 131 is positioned within the faucet body 102 to encircle the pathway 122. In some examples, the projection 132 extends radially directly inward from the ring 131 and the tongue 126 extends axially therefrom. In some examples, the ring 131 also includes the faucet body alignment portion 128.

Figure 8:
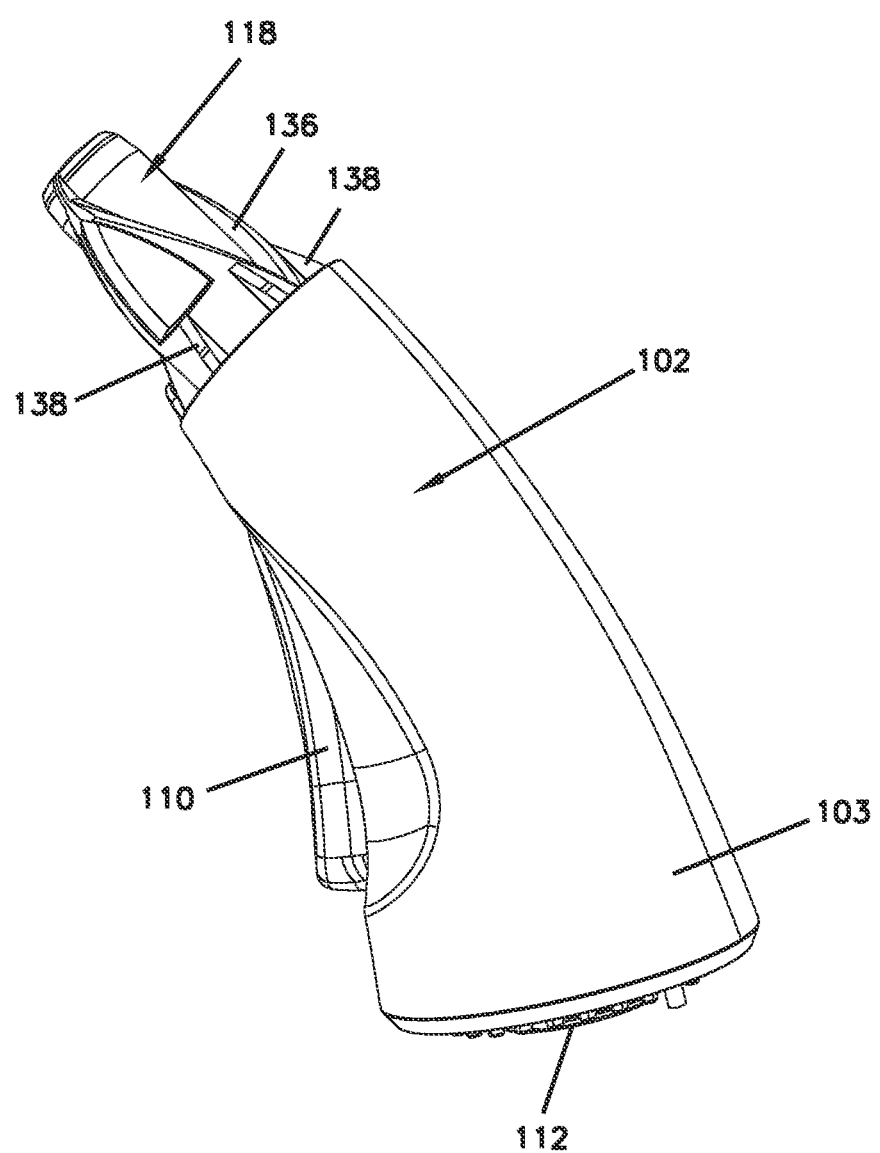
FIG. 8 illustrates a perspective view of a spray head and a second alignment element of the faucet of FIG. 1.
Figure 9:
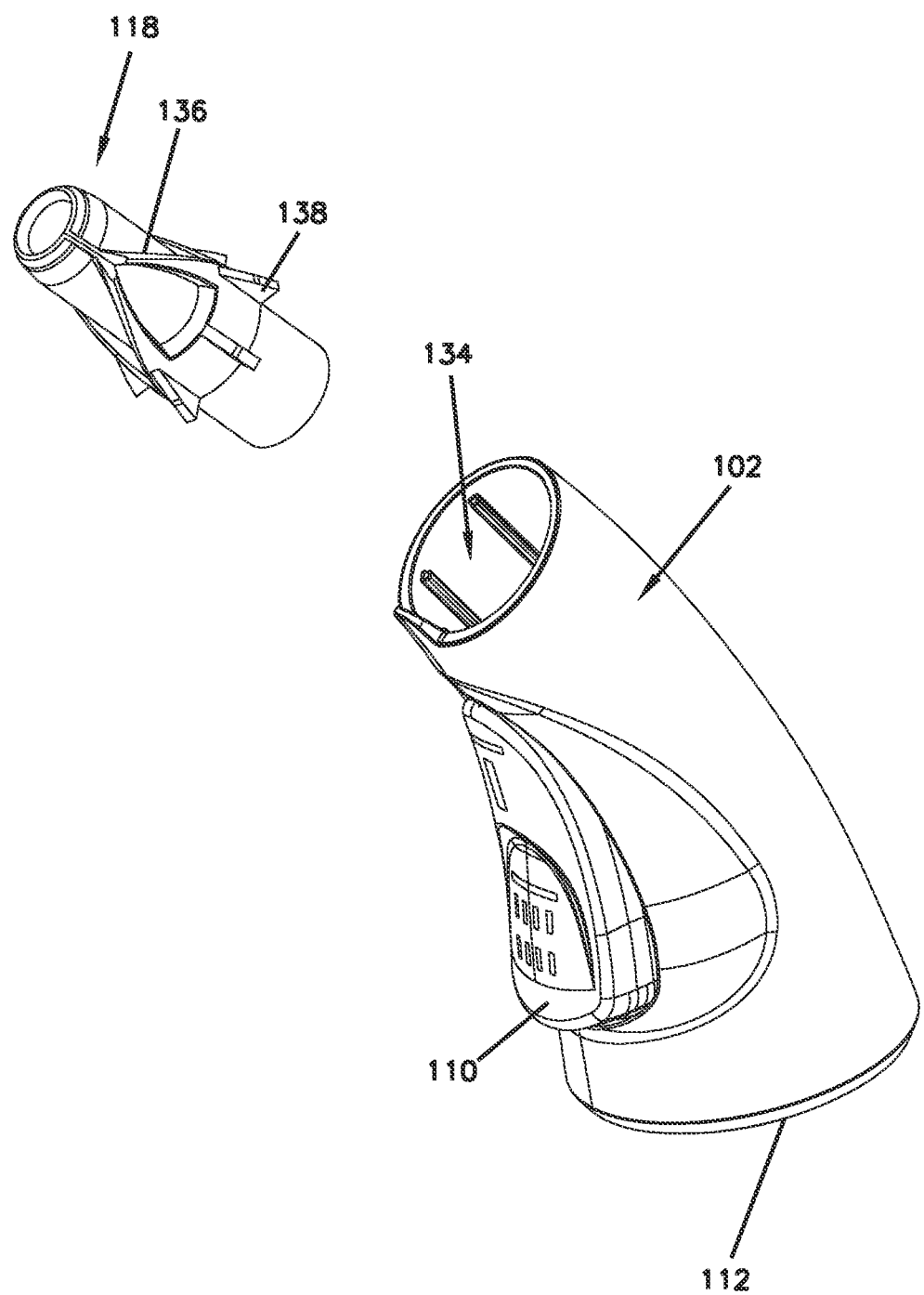
FIG. 9 illustrates a perspective partially exploded view of the spray head and the second alignment element of FIG. 8.

FIG. 8 shows the second alignment element 118 mounted to the spray head 104. FIG. 9 shows the second alignment element 118 spaced away from an internal cavity 134 of the spray head 104. In some examples, the second alignment element 118 is fixed to the spray head 104 to prevent relative movement therebetween. In some examples, the second alignment element 118 is mounted adjacent to the spray head 104. In some examples, the second alignment element 118 is positioned around the end of the water hose 124, as shown in FIG. 6. In some examples, the second alignment element 118 is mounted to the hose 124.

The second alignment element 118 includes an alignment feature that includes groove 136 positioned at the periphery of the second alignment element 118. As will be discussed in further detail herein, the groove 136 is configured to interface with the projection 132 of the first alignment element 116 so as to move the spray head 104 toward the aligned position during docking. The second alignment element 118 also includes centering elements 138 positioned circumferentially around the exterior surface thereof. The centering elements 138 are configured to interface with the outlet 106 of the faucet body 102 to aid in centering the spray head 104 during docking. In some examples, the centering elements 138 are configured to interface with a portion of the first alignment element 116. In some examples, the centering elements 138 are fins, with the narrowest side of the fin being configured to interface with the faucet body 102/first alignment element 116 first.

Figure 10:
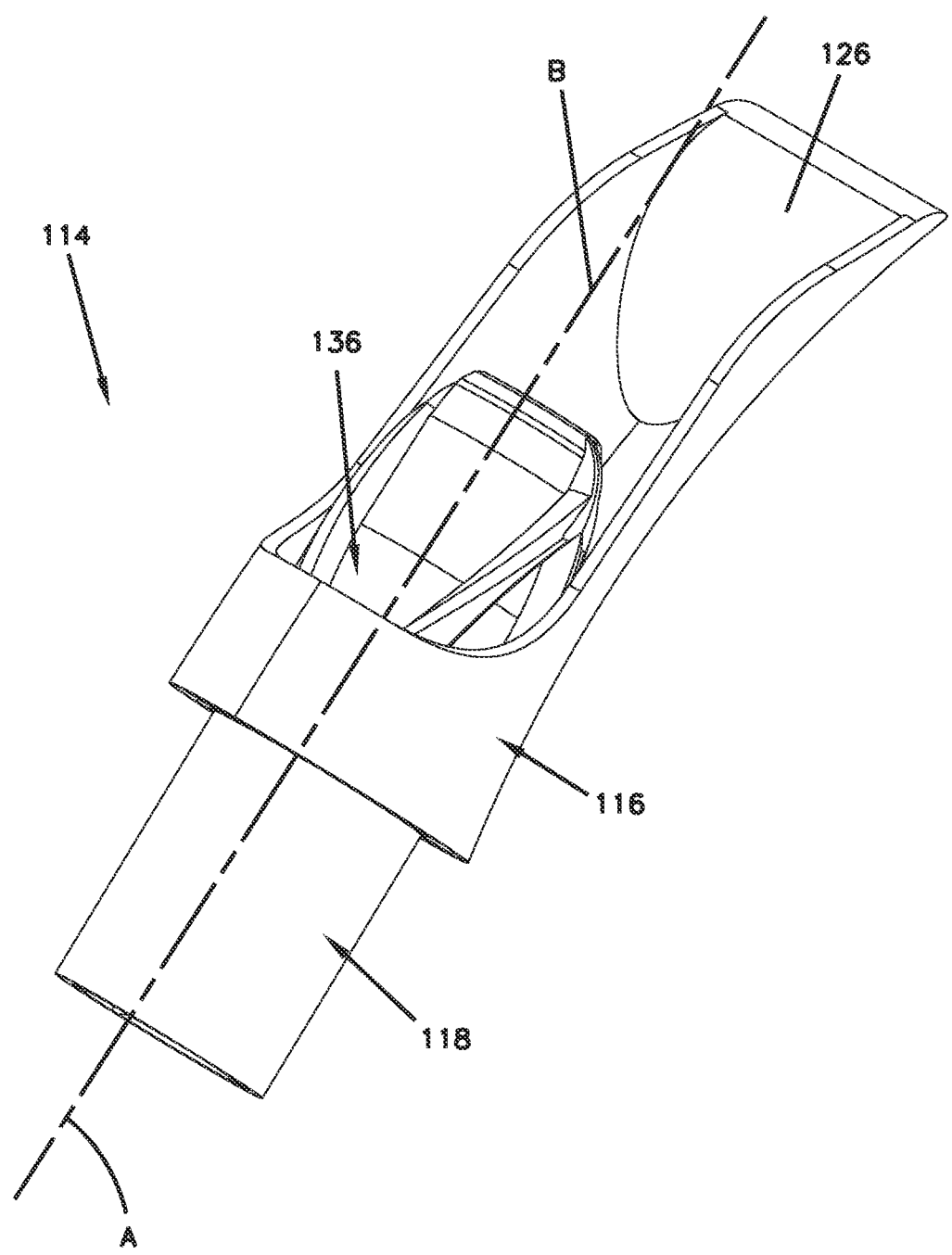
FIG. 10 illustrates a perspective partially exploded view of an alignment coupling including first and second alignment elements, according to one example of the present disclosure.
Figure 11:
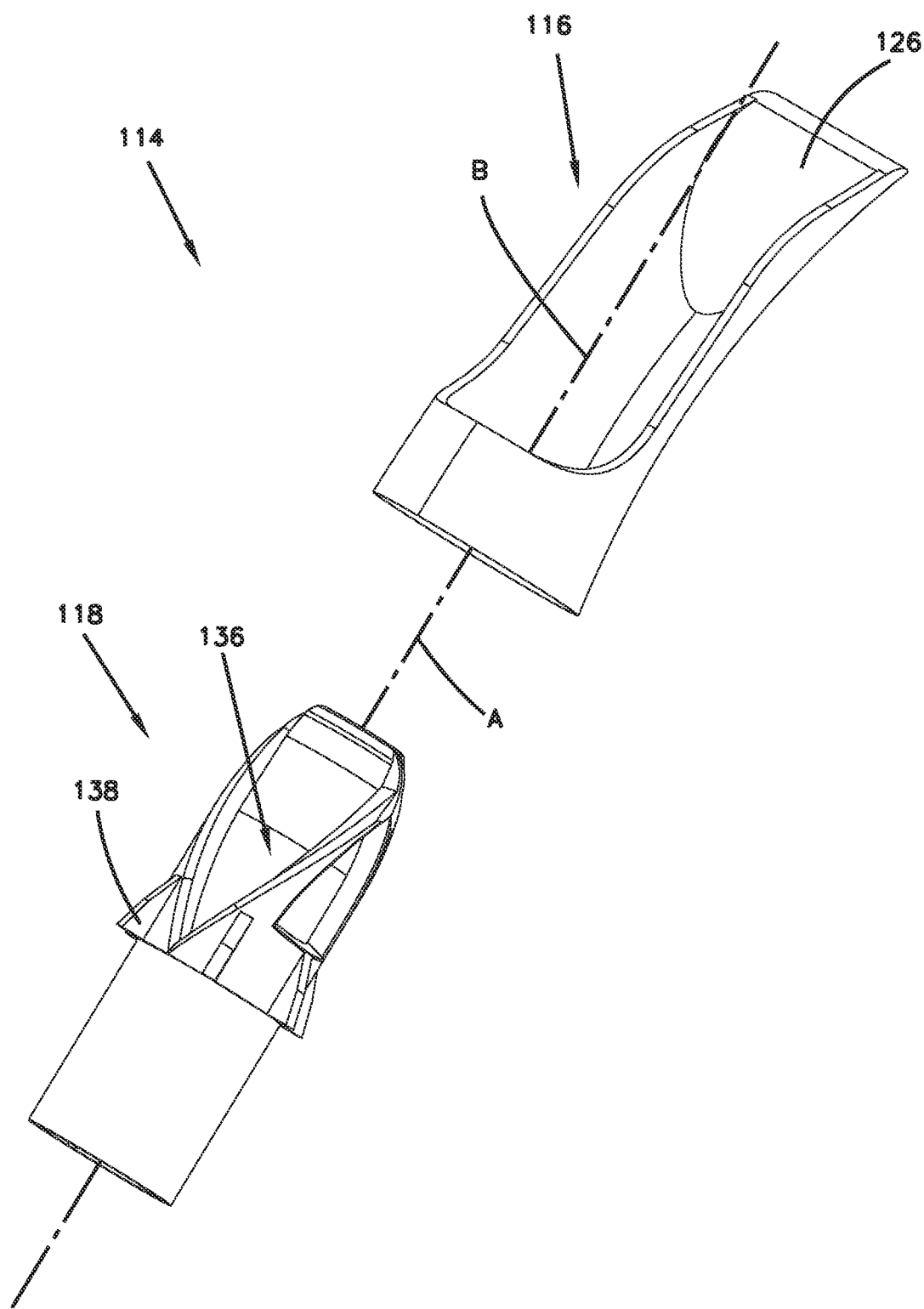
FIG. 11 illustrates a perspective view of the alignment coupling of FIG. 10 in a fully engaged position.

FIG. 10 shows a perspective view of the alignment coupling 114 when the first and second alignment elements 116, 118 are positioned in a fully engaged position. FIG. 11 shows the alignment coupling 114 partially exploded, and the first and second alignment elements 116, 118 are shown spaced apart from one another. As shown, the second alignment element 118 has a generally cylindrical outer profile shape and the first alignment element 116 has a complementary shape, such as a circular recess (e.g., the ring 131) for the outer profile of the second alignment element 118 to be received within. In some examples, the relationship can be reversed and the first alignment element 116 can have a cylindrical shape while the second alignment element 118 has a complementary shape. It is considered within the scope of the present disclosure that the first or second alignment elements 116, 118 can have a variety of different geometric profiles and are not limited to a cylindrical shape and corresponding complementary shape.

In some examples, the fully engaged position of the first and second alignment elements 116, 118 corresponds with the aligned position of the spray head 104. In some examples, when in the fully engaged position, a longitudinal axis S of the second alignment element 118 and a central axis B of the ring 131 of the first alignment element 116 are generally aligned. In the depicted example, the projection 132 of the first alignment element 116 is received and positioned within the groove 136 of the second alignment element 118 when the alignment coupling 114 is in the fully engaged position. As shown, the second alignment element 118 is configured to be positioned within at least a portion of the first alignment element 116. In some examples, when in the fully engaged position, the second alignment element 118 is positioned within the ring 131 of the first alignment element 116.

Figure 12:
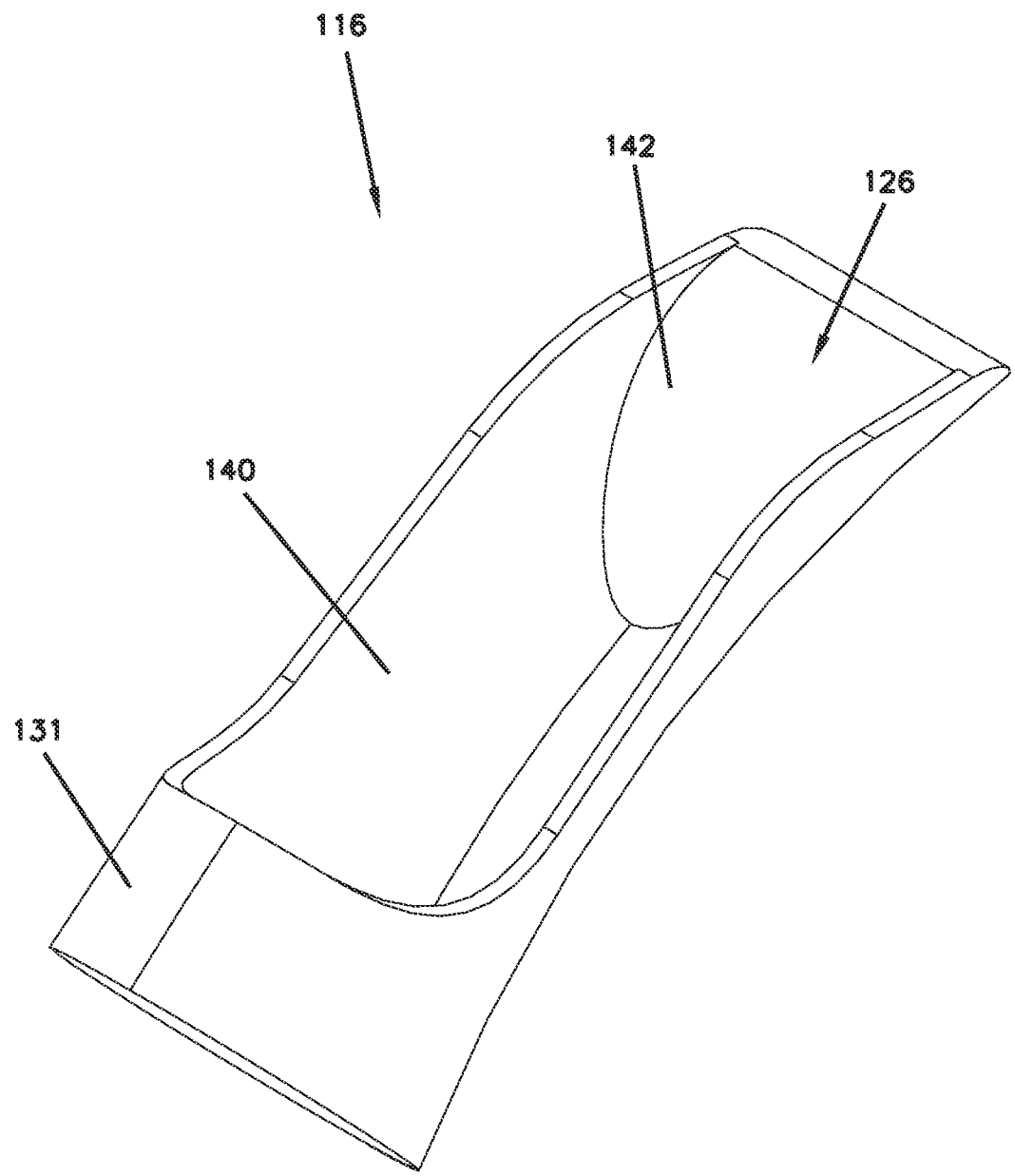
FIG. 12 illustrates a perspective view of the first alignment element of FIG. 10.
Figure 13:
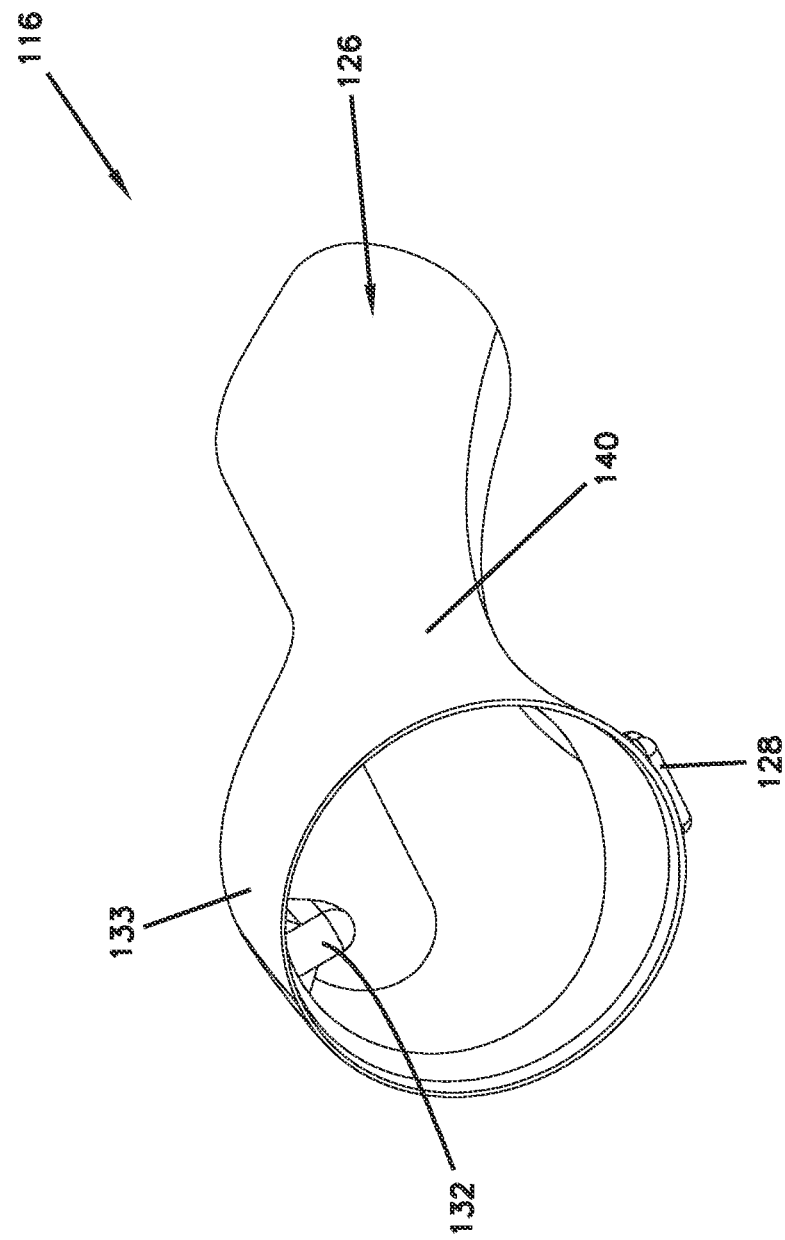
FIG. 13 illustrates another perspective view of the first alignment element of FIG. 10.
Figure 14:
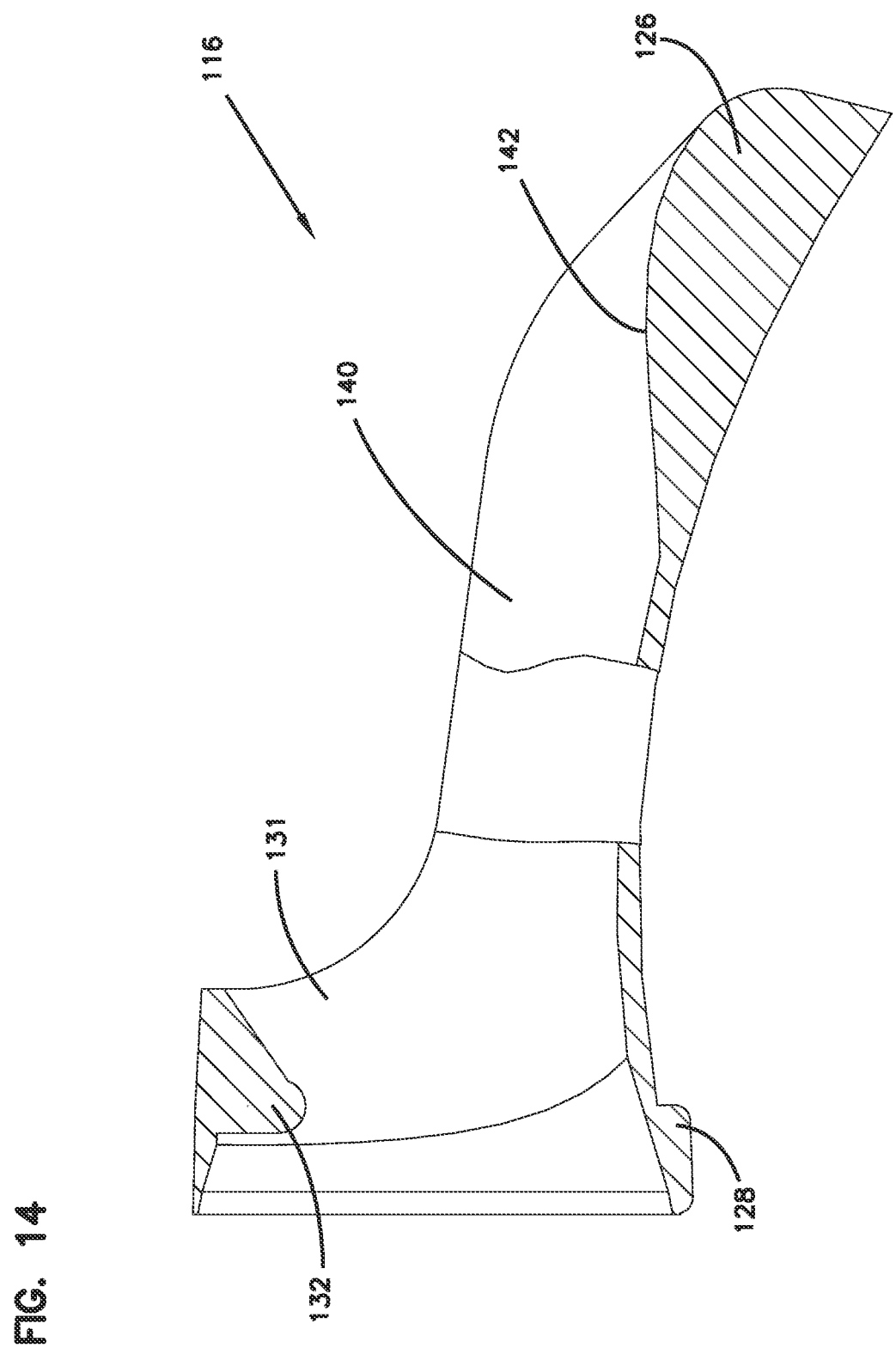
FIG. 14 illustrates a side cross-sectional view of the first alignment element of FIG. 10.

FIGS. 12 and 13 show perspective views of the first alignment element 116. FIG. 14 shows a side cross-sectional view. As shown, the first alignment element 116 includes the ring 131, where the projection 132 extends radially inward therefrom. The first alignment element 116 also includes the tongue 126 that extends generally in an axial direction away from the ring 131. Further still, the first alignment element 116 includes the faucet body alignment portion 128 at a lower side of the ring 131. In the example shown, the faucet body alignment portion 128 is a projection.

In some examples, the ring 131 is only a partial ring and is configured to only partially surround the pathway 122 of the outlet 106 of the faucet body 102. Further, the projection 132 can extend radially inward from the ring 131 at any point on the ring 131. For example, the projection 132 can extend inward from either side or from the bottom of the ring 131, not just from the top, as shown. Further still, the ring 131 can include a plurality of other alignment features disposed thereon such as, but not limited to, additional projections and/or grooves.

As shown in FIG. 14, the tongue 126 can include a wall 140 that at least partially defines a ramped portion 142. As noted above, the tongue 126, specifically the wall 140, extends in a general axial direction away from the ring 131. While in the example shown, the first alignment element 116 includes the tongue 126, the first alignment element does not have to include a tongue 126. In some examples, the first alignment element 116 only includes an alignment feature, such as the projection 132.

The first alignment element 116 can be constructed of a variety of different materials including, but not limited to, metal (e.g., aluminum) and plastic (e.g., Rulon, Derlin, or other like PTFE plastics).

Figure 15:
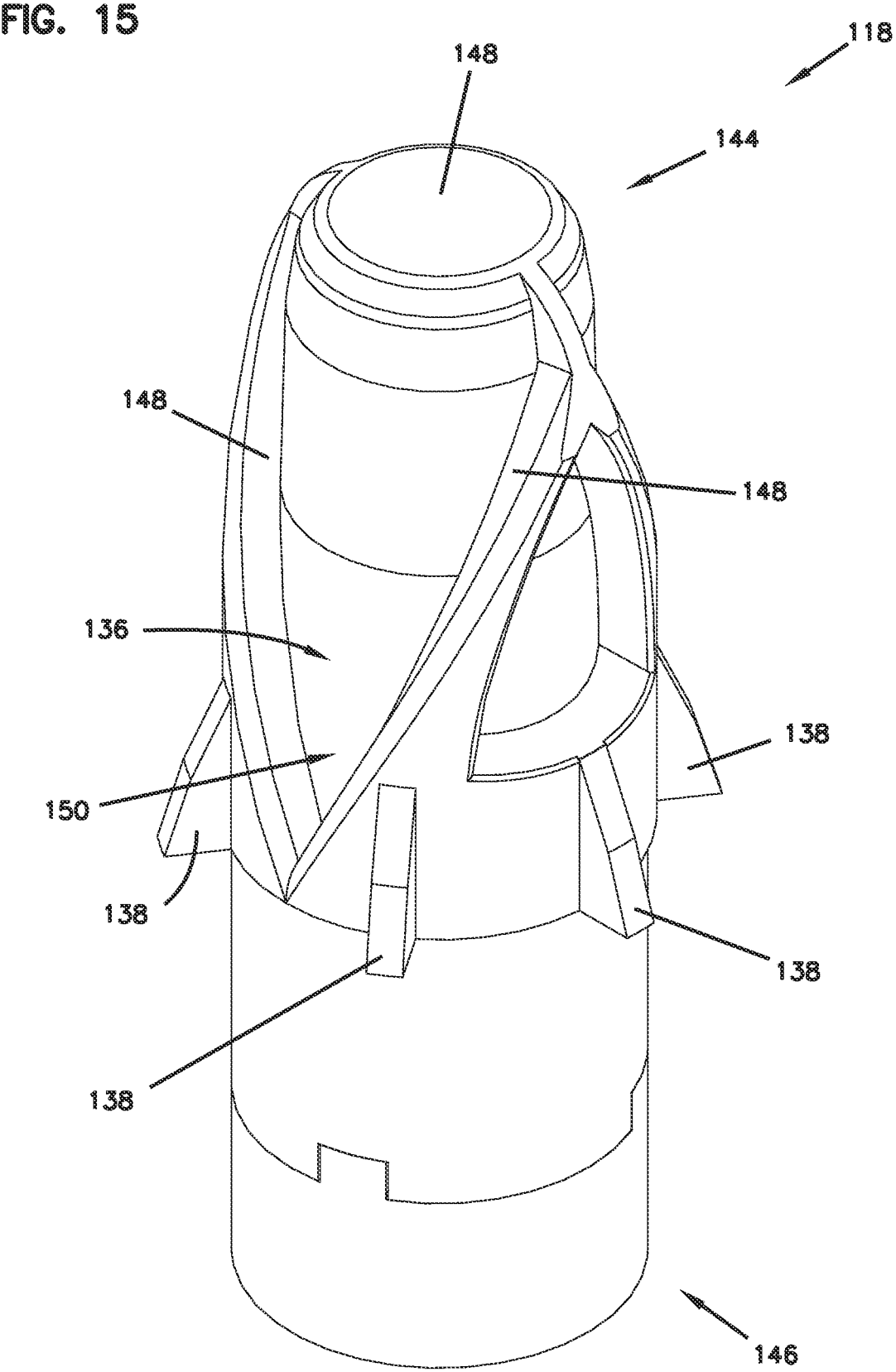
FIG. 15 illustrates a perspective view of the second alignment element of FIG. 10.
Figure 16:
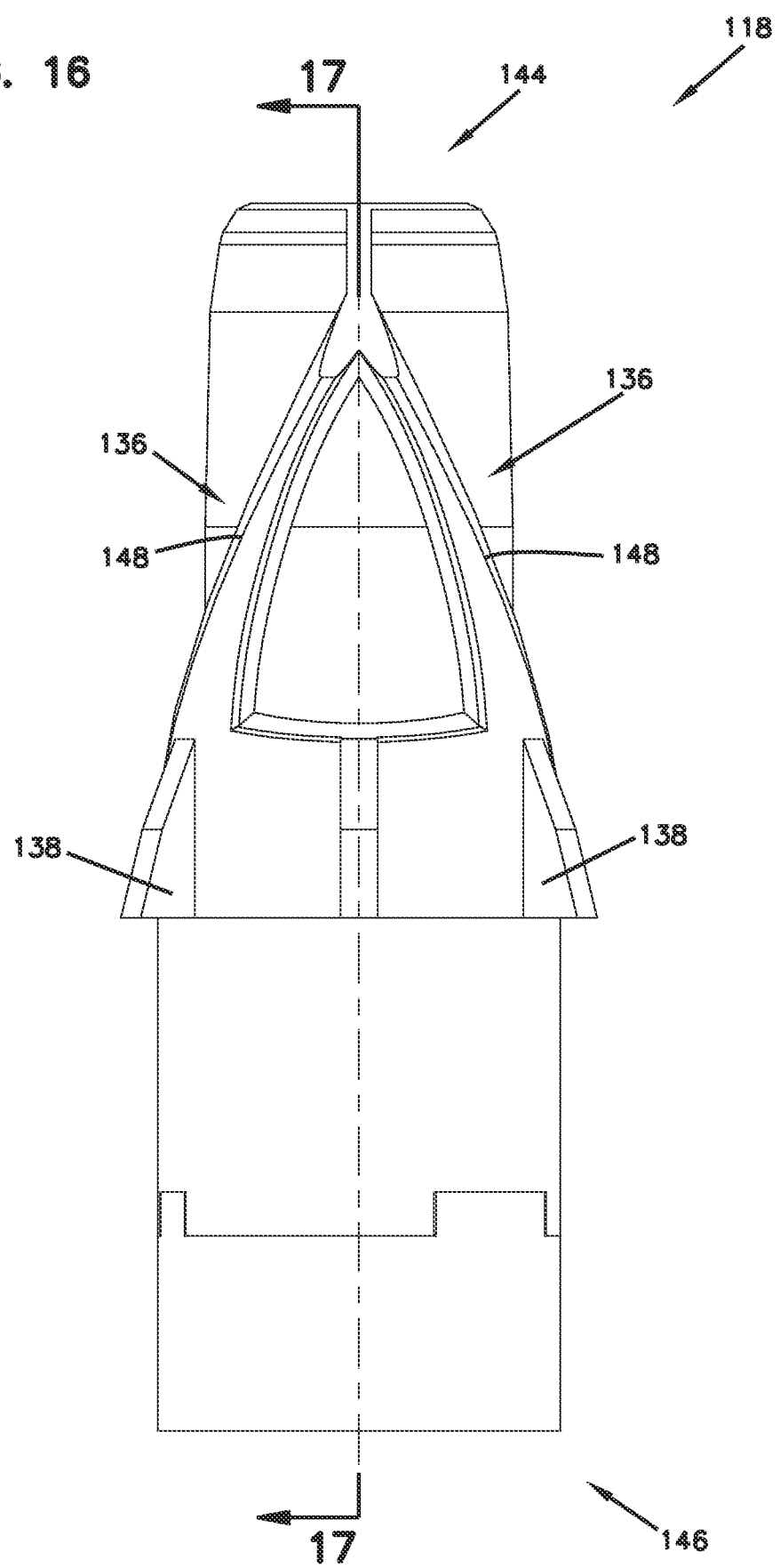
FIG. 16 illustrates a side view of the second alignment element of FIG. 10.
Figure 17:
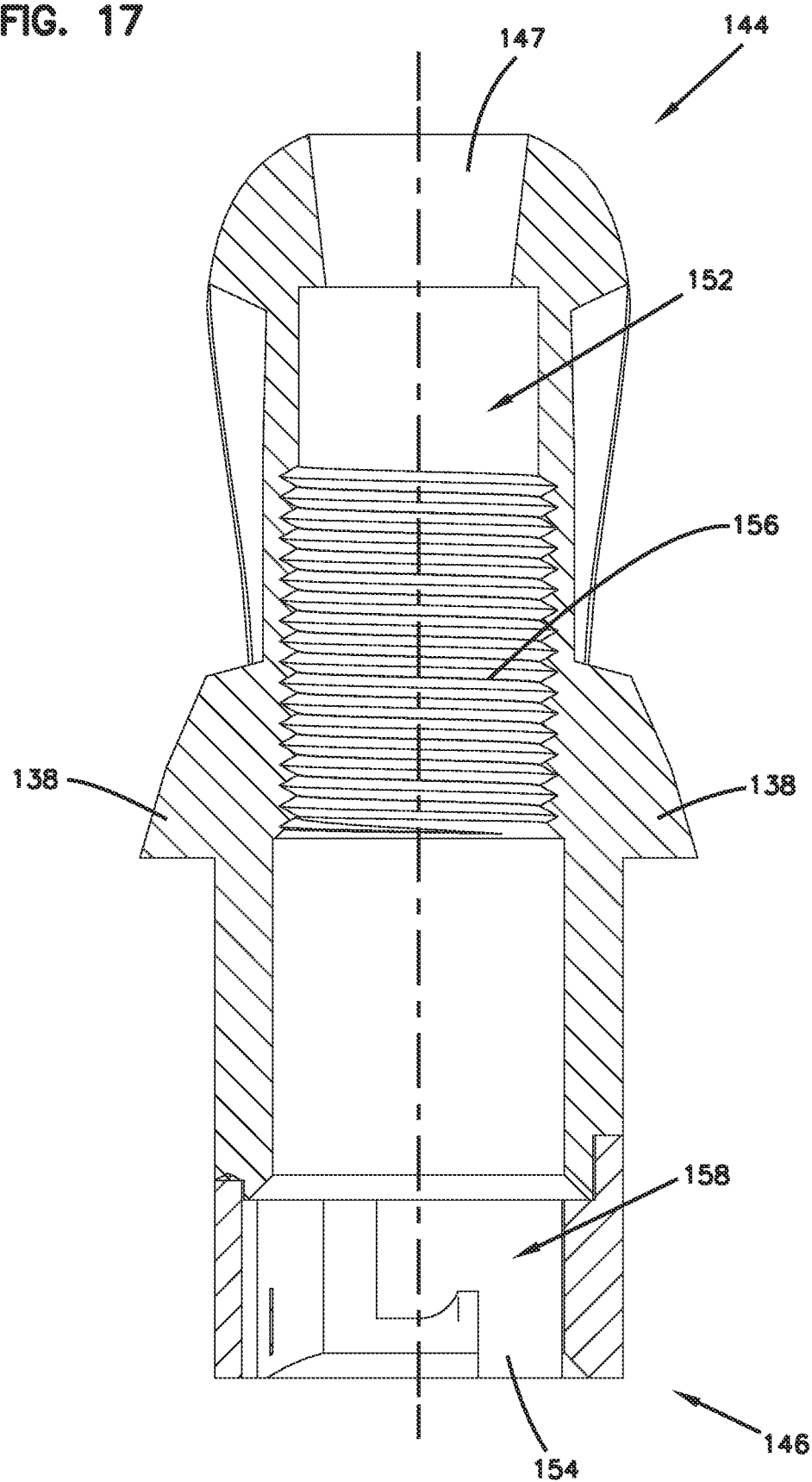
FIG. 17 illustrates a side cross-sectional view of the second alignment element of FIG. 10.

FIGS. 15-17 show the second alignment element 118. FIG. 15 shows a perspective view, FIG. 16 shows a side view, and FIG. 17 shows a side cross-sectional view.

The second alignment element 118 includes a first end 144 and a second end 146. The first end 144 is configured to be inserted into the faucet body 102 before the second end 146. In some examples, the first end 144 is configured to receive the water hose 124 at an opening 147. In some examples, the second end 146 is configured to be attached to a portion of the spray head 104.

In some examples, the second alignment element 118 includes a pair of grooves 136 positioned at opposite sides of the second alignment element 118. In some examples, only a single groove 136 is utilized for alignment. Each groove 136 includes a pair of walls 148 that together define the boundaries of the groove 136. In some examples, the groove 136 has a tapered shape defined by the walls 148 that extend toward one another from the first end 144 in a direction toward the second end 146. In some examples, the tapered shape of the groove 136 is v-shaped. In some examples, the walls 148 extend toward one another in a generally axial direction from the first end 144. In some examples, the walls 148 extend toward one another in a direction that is partially in the axial direction and partially in the circumferential direction. The groove 136 is configured in a way so that immediately adjacent the first end 144, the walls 148 are separated at a distance to define the widest portion of the groove 136. As the walls 148 extend toward the second end 146, the walls 148 progressively narrow the groove 136 until they intersect with one another. Adjacent the point of intersection of the walls 148, the groove 136 has its narrowest width and defines a pocket 150.

Figure 18:
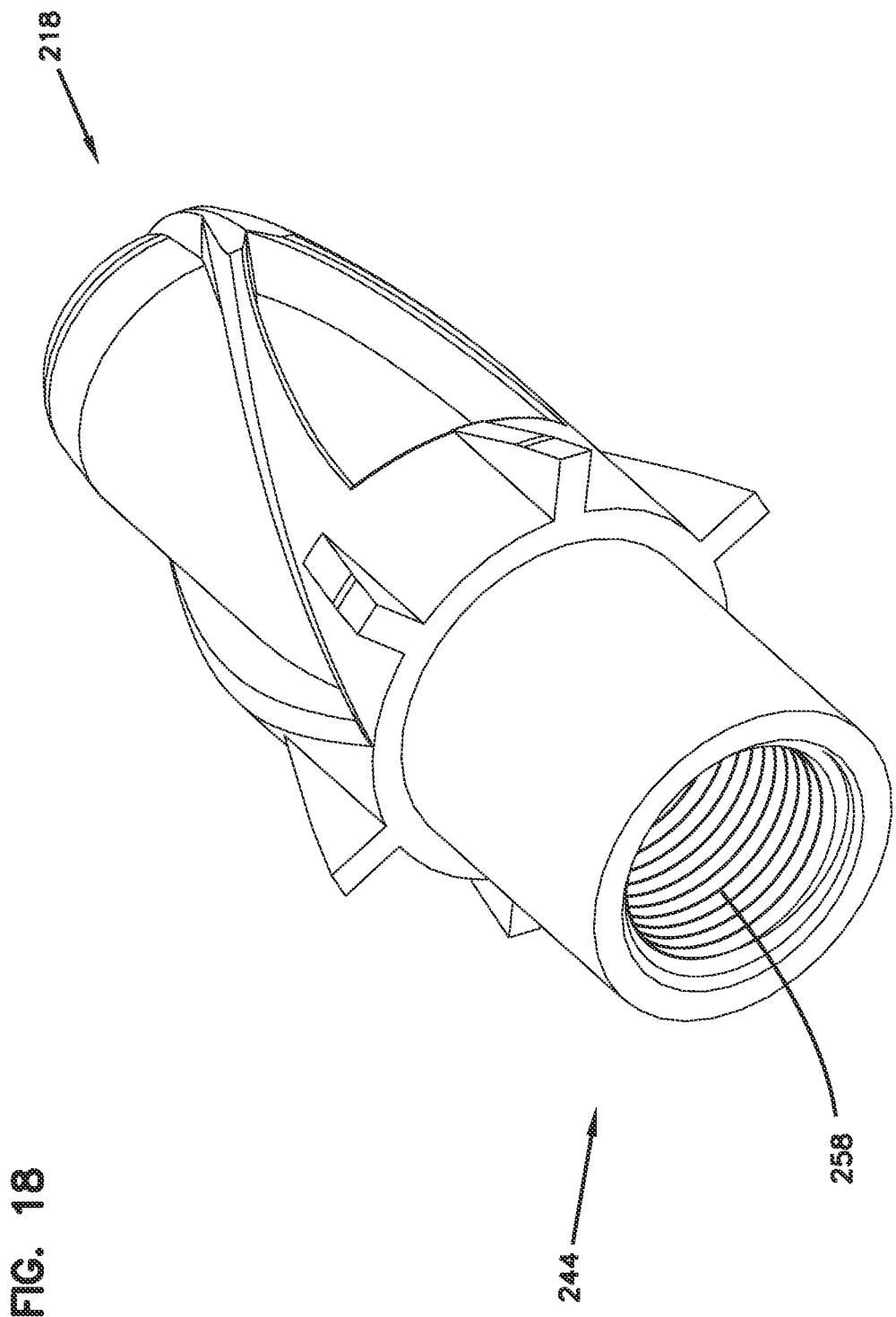
FIG. 18 illustrates a perspective view of a second alignment element, according to one example of the present disclosure.

FIG. 17 shows a cross sectional view of the second alignment element 118. As shown, the second alignment element 118 defines a passageway 152 that extends longitudinally through the second alignment element 118. The opening 147 at the first end 144 is a first opening of the passageway 152 and an opening 154 at the second end 146 is the second opening of the passageway 152. The passageway is configured to receive the water hose 124 within the opening 147 at the first end 144. The passageway is further configured to be connected at the opening 154 of the second end 146 to the spray head 104. In some examples, the passageway 152 can include threads, a recess, a series of projections, and/or other like attachment structures to aid in attaching the water hose 124 and the spray head 104 thereto. In the depicted examples, the passageway 152 includes internal threads 156 for attaching the water hose 124 and a series of recesses 158 at the opening 154 adjacent the second end 146 to receive corresponding projections of an attachment portion of the spray head 104. In some examples, the recesses 158 allow for a bayonet connection between the spray head 104 and the second alignment element 118. FIG. 18 shows another example of a second alignment element 218 that utilizes internal threads 258 at a second end 246 to attach to the spray head 104.

Like the first alignment element 116, the second alignment element 118 can be constructed of a variety of different materials including, but not limited to, metal (e.g., aluminum) and plastic (e.g., Rulon, Derlin, or other like PTFE plastics).

Figure 19:
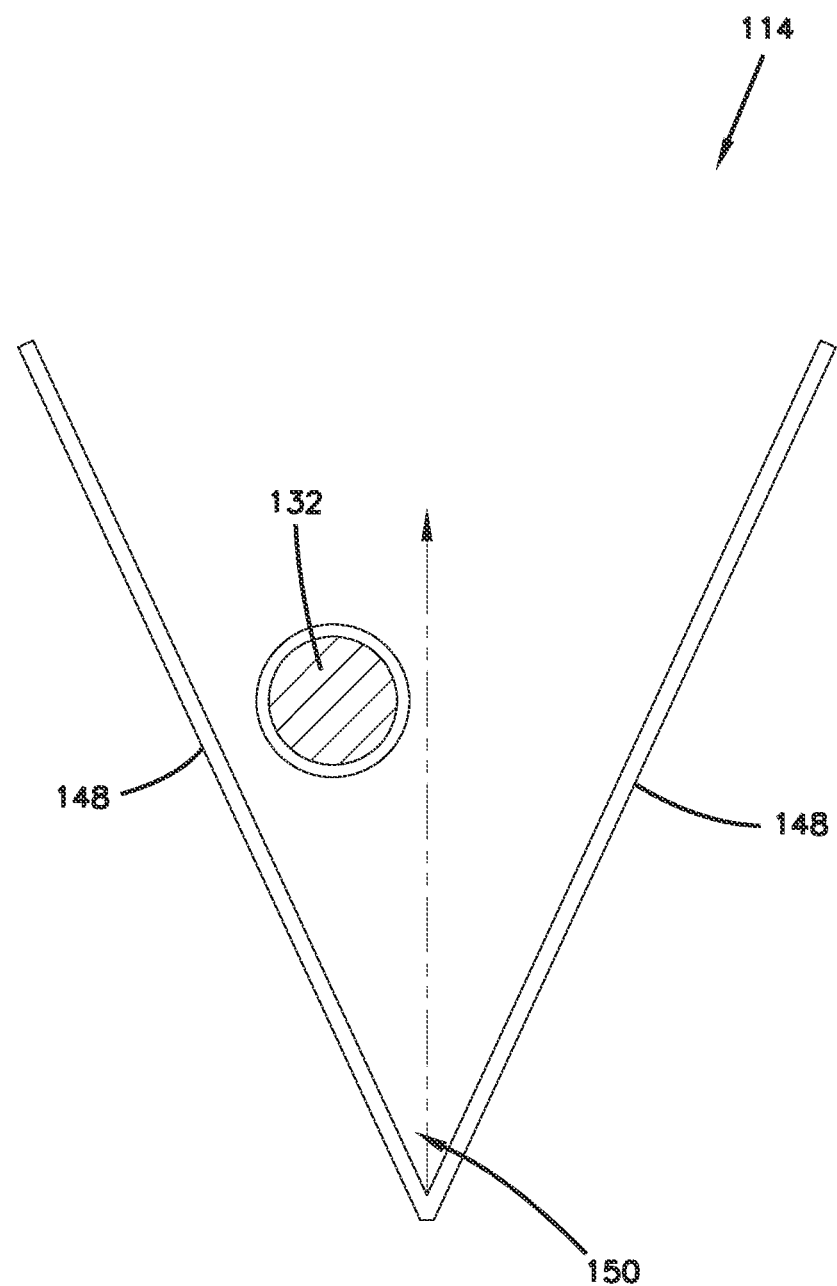
FIG. 19 illustrates a schematic representation of the interfacing of alignment features of the alignment coupling of FIG. 10.
Figure 20:
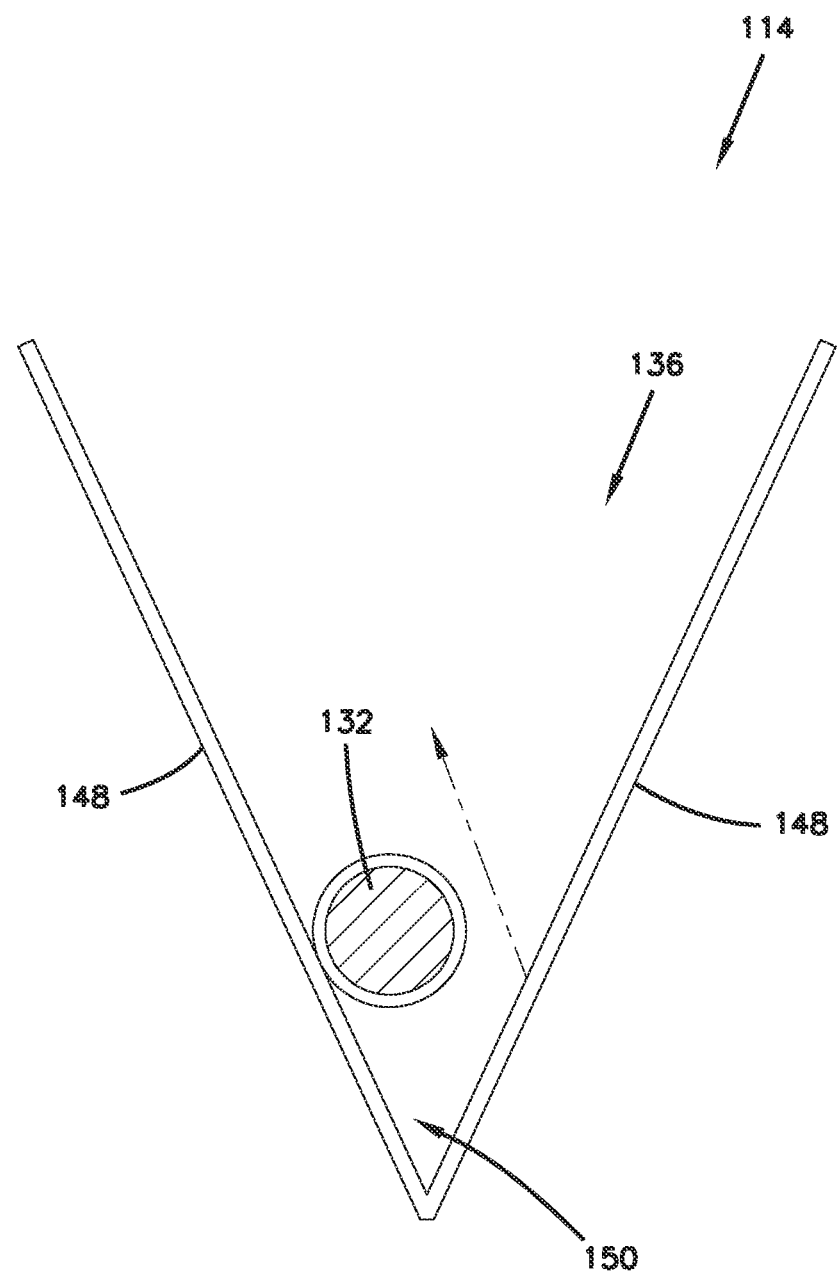
FIG. 20 illustrates another schematic representation of the interfacing of alignment features of the alignment coupling of FIG. 10.
Figure 21:
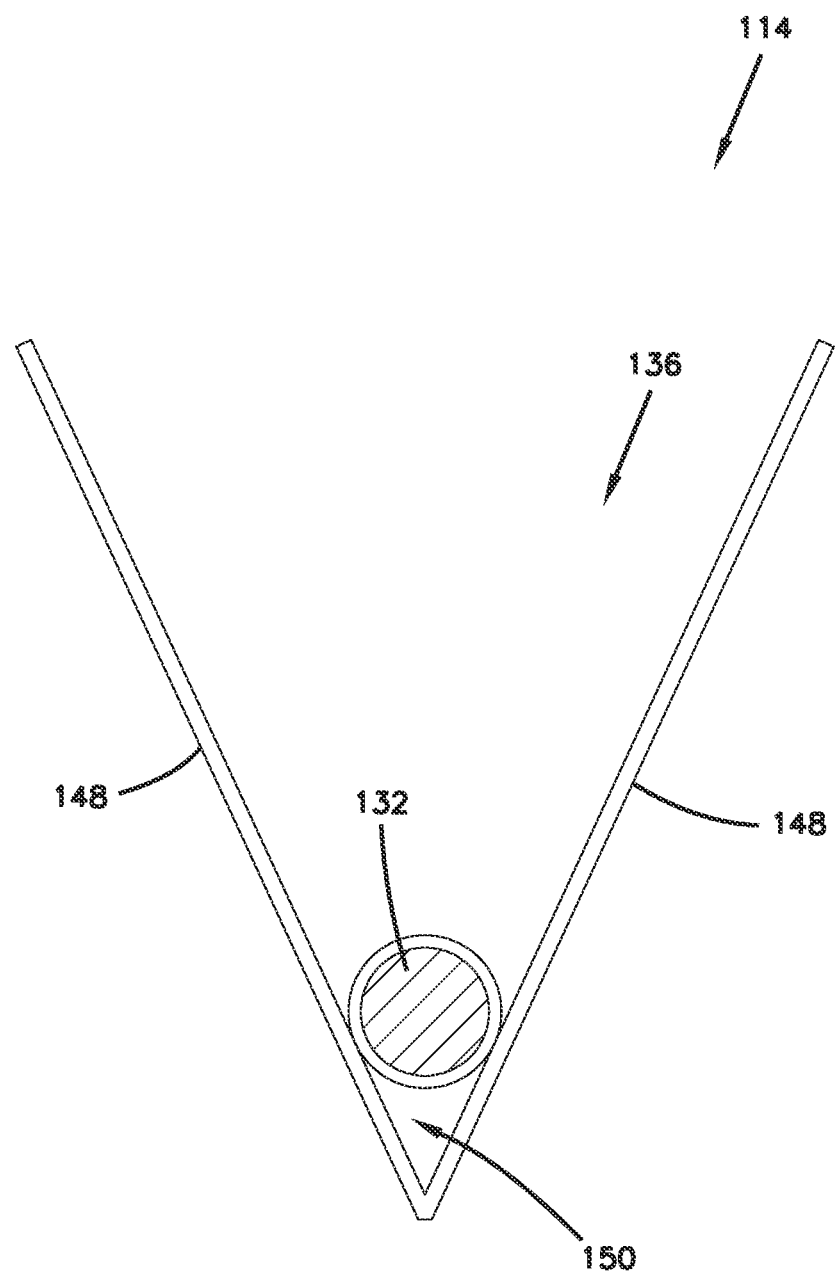
FIG. 21 illustrates another schematic representation of the interfacing of alignment features of the alignment coupling of FIG. 10 in the fully engaged position that corresponds with the aligned position of the spray head.

FIGS. 19-21 show a series of schematic illustrations of an example interfacing of the first and second alignment elements 116, 118 of the alignment coupling 114 during the docking of a spray head 104. The projection 132 of the first alignment element 116 is shown. The groove 136 of the second alignment element 118 is shown approaching the projection 132, indicated by the dashed arrow. The example shown is representative of the spray head 104 being re-docked to the fixed faucet body 102 having the projection 132.

As shown in FIG. 20, as the walls 148 of the groove 136 interface with the projection 132, due to the tapered nature of the groove 136, the walls 148 slide along the fixed projection 132 in a direction that brings the pocket 150 closer to the projection 132. Because the second alignment element 118, and therefore the groove 136, is fixed to the spray head 104, as the walls 148 slide on the projection 132, the spray head 104 is rotated and moved closer to the aligned position. In some examples, the second alignment element 118 can be fixed to the water hose 124 and the water hose 124 is fixed to the spray head 104. Therefore, upon rotation of the water hose 124 by the second alignment element 118, the water hose 124 rotates the spray head 104.

As shown in FIG. 21, once the walls 148 have slid along the projection 132 to where the projection 132 becomes positioned within the pocket 150, the spray head 104 is in the aligned position and docked, and thus the alignment coupling 114 is in the fully engaged position. Such move is done automatically due to the shape of the groove 136 and/or the projection 132.

As noted above, the relationship of the groove 136 and the projection 132 can be reversed so that the projection 132 is positioned on the second alignment element 118 and the groove 136 is positioned on the first alignment element 116. In such an example, the projection 132 of the spray head 104 would move within the groove 136 as the spray head 104 is being docked and automatically position itself in the pocket 150 of the groove thanks to the tapered, V-shape configuration. When in the pocket 150, the spray head 104 would be positioned in the aligned position.

Figure 22:
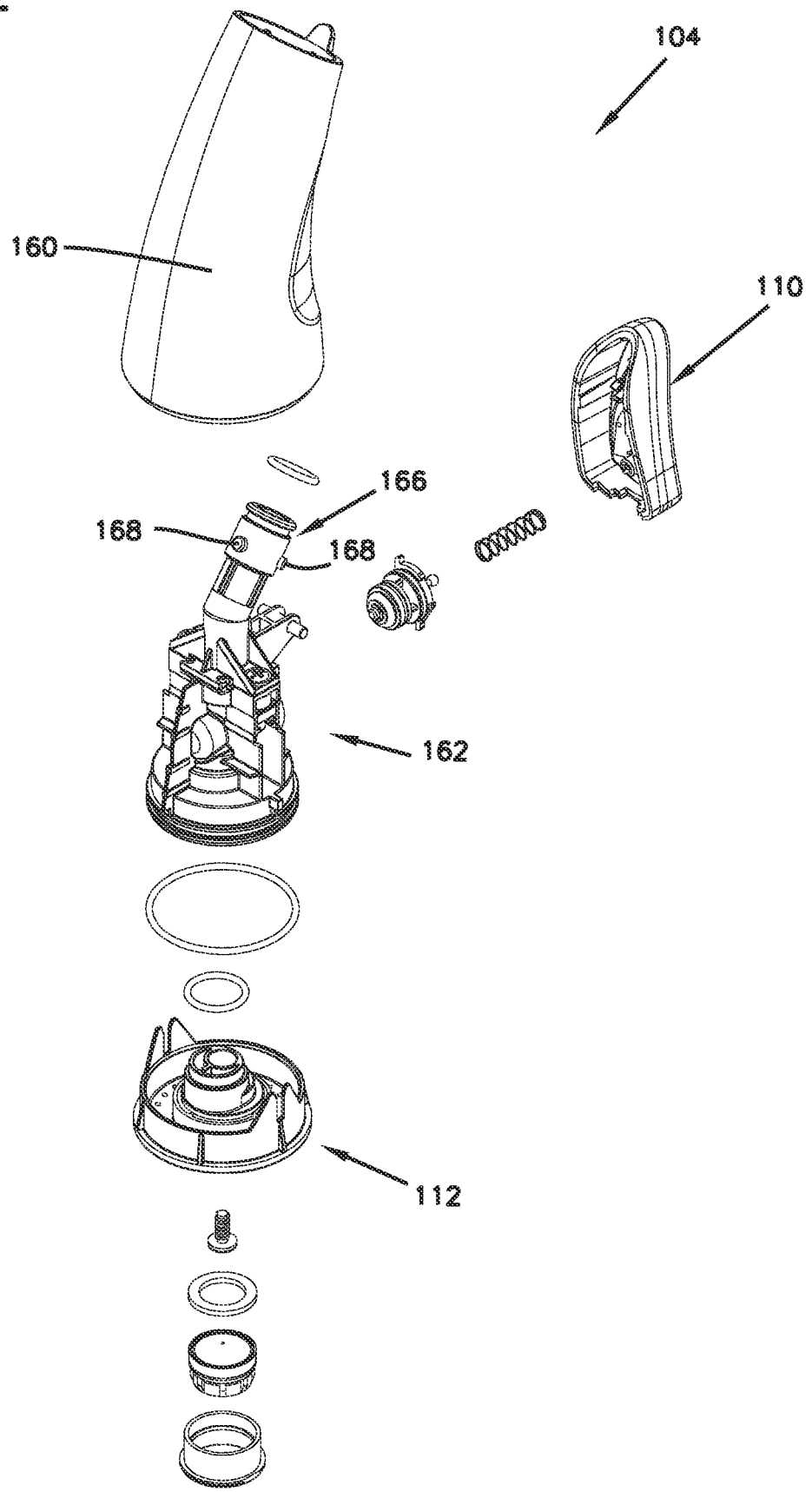
FIG. 22 illustrates a perspective exploded view of the spray head of the faucet of FIG. 1.

FIG. 22 shows a perspective exploded view of the spray head 104. As shown, the spray head 104 includes an outer housing 160 and a valve 162 positioned within the outer housing 160. In some examples, the valve 162 is configured to alter the characteristic of the water as it is expelled from the spray head outlet 112. The user input 110 is configured to control the operation of the valve 162. As shown, the valve 162 includes an attachment portion 166 that includes a plurality of projections 168. The attachment portion 166 is configured to be connected to the second end 146 of the second alignment element 118. The projections 168 are configured to be received in the recesses 158 of the second alignment element 118 to allow for a bayonet attachment between the spray head 104 and the second alignment element 118.

Figure 23:
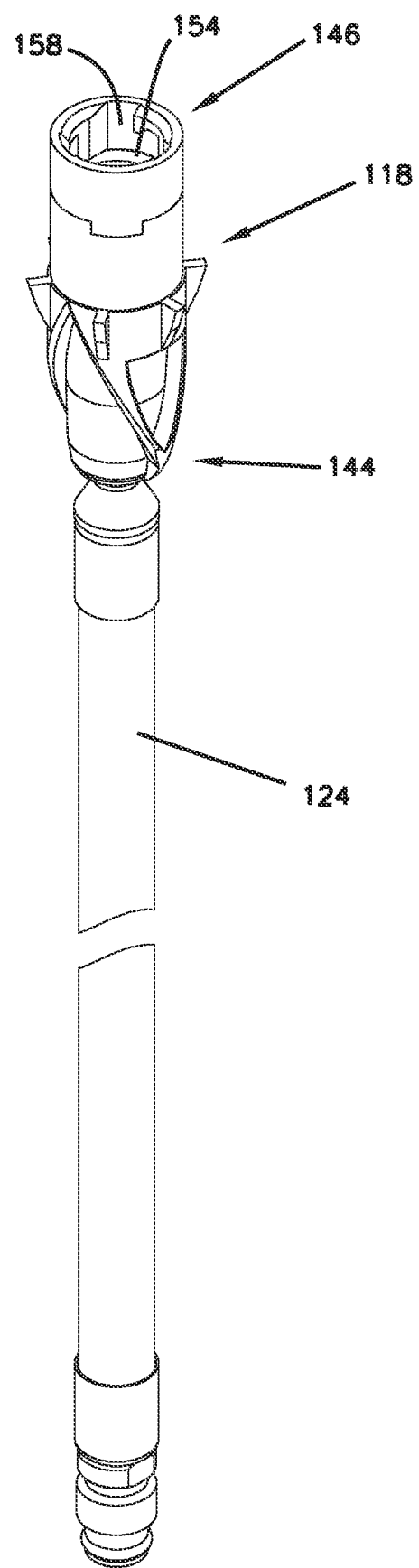
FIG. 23 illustrates a perspective view of the second alignment element of the alignment coupling of FIG. 10 attached to a water hose.
Figure 24:
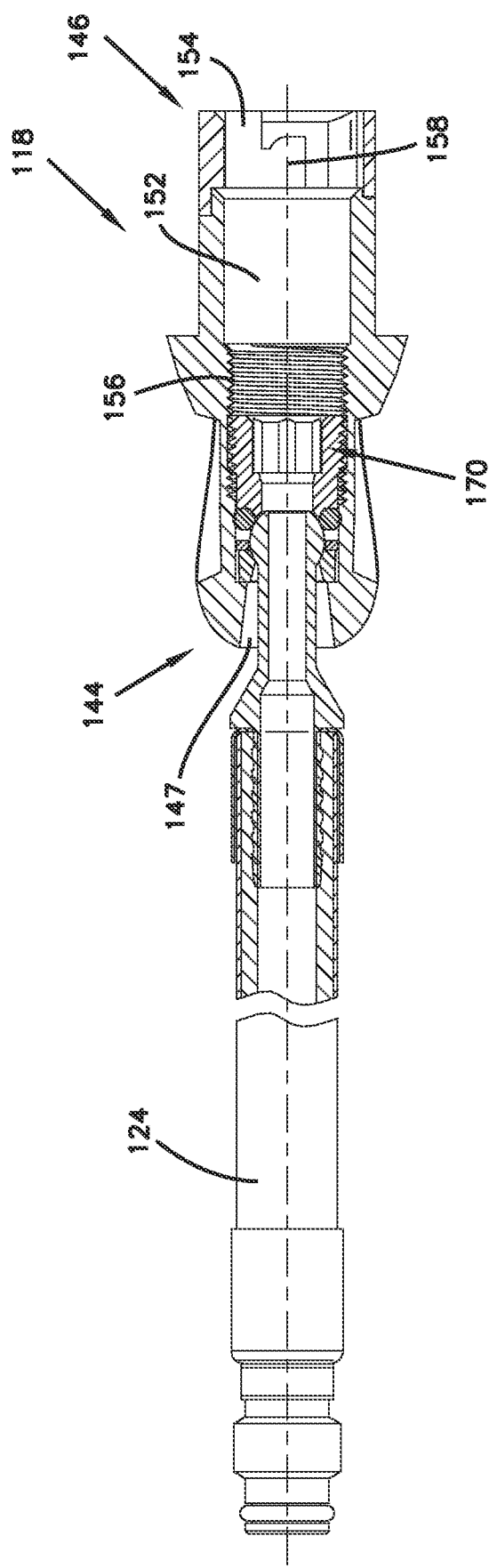
FIG. 24 illustrates a side cross-sectional view of the second alignment element of FIG. 23.

FIGS. 23 and 24 depict the water hose 124 connected to the first end 144 of the second alignment element 118. As shown, the second alignment element 118 is positioned around a portion the water hose 124. As shown in FIG. 24, the water hose 124 includes a fitting 170 that is connected within the passageway 152 of the second alignment element 118. In some examples, the fitting 170 is mated with the threads 156 of the second alignment element 118.

Figure 25:
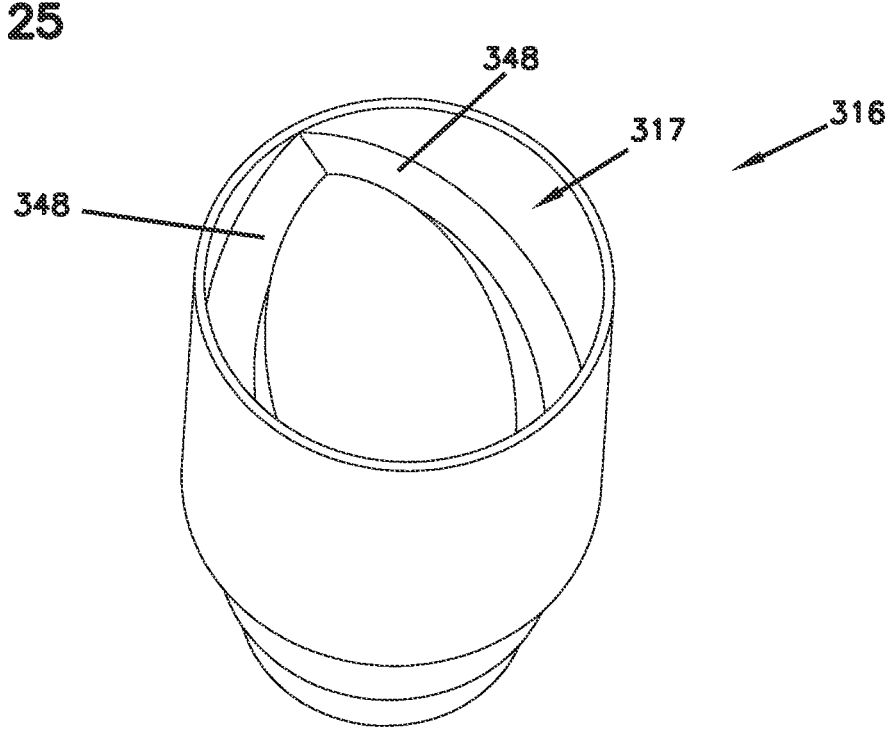
FIG. 25 illustrates a perspective view of a first alignment element, according to one example of the present disclosure.
Figure 26:
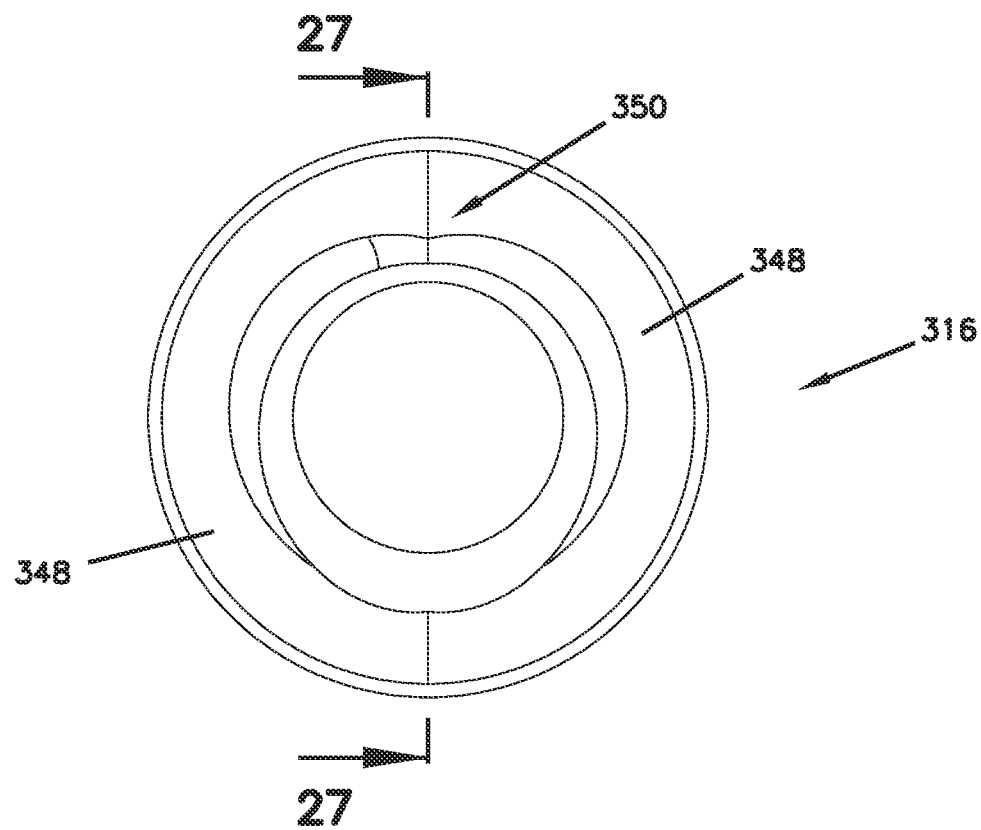
FIG. 26 illustrates a front view of the first alignment element of FIG. 25.
Figure 27:
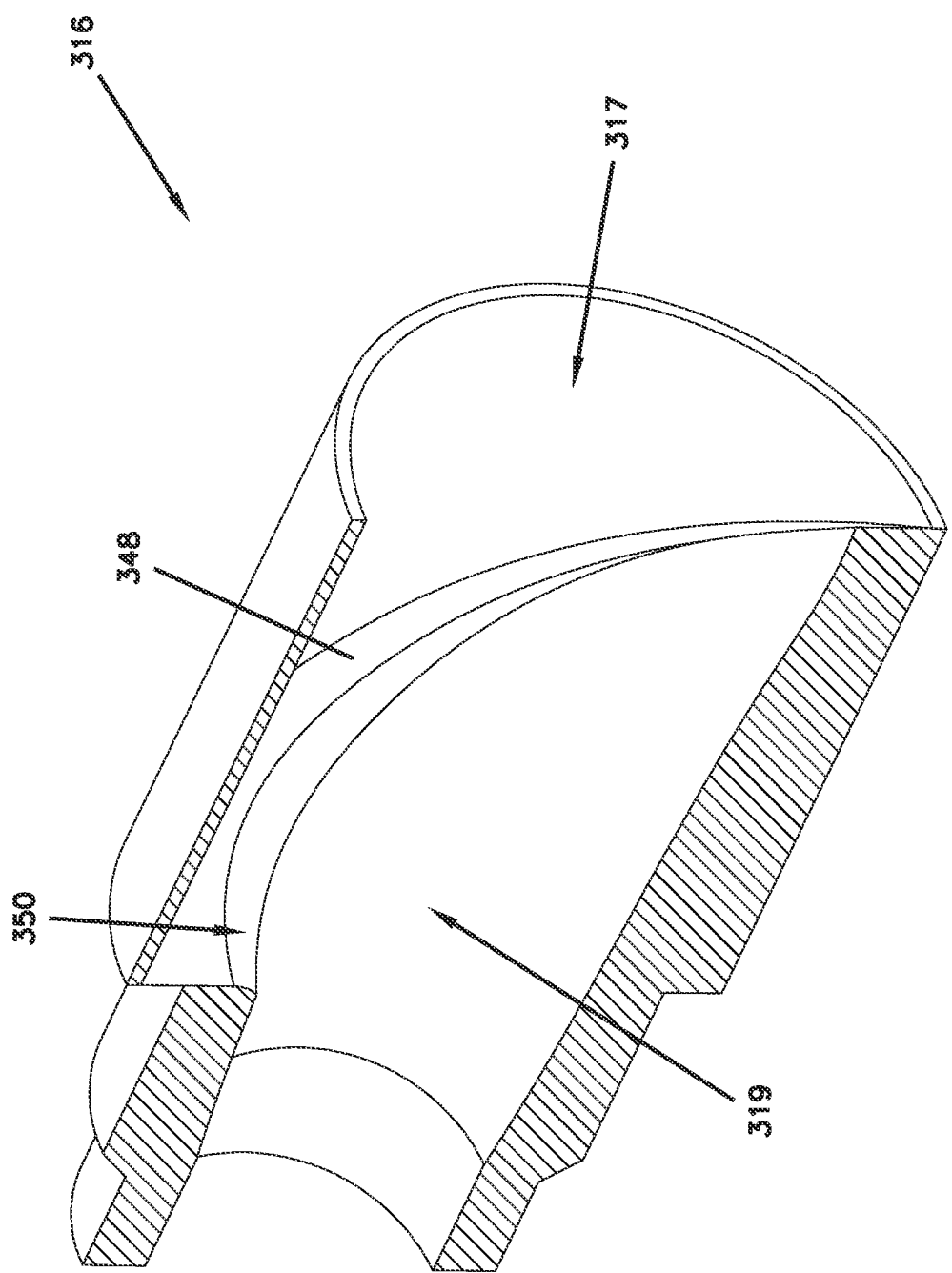
FIG. 27 illustrates a perspective side cross-sectional view of the first alignment element of FIG. 25.
Figure 28:
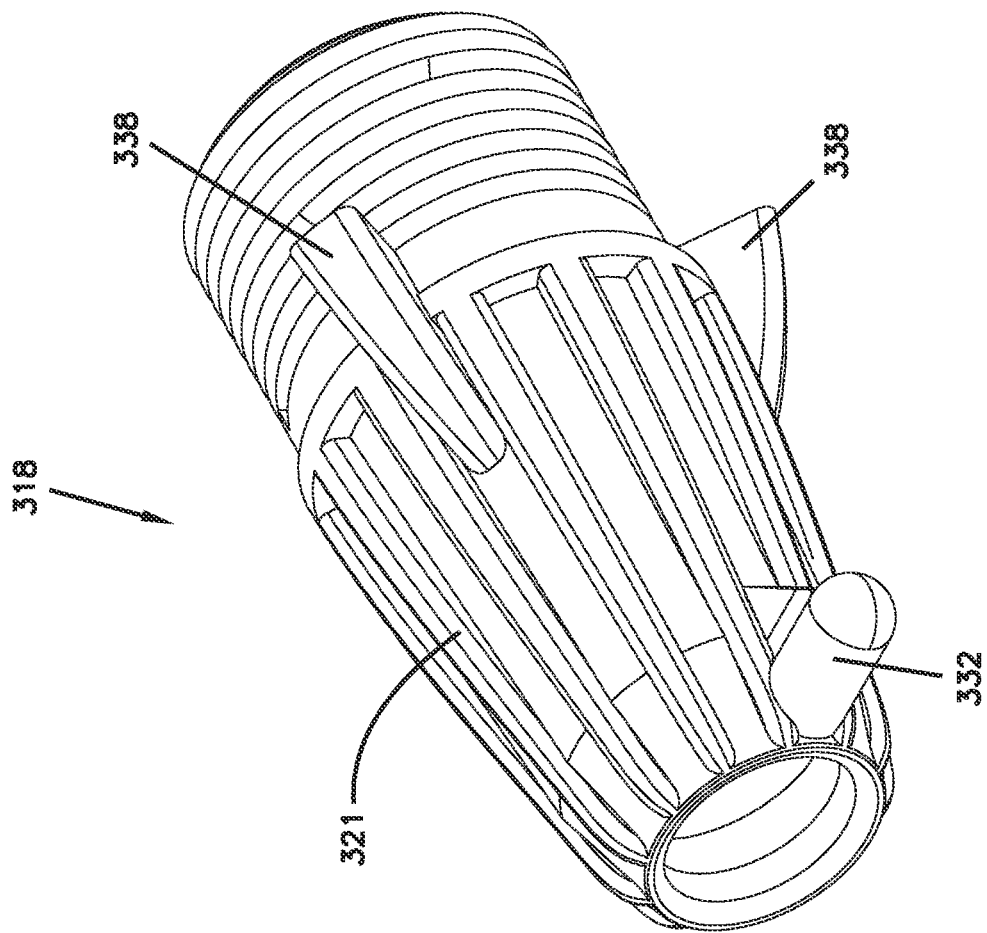
FIG. 28 illustrates a perspective view of a second alignment element, according to one example of the present disclosure.
Figure 29:
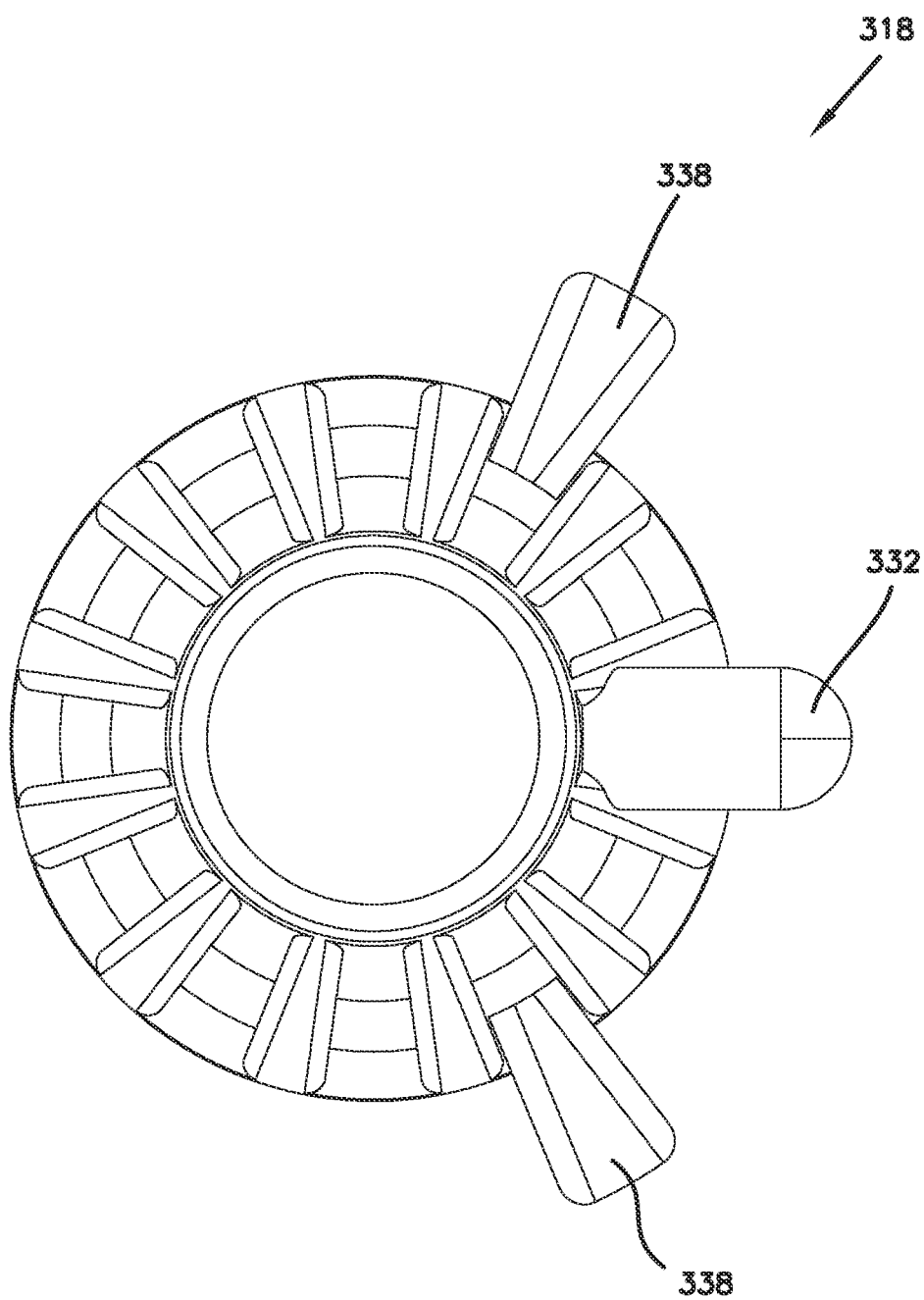
FIG. 29 illustrates a front view of the second alignment element of FIG. 28.

FIGS. 25-27 show a first alignment element 316 according to another embodiment of the present disclosure. FIGS. 28-29 show a second alignment element 318 configured to interface with the first alignment element 316 to form an alignment coupling. The first and second alignment elements 316, 318 are configured to have functional properties that are substantially similar to the first and second alignment elements 116, 118 outlined above. The first and second alignment elements 316, 318 are also constructed out of similar material as the first and second alignment elements 116, 118, as described above.

The first alignment element 316 is configured to be positioned within the faucet body 102. The first alignment element 316 includes a pair of ramps 348 that surround a passageway 319. The passageway 319 is configured to receive the water hose 124. The ramps 348 are configured to aid in positioning a projection 332 of the second alignment element 318. The ramps 348 are configured to extend away from an opening 317 of the first alignment element 316 and intersect within one another at a pocket 350. Such a configuration allows the projection 332 of the second alignment element 318 to interface with, and move along, the ramps 348, eventually being automatically positioned at the pocket 350. When the projection 332 is positioned within the pocket 350, the spray head 104 is in the aligned position.

As seen in FIGS. 28 and 29, the second alignment element 318 has a tapered outer surface 321 to ease insertion into the opening 317 of the first alignment element 316. Like the second alignment element 118 described above, the second alignment element 318 is configured to be positioned around the water hose 124. In some examples, the second alignment element 318 is positioned adjacent the spray head 104. In some examples, the second alignment element 318 is connected to the spray head 104.

The second alignment element 318 includes centering elements 338 that function in a similar way to the centering elements 138 described above and aid in positioning the spray head 104 with respect to the faucet body 102. As shown, the projection 332 extends in a radial direction from the outer surface 321. In some examples, the projection 332 is pin-shaped.

Figure 30:
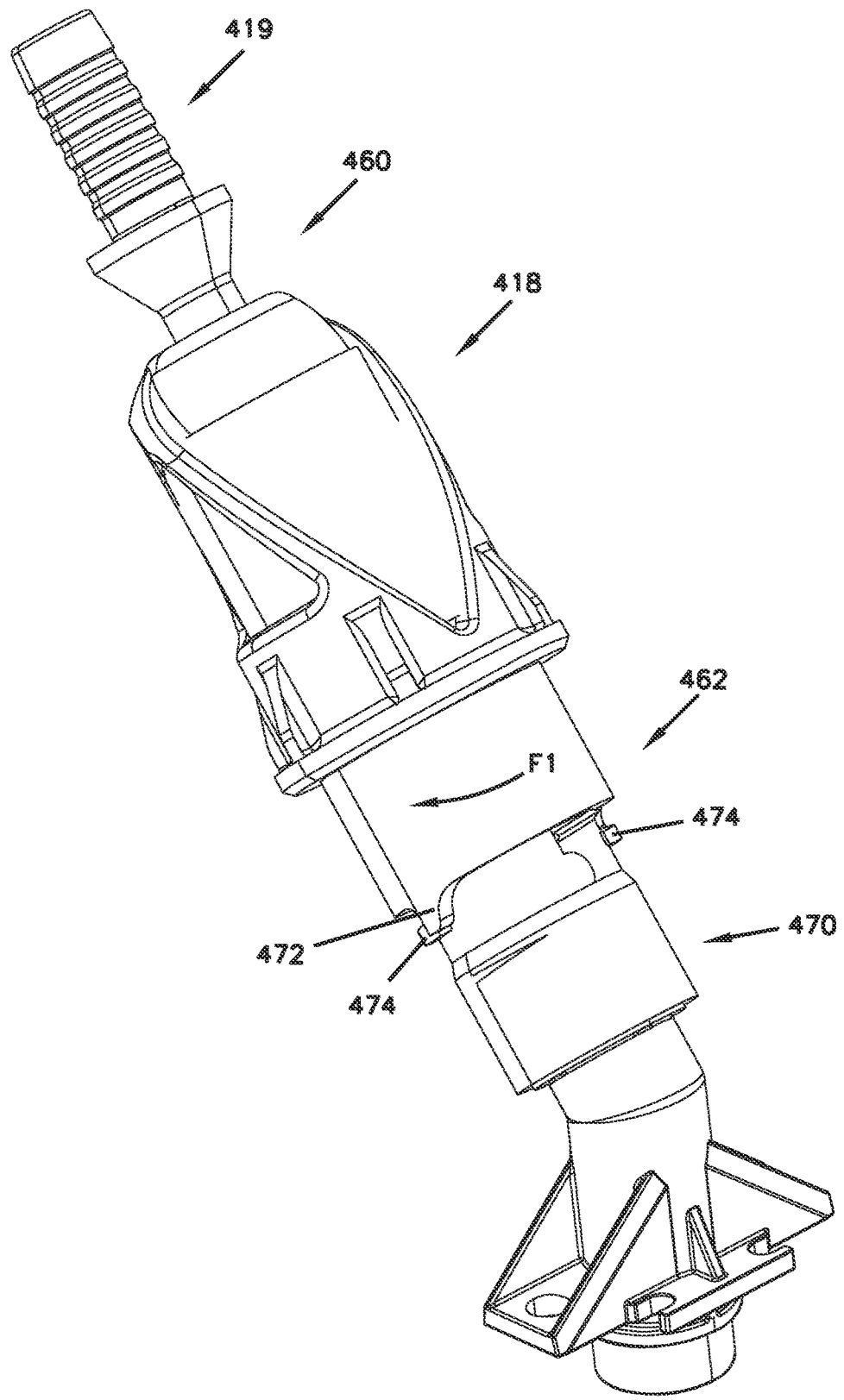
FIG. 30 illustrates a perspective view of a second alignment element, a water hose fitting, and a valve component, according to one example of the present disclosure.

FIG. 30 shows a second alignment element 418, according to another example of the present disclosure. The second alignment element 418 is configured to interface with a first alignment element similar to the first alignment element 116, described above. Accordingly, the second alignment element 418 is configured to have functional properties that are substantially similar second alignment elements 118, 218, and 318 described above. The second alignment element 418 is constructed out of similar material as the first and second alignment elements 116, 118, as described above.

Like the second alignment elements 118, 218, 318 described above, the second alignment element 418 is configured to be positioned around the water hose 124, specifically connected to a water hose fitting 419. In some examples, the second alignment element 418 is positioned adjacent the spray head 104. In some examples, the second alignment element 418 is connected to the spray head 104.

Figure 31:
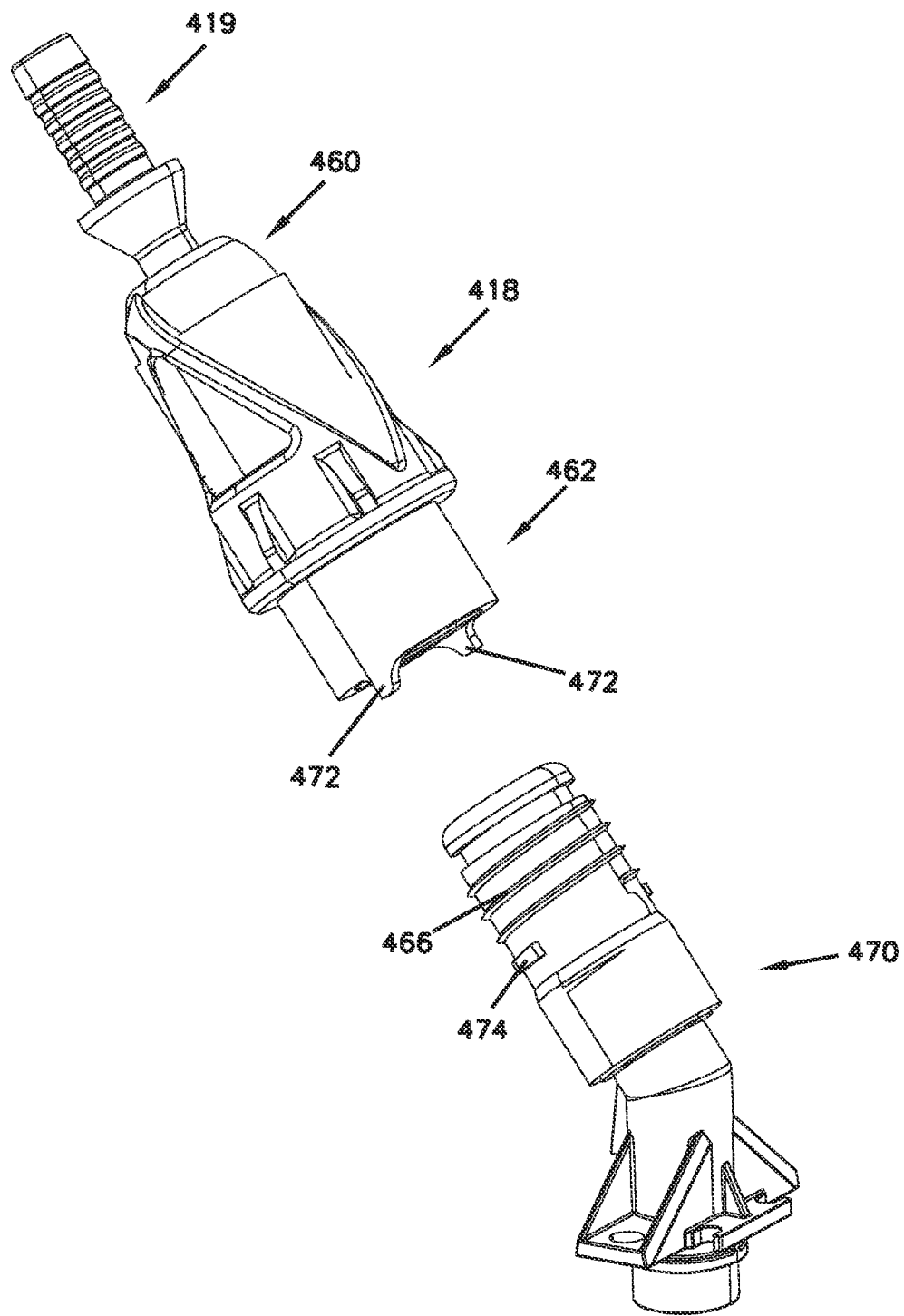
FIG. 31 illustrates a perspective view of the valve component separated from the second alignment element and the water hose fitting of FIG. 30.
Figure 32:
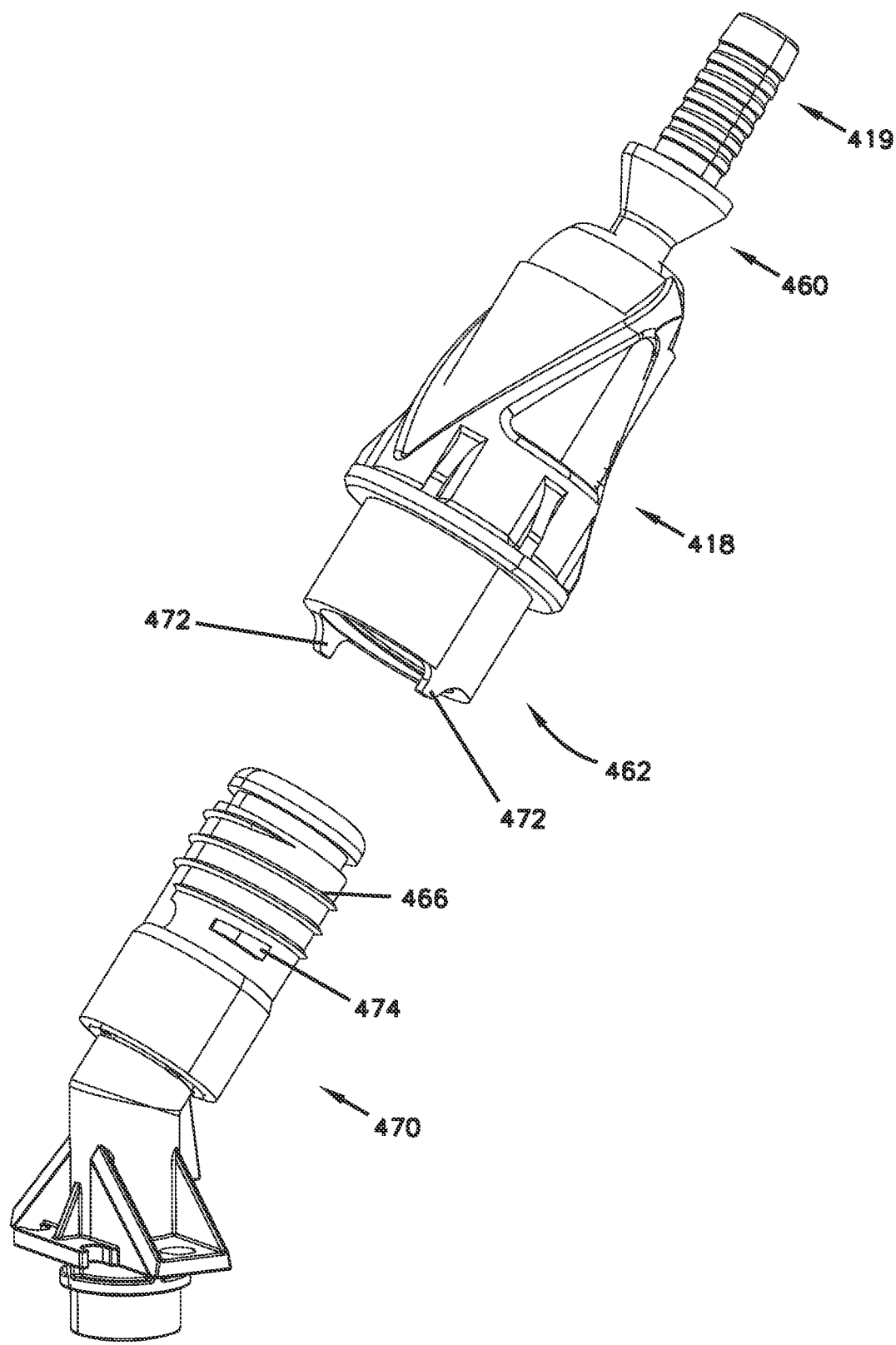
FIG. 32 illustrates another perspective view of the valve component of FIG. 31.

With continued reference to FIG. 30, the second alignment element 418 connected to both the water hose fitting 419 at a first end 460, and a valve component 470 at a second end 462. FIGS. 31 and 32 show the valve component 470 separated from the second alignment element 418.

In some examples, the valve component 470 is a portion of a valve, similar to valve 162, positioned within the spray head 104. In some examples, the valve component 470 passes water from the second alignment element 418 and out of the spray head 104. In some examples, the valve of which the valve component 470 is a part of, is configured to alter the characteristic of the water as it is expelled from the spray head outlet 112. In some examples, the valve of which the valve component 470 is a part of, is configured to not alter the characteristic of the water as it is expelled from the spray head outlet 112.

The second alignment element 418 is connected to the valve component 470 at the second end 462. In some examples, the second end 462 is connected over the valve component 470. In some examples, the second end 462 is connected within the valve component 470. In some examples, the second alignment element 418 is threaded onto the valve component 470. In other examples, the valve component includes a projection, similar to the projections 168 described above, to allow for a bayonet-type connection between the second alignment element 418 and the valve component 470. In the depicted example, the second end 462 is threaded onto the valve component 470 and includes at least one second alignment stop element 472 that is configured to mate with a spray head stop 474 positioned adjacent an attachment portion 466 of the valve component 470.

In the depicted example, the second end 462 of the second alignment element 418 includes more than one second alignment stop element 472. In some examples, the second alignment stop 472 can be one of a projection and a recess. In some examples, the spray head stop 474 can be the other of the projection and recess from the second alignment stop 472 of the second alignment element 418.

When mated together, the stops 472, 474 prevent incorrect assembly of the second alignment element 418 and the valve component 470. As such, the stops 472, 474 ensure consistent assembly of the second alignment element 418 and the valve component 470 because the second alignment element stop 472 bottoms out the rotation in a first direction F1 of the second alignment element 418 with respect to the valve component 470. In some examples, the second alignment stop 472 and the spray head stop 474 rotationally align the second alignment element 418 and the valve component 470. In some examples, the valve component 470 is connected to the spray head 104 in a way to prevent relative rotation between the valve component 470 and the outer housing 160 of the spray head 104. Because of this, if the second alignment element 418 is aligned properly with the valve component 470 when the second alignment element 418 interacts with a first alignment element (e.g., first alignment element 116), the second alignment element 418 consistently properly aligns the spray head 104 with the faucet body 104.

In some examples, the second alignment stop 472 and the spray head stop 474 prevent over-tightening the second alignment element 418 with the valve component 470.

Figure 33:
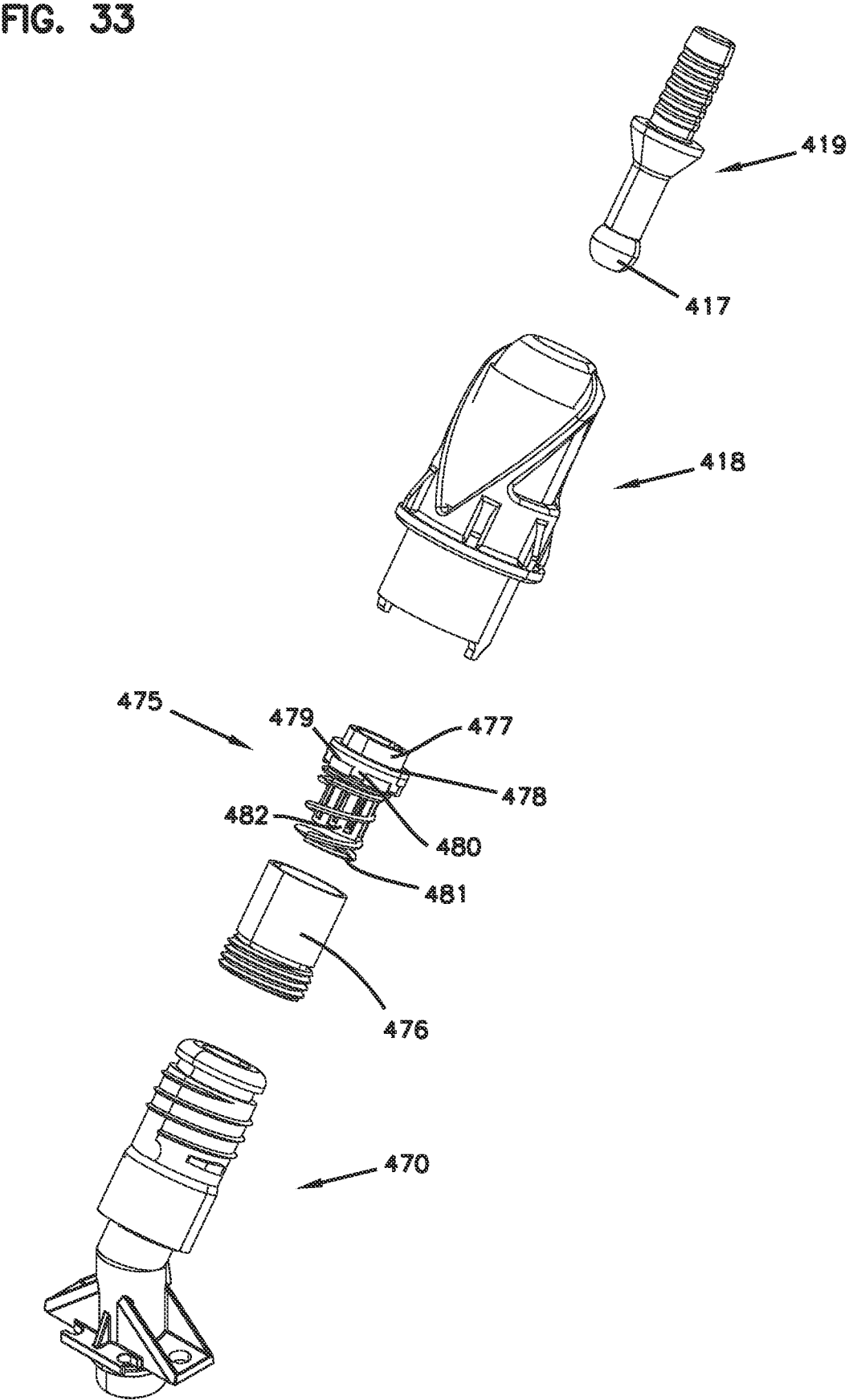
FIG. 33 illustrates an exploded view of the second alignment element, the water hose fitting, and the valve component of FIG. 30.

FIG. 33 shows an exploded view of the water hose fitting 419, the second alignment element 418, and the valve component 470. As shown, the second alignment element 418 includes a seal assembly 475 positioned therein. The seal assembly 475 includes a holder 476, a collar 477, a first seal 478, a second seal 479, a seal holder 480, a spring 481, and a spring cage 482.

The seal assembly 475 is configured to aid in sealing a spherical portion 417 of the water hose fitting 419 within the second alignment element 418. The water hose fitting 419 is allowed to move with respect to the second alignment element 418. Specifically, the spherical portion 417 of the water hose fitting 419 is configured to form a ball joint-like connection with the second alignment element 418.

In one example, when the second alignment element 418 is connected to the spray head 104, the ball joint-like connection with the second alignment element 418 facilitates easy swiveling of the spray head 104 with respect to the water hose 124. In the depicted example, as water pressure increases within the spray head 104, the seal assembly 475 increases the seal force on the water hose fitting 419. As water pressure decreases, the seal assembly 475 decreases the seal force on the water hose fitting 419. It is considered within the scope of the present disclosure that, with the use of devices inside of the spray head 104 (e.g., valves, restrictors, etc.), water pressure within the spray head 104 can be manipulated. In the depicted example, the seal force on the water hose fitting 419 increases when water is dispensed from the spray head 104 and decreases when water is not dispensed from the spray head 104. However, in some examples, the seal force on the water hose fitting 419 decreases when water is dispensed from the spray head 104 and increases when water is not dispensed from the spray head 104.

Figure 34:
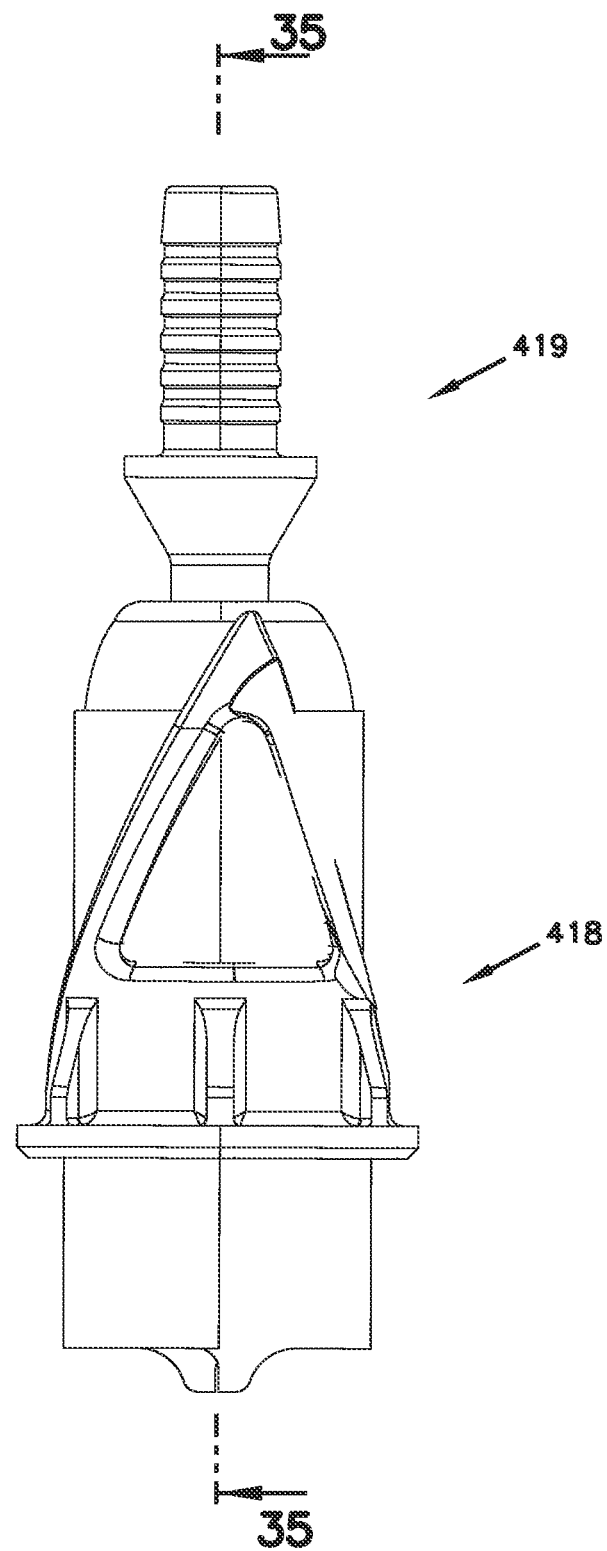
FIG. 34 illustrates a side view of the second alignment element and the water hose fitting of FIG. 30.
Figure 35:
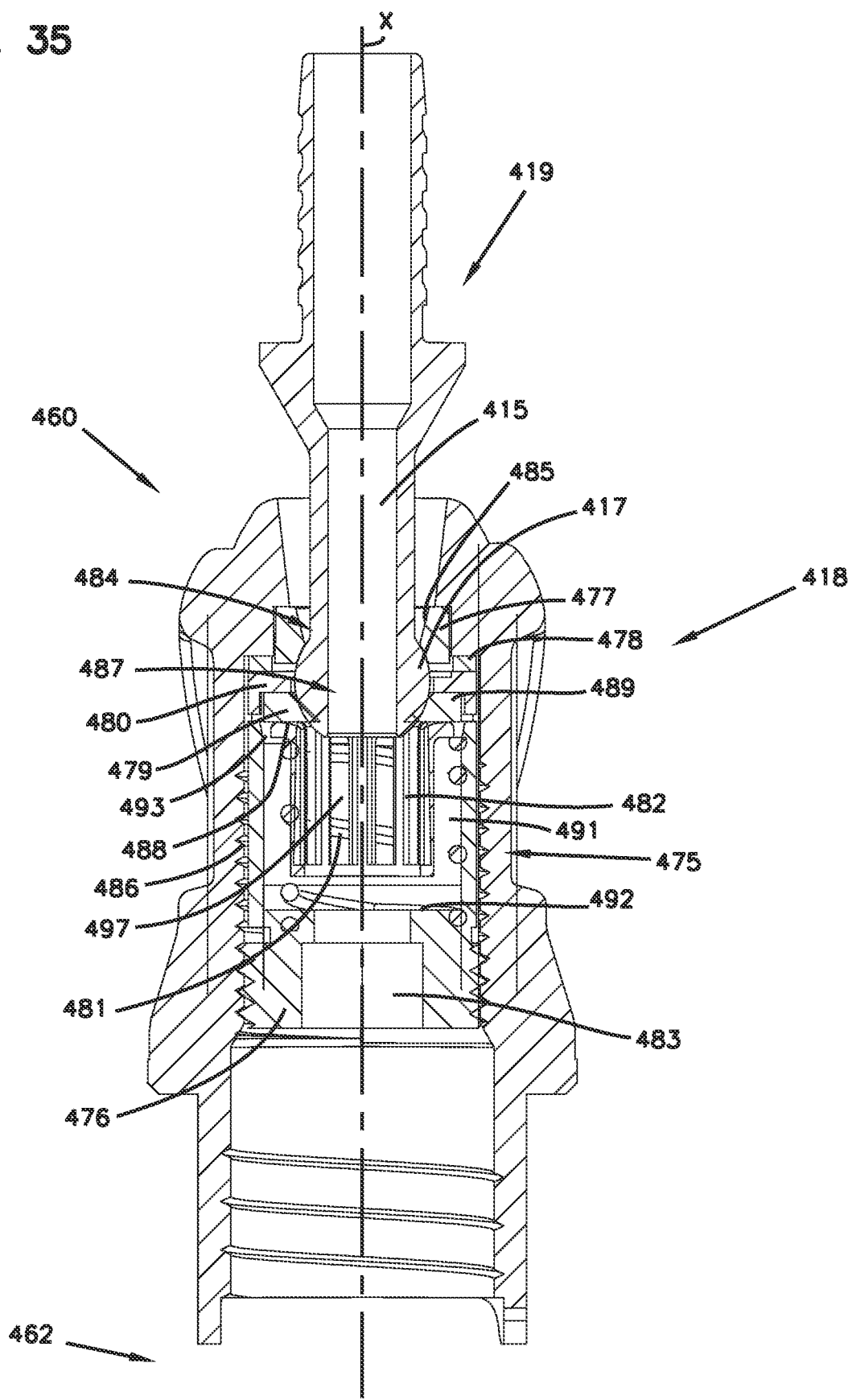
FIG. 35 illustrates a cross-sectional side view of the second alignment element along line 35-35 of FIG. 34.

FIG. 34 shows a side view of the second alignment element 418 and the water hose fitting 419 mated together. FIG. 35 shows a cross-sectional view of the second alignment element 418 and water hose fitting 419 along line 35-35 in FIG. 34.

The spherical portion 417 of the water hose fitting 419 is positioned within the first end of the second alignment element 418 so that a fitting inner passage 415 of water hose fitting 419 communicates with an inner passage 483 of the second alignment element 418.

The holder 476 is configured to be positioned within a main inner cavity 486 of the second alignment element 418. In some examples, the holder 476 can be threaded into the main inner cavity 486. The holder 476 is configured to aid in axially positioning the first seal 478, the second seal 479, the seal holder 480, the spring 481, and the spring cage 482 within the main inner cavity 486. In some examples, the holder 476 includes an interior seal chamber 491 that has a first end 492 and a second end 493. The spring 481 is positioned within the interior seal chamber 491 between first and second ends 492, 493 of the interior seal chamber 491. In some examples, the spring 481 is positioned between the first end 492 of the interior seal chamber 491 and the first seal 478. The second seal 479 and the seal holder 480 are positioned adjacent the second end 493 of the interior seal chamber 491 within the main inner cavity 486.

The collar 477 of the seal assembly 475 surrounds a first end 484 of the spherical portion 417 of the water hose fitting 419. In some examples, the collar 477 has a tapered aperture 485 to facilitate the insertion of the spherical portion 417 therethrough. In some examples, the collar 477 can be a rubber seal. In some examples, the collar 477 can act as a bushing between the second alignment element 418 and the water hose fitting 419.

The first seal 478 is positioned around the spherical portion 417 of the water hose fitting 419, immediately adjacent the seal holder 480 and the collar 477. In some examples, the first seal 478 is positioned within the main inner cavity 486 of the second alignment element 418. In some examples, the main inner cavity 486 houses the holder 476, the first seal 478, the second seal 479, the seal holder 480, the spring 481, and the spring cage 482. In some examples, the main inner cavity 486 has a consistent diameter along its length to facilitate the installation of the seal assembly 475 within the second alignment element 418. In some examples, the first seal 478 is a rubber seal.

The second seal 479 is positioned around a second end 487 of the spherical portion 417 of the water hose fitting 419. Specifically, the second seal 479 defines an aperture 490 that is sized and shaped to receive the second end 487 of the spherical portion 417. The second seal 479 is positioned immediately adjacent the seal holder 480 and the spring cage 482. The second seal 479 is rotationally captured by the seal holder 480 and is configured to be compressed by a force received at a first axial side 488, opposite a second axial side 489 that faces the seal holder 480. As the force received at the first axial side 488 fluctuates, the second seal 479 moves axially along a longitudinal axis X of the seal assembly 475. In some examples, the second seal 479 does not contact the main inner cavity 486 when there is no force received at the axial side 488. In some examples, the aperture 490 of the second seal 479 travels toward the first end 484 of the spherical portion 417 when a force is received at the axial side 488, thereby forming a tighter seal around the spherical portion 417, due to the spherical configuration of the spherical portion 417 of the water hose fitting 419. In some examples, the second seal 479 is a rubber seal.

The seal holder 480 is configured to interlock and mate with the second seal 479 to prevent relative rotation between the seal holder 480 and the second seal 479. In some examples, the seal holder 480 is of a different material than the second seal 479. In some examples, the seal holder 480 is a rigid material, such as plastic.

As noted above, the spring 481 is positioned within the interior seal chamber 491 of the holder 476. The spring 481 is positioned between the first end 492 of the seal chamber 491 and the second seal 479. In some examples, the spring 481 is also positioned around a cage portion 494 of the spring cage 482 and in contact with a flange 495 of the spring cage 482. In some examples, the spring 481 is configured to exert a predetermined force at the first axial side 488 of the second seal 479. As depicted, the spring 481 is a compression spring. The spring 481 can be a variety of different types of springs, for example, a helical spring, a wave spring, a conical spring, a disc spring, etc.

The spring cage 482 is configured to be movably positioned within the interior seal chamber 491. The spring cage 482 includes the cage portion 494 and the flange 495. In some examples, the seal assembly 475 does not include a spring cage 482. In some examples, the spring cage 482 is constructed of a rigid material.

The cage portion 494 is positioned inside the spring 481 and allows water to flow axially and radially through the cage portion 494 and freely within the seal chamber 491. In the depicted example, the cage portion 494 is cylindrical and includes a plurality of slots 497 to allow for radial water flow therethrough. In some examples, only axial flow through the cage portion is permitted. In some examples, the cage portion 494 and the flange 495 are separate pieces. In some examples, the cage portion and flange 495 are monolithically formed.

The flange 495 is positioned between the spring 481 and the second seal 479. The flange 495 is generally circular and dispenses a force to the second seal 479 from the seal chamber 491. In some examples, the seal assembly 475 only includes the flange 495 and not the cage portion 494. In some examples, the flange 495 is a washer.

Figure 38:
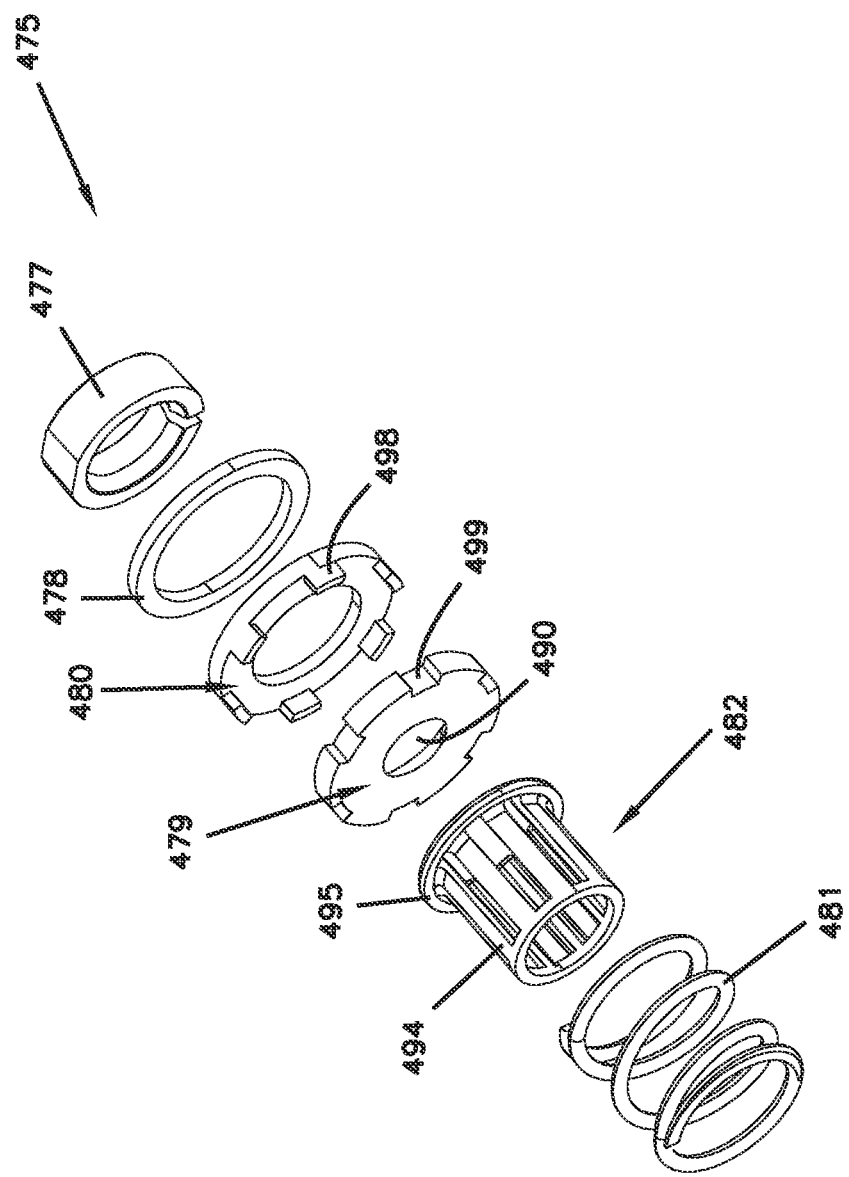
FIG. 38 illustrates an exploded view of the portion of the seal assembly of FIG. 36.

FIGS. 36 and 37 show perspective views of a portion of the seal assembly 475, and FIG. 38 shows an exploded view of a portion of the seal assembly 475. As shown, the second seal 479 and the seal holder 480 interlock with one another to prevent relative rotation therebetween. In the depicted example, the seal holder 480 includes a plurality of projections 498 that are received by a plurality of recesses 499 of the second seal 479. It is considered within the scope of the present disclosure that the seal holder 480 and second seal 479 can interlock with each other in a variety of ways.

Figure 39:
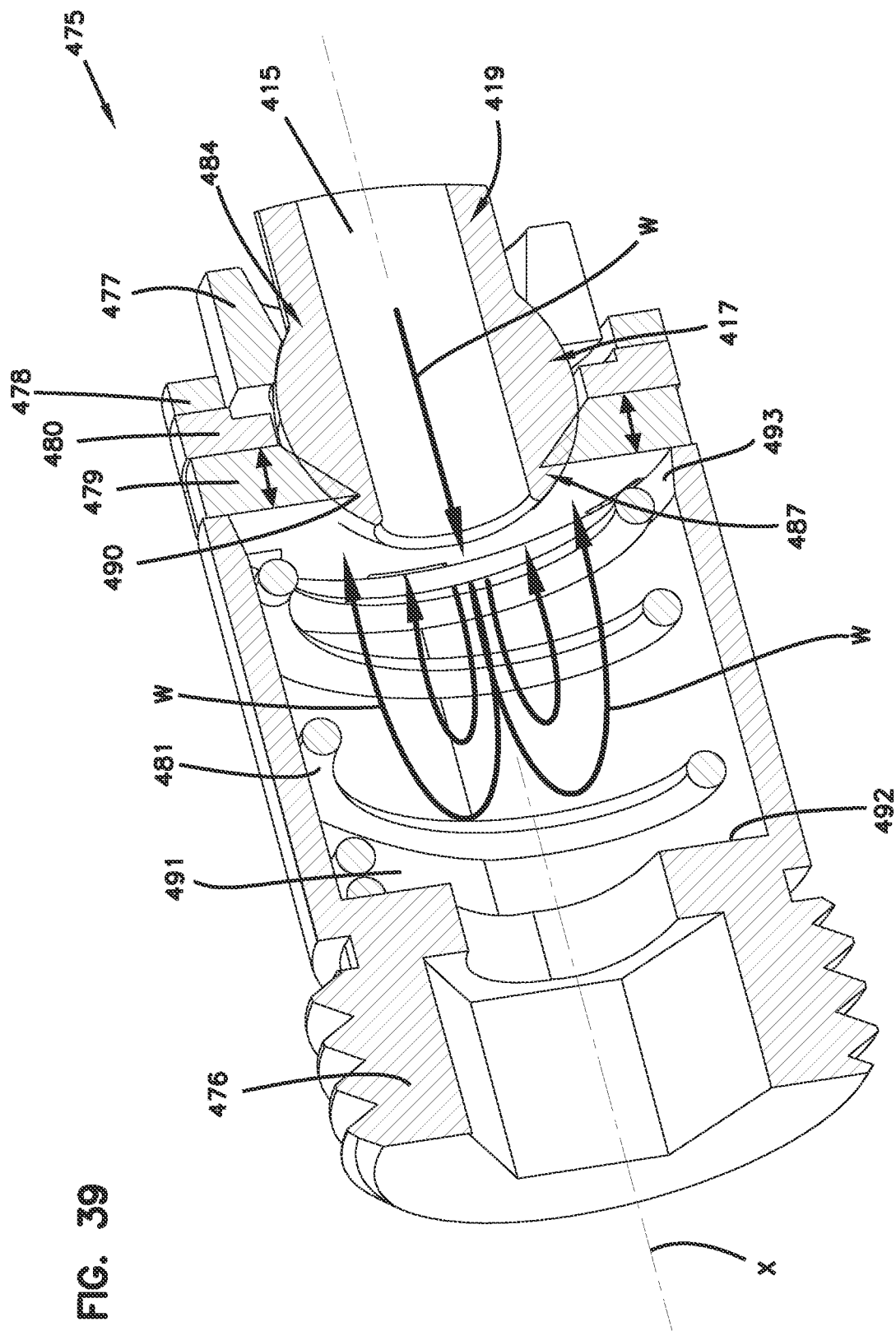
FIG. 39 illustrates a schematic perspective view of a seal assembly, according to one example of the present disclosure.

FIG. 39 is a schematic depiction of the seal assembly 475. Water is indicated by arrows W. In some examples, the water pressure within the seal chamber 491 exerts a force on the spring cage 482, thus exerting a force on the second seal 479 via the flange 495. Pressurized water W within the seal chamber 491 exerts a force on the second seal 479, thereby axially moving the second seal 479 toward the first seal 478. The force exerted on the second seal 479 by the pressurized water W is in addition to the predetermined amount of force exerted by the spring 481 on the second seal 479. The movement of the second seal 479 toward the first seal 478 tightens the connection of the aperture 490 around the second end 487 of the spherical portion 417 of the water hose fitting 419, thus automatically increasing the seal around the water hose fitting 419. As water pressured within the seal chamber 491 decreases, the force exerted on the second seal 479 is reduced, thereby allowing the second seal 479 to move away from the first seal 478, thus loosening the connection of the aperture 490 around the second end 487 of the spherical portion 417 of the water hose fitting 419 and automatically decreasing the seal around the water hose fitting 419. In some examples, the lowest force exerted on the second seal 479 is the force exerted by the spring 481. This occurs when there is no force exerted by the pressurized water W within the seal chamber 491. In some examples, low flowing water may only exert a low amount of force within the seal chamber 491 due to the low water pressure associated with the low flowing water. The spring 481 ensures that a minimum force is always exerted on the second seal 479 so that a minimum seal can be formed around the water hose fitting 419 even in low flowing water conditions. In the depicted example, water W enters the seal chamber 491 via the fitting inner passage 415. If the spray head 104 is dispensing water, the pressurized water W travels into the seal chamber 491, increasing the seal around the water hose fitting 491, through the seal assembly 475, and out of the spray head 104. If water is not being dispensed from the spray head 104, water W does not pass through the seal assembly 475 and minimal water pressure exists within the seal chamber 491.

Figure 40:
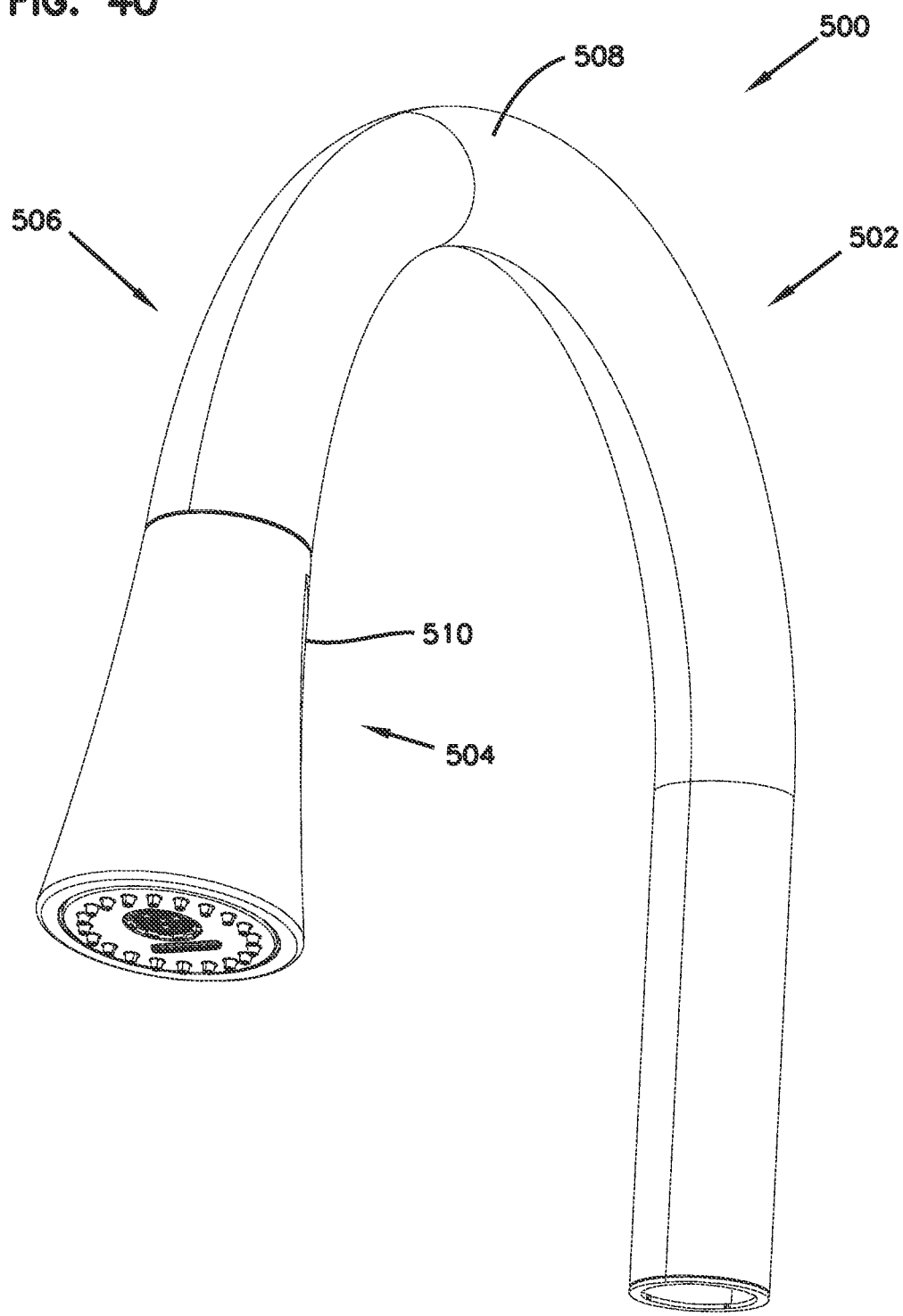
FIG. 40 illustrates a perspective view of a faucet with a spray head in an aligned position, according to one embodiment of the present disclosure.
Figure 41:
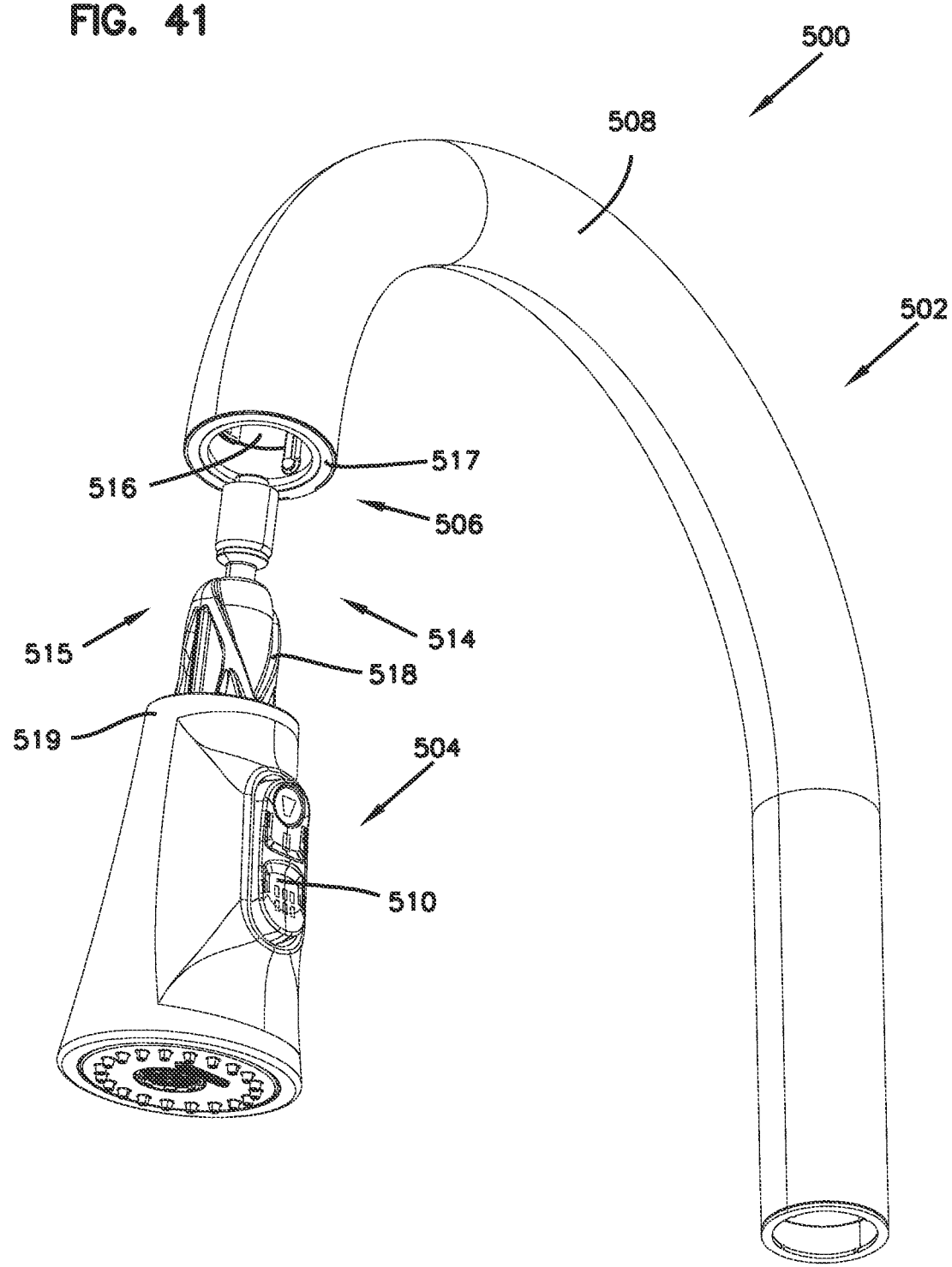
FIG. 41 illustrates a perspective view of the faucet of FIG. 40 with the spray head in an extended, misaligned position, excluding a water hose.
Figure 42:
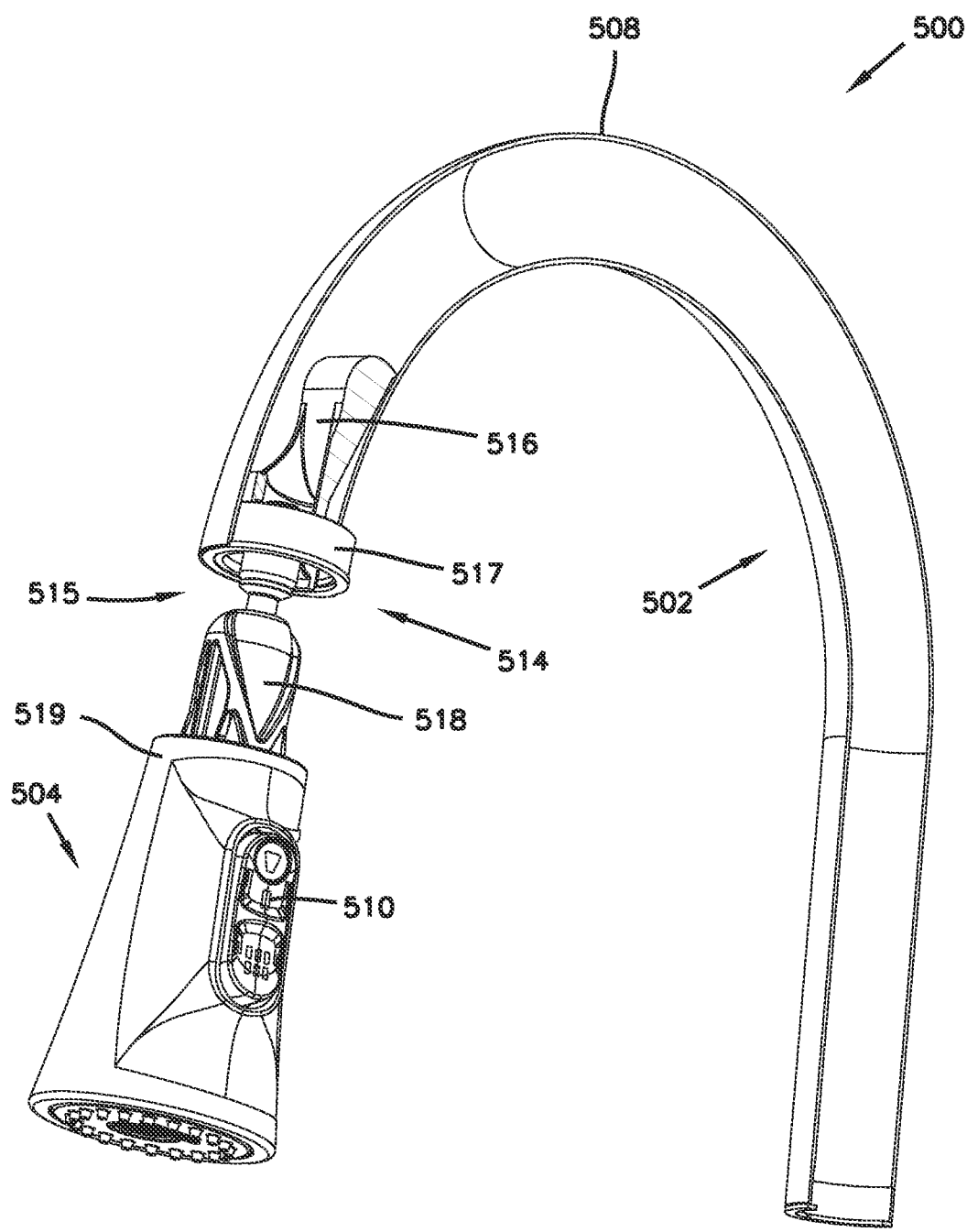
FIG. 42 illustrates a perspective schematic sectional view of the faucet of FIG. 40 with the spray head in an extended, misaligned position.
Figure 43:
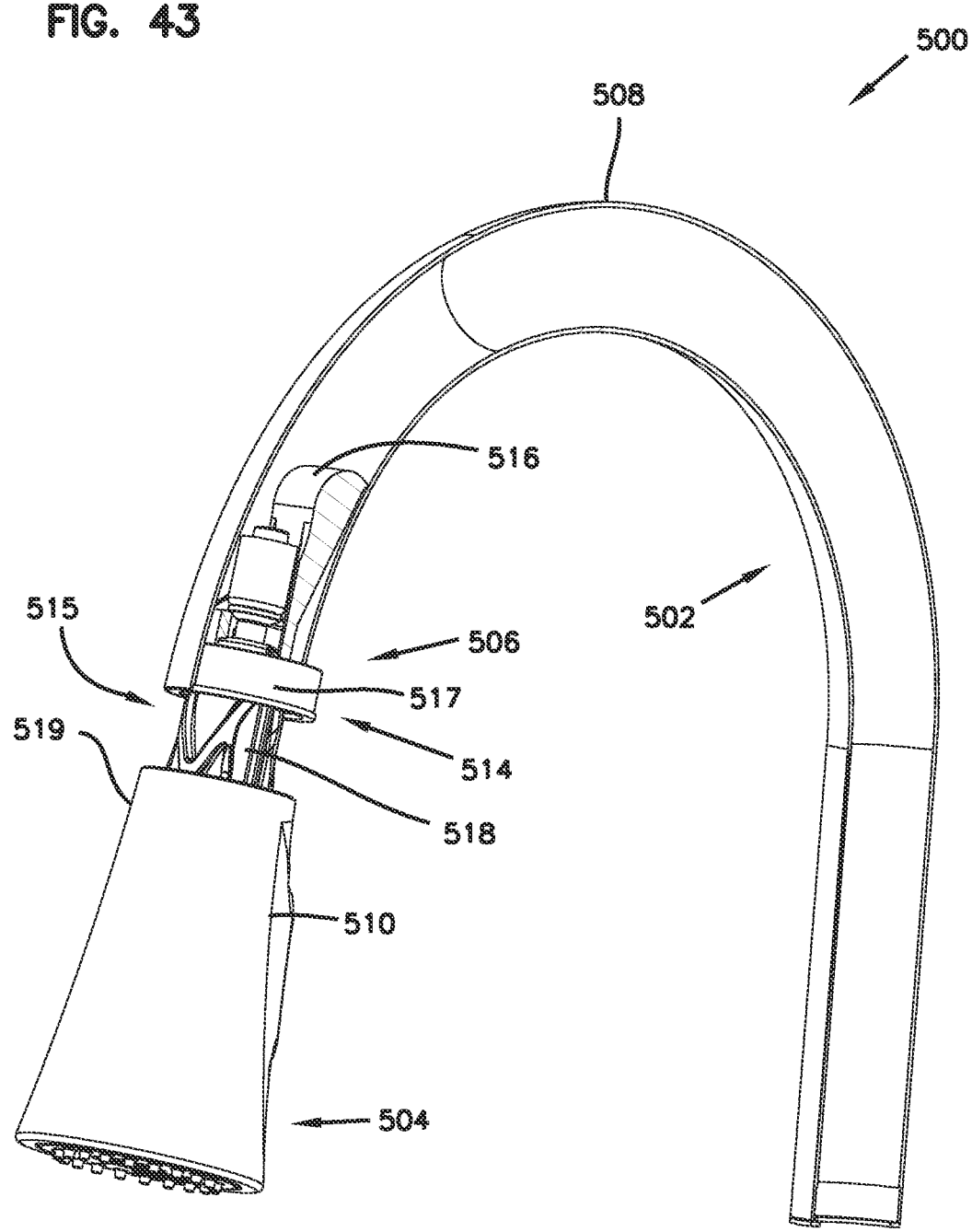
FIG. 43 illustrates another perspective schematic sectional view of the faucet of FIG. 40 with the spray head in an extended, misaligned position.
Figure 44:
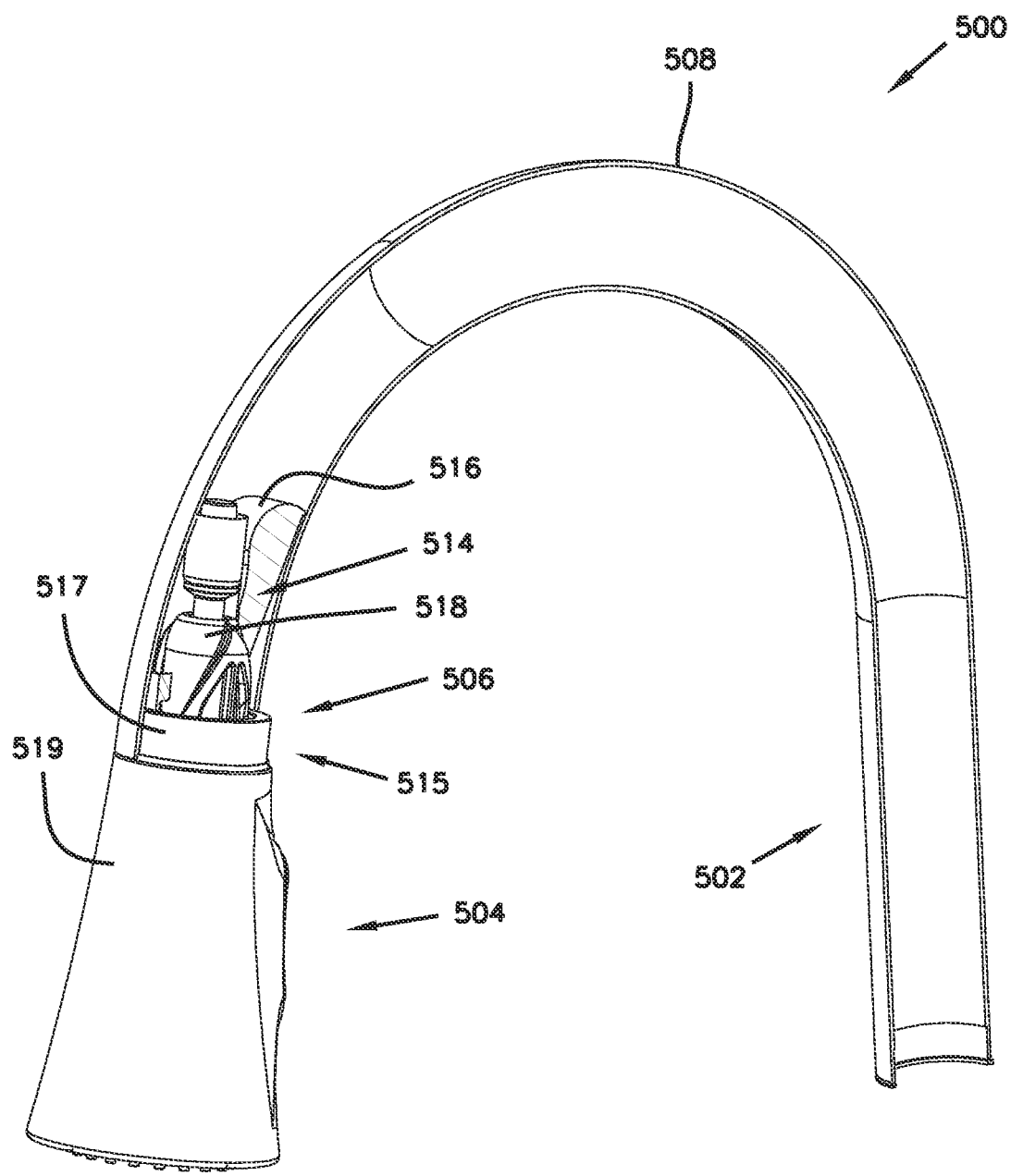
FIG. 44 illustrates a perspective schematic sectional view of the faucet of FIG. 40 with the spray head in the aligned position.

FIG. 40 shows a faucet 500 including a faucet body 502 and a faucet spray head 504 that is detachable from a faucet body outlet 506 of the faucet body 502. The faucet 500, and specifically the spray head 504 and the faucet body 502, is substantially similar to the faucet 100, and specifically the spray head 104 and the faucet body 102 described above. As shown in FIG. 40, the spray head 504 is docked with, and immediately adjacent, the faucet body 502, in the retracted position. The spray head 504 is movable away, in the extended position, from the faucet body 502 so as to allow the user the ability to manipulate the spray head 504 during use.

Although the faucet 500 can be a pull-down kitchen faucet, this disclosure encompasses other types of faucets, including but not limited to, pull-out faucets. Although this disclosure will be discussed with regard to a kitchen faucet for purposes of example, the system described herein could be implemented in any type of pull-down faucet and/or a pull-out faucet, including a side auxiliary spray faucet. In some examples, the faucet 500 is a showerhead in a shower. In some examples, the faucet 500 is any fluid dispensing device that is configured to dispense fluid therefrom.

As noted above, the spray head 504 is detachable so that it can be undocked from the faucet body 502 to allow for maneuverability by the user to aim the spray head 504. In some examples, the operation of a user input 510 can facilitate the toggling of a valve positioned within the spray head 504. The user input 510 can toggle characteristics of the expelled water, such as, but not limited to, volume and/or temperature. In some examples, the user input 510 is one of a button, a touch sensitive surface, or the like.

The spray head 504 has at least one aligned position when docked with the faucet body 502. The spray head 504 can have multiple aligned positions. In some examples, the spray head 504 has two aligned positions, approximately 180 degrees apart from one another around an elongate axis of the spray head 504. An aligned position is a position that the spray head 504 returns to automatically when spray head 504 is docked with the faucet body 502. The aligned position can be a variety of different positions depending on the aesthetics of the faucet 500, as well as the particular use of the faucet 500. In the depicted example, when in the aligned position, a user input 510 is positioned facing the faucet body 502. In some examples, when in the aligned position, the user input 510 is positioned facing the left, right, or away from the faucet body 502.

FIGS. 41-44 shows one example of the movement of the spray head 504 as it is guided to the aligned position. Such alignment is facilitated by an alignment coupling 514, which includes a first alignment element 516 and a second alignment element 518. The alignment coupling 514 is substantially similar to the alignment couplings described above. In the depicted example, the second alignment element 518 is movable with respect to the first alignment element 516.

The first and second alignment elements 516, 518 can be positioned at a variety of different locations on the faucet 500. In the illustrative example shown, the first alignment element 516 is connected to the faucet body 502 and the second alignment element 518 is connected to the spray head 504. In some examples, the second alignment element 518 is positioned around a water hose (not shown) of the faucet 500. In other examples, the second alignment element 518 is attached to a water hose of the faucet 500. In some examples, the first and second alignment elements 516, 518 are integrally formed in the faucet body 502 and spray head 504. In some examples, the first and second alignment elements 516, 518 are separate parts from the faucet body 502 and spray head 504.

The spray head 504 is retained immediately adjacent the faucet body 502 by way of a retention coupling 515. In some examples, the alignment coupling 514 aligns the spray head 504 and the retention coupling 515 retains the spray head 504 in the aligned position. In some examples, the retention coupling 515 includes a first retention element 517 connected to the faucet body 502, and a second retention element 519 connected to the faucet spray head 504. In some examples, the retention coupling 515 is separate from the alignment coupling 514. In other examples still, at least one of the first or second retention elements 517, 519 is a magnet.

Figure 45:
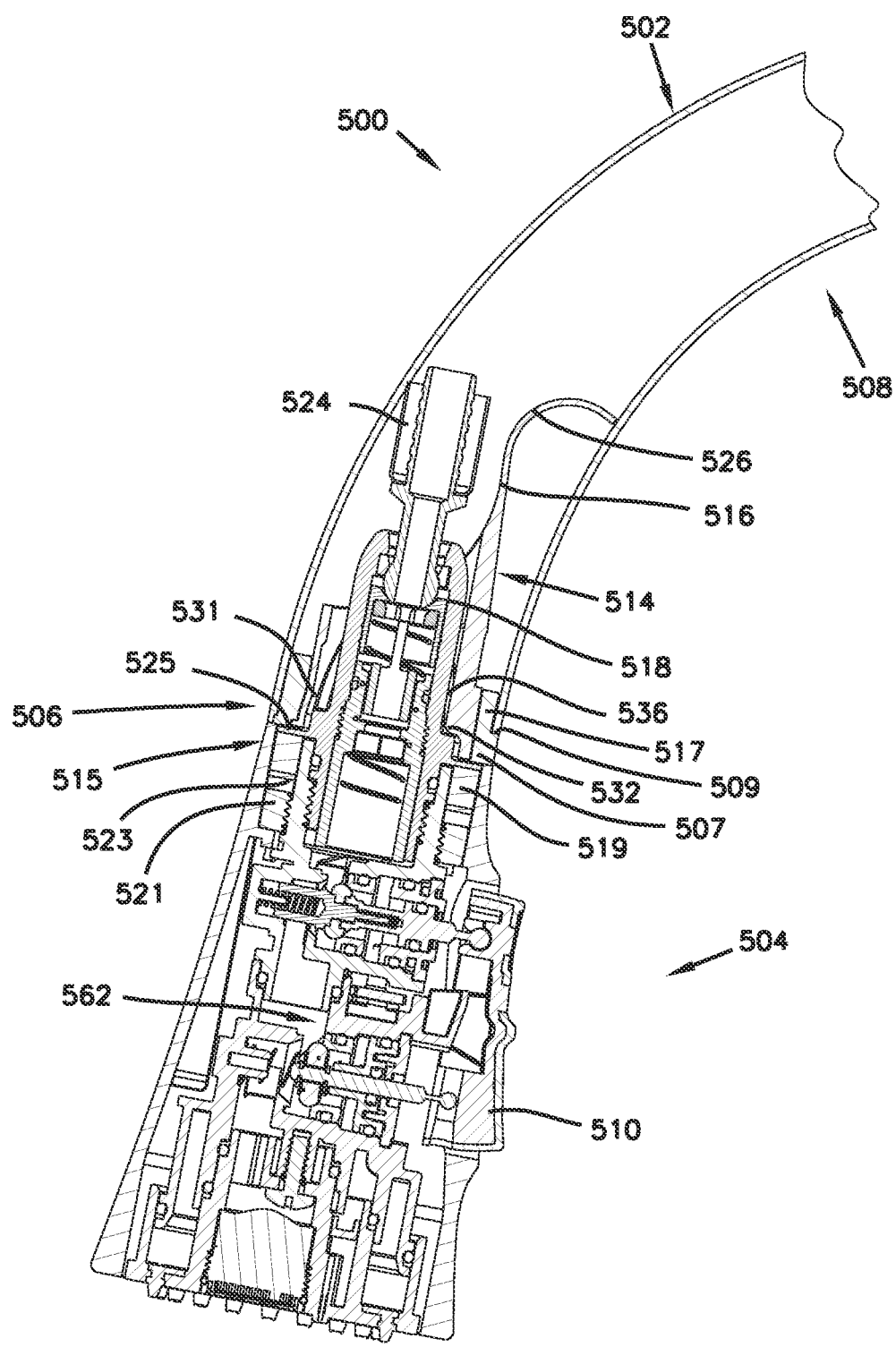
FIG. 45 illustrates a side cross-sectional view of the faucet of FIG. 40 with the spray head in the aligned position.

FIG. 45 shows a cross-sectional view of the faucet 500 with the spray head 504 in the aligned position. FIG. 45 also shows a water hose fitting 524 movably attached to the spray head 504 and positioned within the faucet body 502. The water hose fitting 524 can be attached to a water hose that is positioned within the faucet body 502 and movable therein.

In the depicted example, the first alignment element 516 is positioned within the faucet body 502, adjacent the outlet 506. In the depicted example, the first retention element 517 is positioned within the faucet body 502, and the second alignment element 518 is positioned at least partially within the spray head 504. In the depicted example, the second retention element 519 is positioned within the spray head 504, adjacent the second alignment element 518.

The faucet 500 is shown to include a valve 562 in the spray head 504. In some examples, the valve 562 can be connected to, and operable by, the user input 510.

In the depicted example, the first alignment element 516 includes a ring 531 and a tongue 526, the tongue 526 extending in an axial direction from the ring 531, adjacent the outlet 506 of the faucet body 502. In some examples, the ring 531 includes a projection 532 extending radially inward therefrom within the outlet 506 of the faucet body 502. In the depicted example, the projection 532 is positioned at a bottom side of the first alignment element 516; however, it is considered within the scope of the present disclosure that the projection 532 can be positioned in a variety of locations.

The first retention element 517 is positioned adjacent the outlet 506 of the faucet body 502. In some examples, the first retention element 517 includes a projection 507 that mates with a corresponding recess 509 on the faucet body 502 to reduce relative movement between the faucet body 502 and the first retention element 517. It is considered within the scope of the present disclosure, that the first retention element 517 can have a recess that can mate with a projection of the faucet body 502. In some examples, the first retention element 517 is fixed to the faucet body 502 by way of a fastener, such as, but not limited to, at least one screw, bolt, adhesive, and/or the like.

Referring still to FIG. 45, shows the second alignment element 518 threaded into the spray head 504. In the depicted example, the second alignment element 518 is positioned around the water hose fitting 524. The second alignment element 518 includes an alignment feature that includes groove 536 positioned at the periphery of the second alignment element 518. The groove 536 is configured to interface with the projection 532 of the first alignment element 516 so as to guide the spray head 504 toward the aligned position. In some examples, the second alignment element 518 has a plurality of grooves 536 that are each configured to interface with the projection 532 of the first alignment element 516 so as to guide the spray head 504 toward the a plurality of aligned positions.

The second retention element 519 is positioned in the spray head 504 and partially secured within the spray head 504 by the second alignment element 518. In the depicted example, the second retention element 519 is positioned within the spray head 504 by way of a flange 525. As shown, when the faucet body 502 and faucet spray head 504 are immediately adjacent one another, the flange 525 is positioned between the first retention element 517 and the second retention element 519. The flange 525 can be a variety of shapes (e.g., thicknesses) to adjust for variability in the size, strength, and position of the first and second retention elements 517, 519. In some examples, when the faucet body 502 and faucet spray head 504 are immediately adjacent one another, the second retention element 519 is partially positioned within the first retention element 517 within the faucet body 502. In it is considered within the present disclosure that the first and second retention element 517, 519 can be positioned in a variety of different ways to retain the faucet body 502 and faucet spray head 504 immediately adjacent one another.

In the depicted example, the second retention element 519 is a magnet. In some examples, the magnet is a neodymium magnet. In some examples, the second retention element 519 is coated with a coating, such as an epoxy. In some examples, the coating provides the second retention element 519 with at least some corrosion resistance. In some examples, second retention element 519 is partially held in place in the spray head 504 by a fastener, such as, but not limited to, at least one screw, bolt, adhesive, and/or the like. In some examples, the second retention element 519 is epoxied into the spray head 504. In some examples, the second retention element 519 is not a complete ring. In some examples, the second retention element 519 includes multiple pieces. It is considered within the scope of the present disclosure that the second retention element 519 can be a variety of different shapes, sizes, and materials.

The second retention element 519 and the first retention element 517 are attracted to one another to retain the spray head 504. The second retention element 519 is positioned at least partially between the second alignment element 518 and a positioning ring 521. In some examples, a bumper 523 is positioned between the second retention element 519 and the positioning ring 521 so that the bumper 523 at least partially prevents hard contact between the second alignment element 518 and the positioning ring 521. In some examples, the second retention element 519 is a brittle magnet and the bumper 523 reduces hard contact between the second retention element 519 and the positioning ring 521. The bumper 523 can be constructed of a variety of materials such as, but not limited to, a rubber, a foam tape, or other like material.

In some examples, the positioning ring 521 is configured to at least partially position the second retention element 519 within the spray head 504. In some examples, the positioning ring 521 has an integral bumper configured to interface with the second retention element 519. In some examples, the positioning ring 521 is threaded into the spray head 504. In some examples, the positioning ring 521 is metal. In some examples, the positioning ring 521 is a plastic material.

Figure 46:
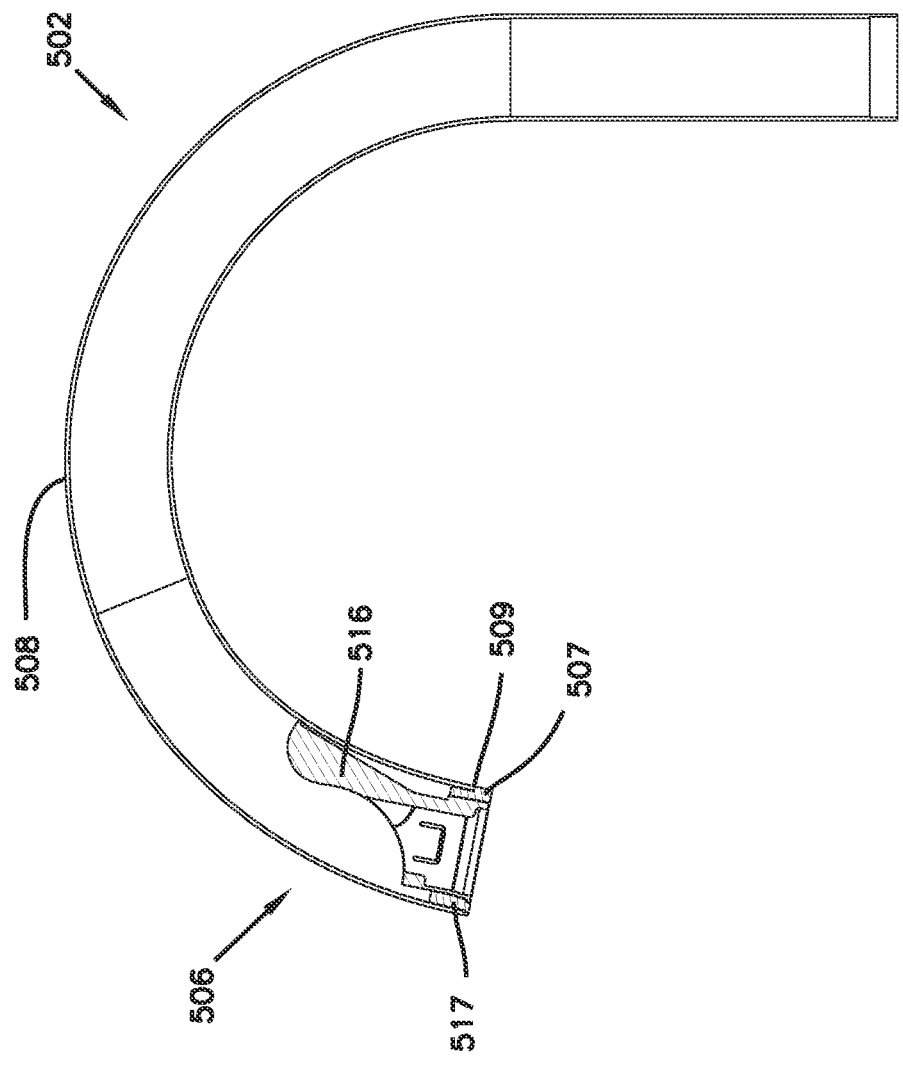
FIG. 46 illustrates a side cross-sectional view of a faucet body of the faucet of FIG. 40.

FIG. 46 shows the first alignment element 516 and the first retention element 517 positioned within the faucet body 502. In some examples, at least one of the first alignment element 516 or the first retention element 517 are positioned at least partially between the outlet 506 and an apex of a neck 508.

In some examples, the first retention element 517 is fixed within the outlet 506 of the faucet body 502. The first retention element 517 can be integral with the faucet body 502. In some examples, the first retention element 517 is integral with the first alignment element 516. In other examples, the first retention element 517 is fixed to the faucet body 502 by way of a press fit. In other examples still, the first retention element 517 is fixed to the faucet body 502 by way of brazing, welding, or the like. The first retention element 517, in some examples, at least partially secures the first alignment element 516 in the faucet body 502. As shown in the depicted example, the first alignment element 516 is positioned within, and engaged with, the first retention element 517. In some examples, the first retention element 517 is a metal ring attached into the faucet body 502. In some examples, the first retention element 517 is a stainless steel ring welded into the faucet body 502. In some examples, the first retention element 517 is a 2205 magnetic grade stainless steel ring welded into the faucet body 502. In some examples, the first retention element 517 is an insert that is not a complete ring. In some examples, the first retention element 517 includes multiple pieces. It is considered within the scope of the present disclosure that the first retention element 517 can be a variety of different shapes, sizes, and materials.

In some examples, the first alignment element 516 is at least partially constructed from a plastic. In some examples, the first alignment element 516 is clipped at least partially behind the first retention element 517 within the outlet 506.

Figure 47:
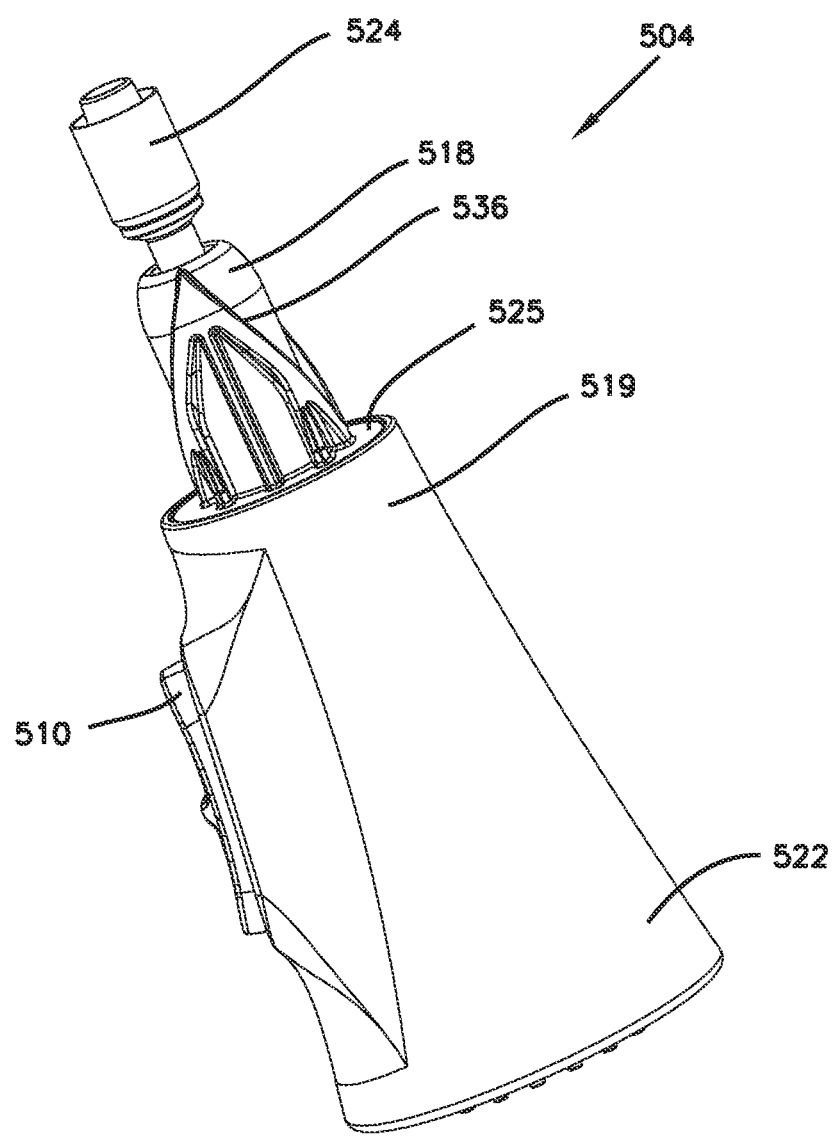
FIG. 47 illustrates a perspective view of a spray head and a second alignment element of the faucet of FIG. 40.
Figure 48:
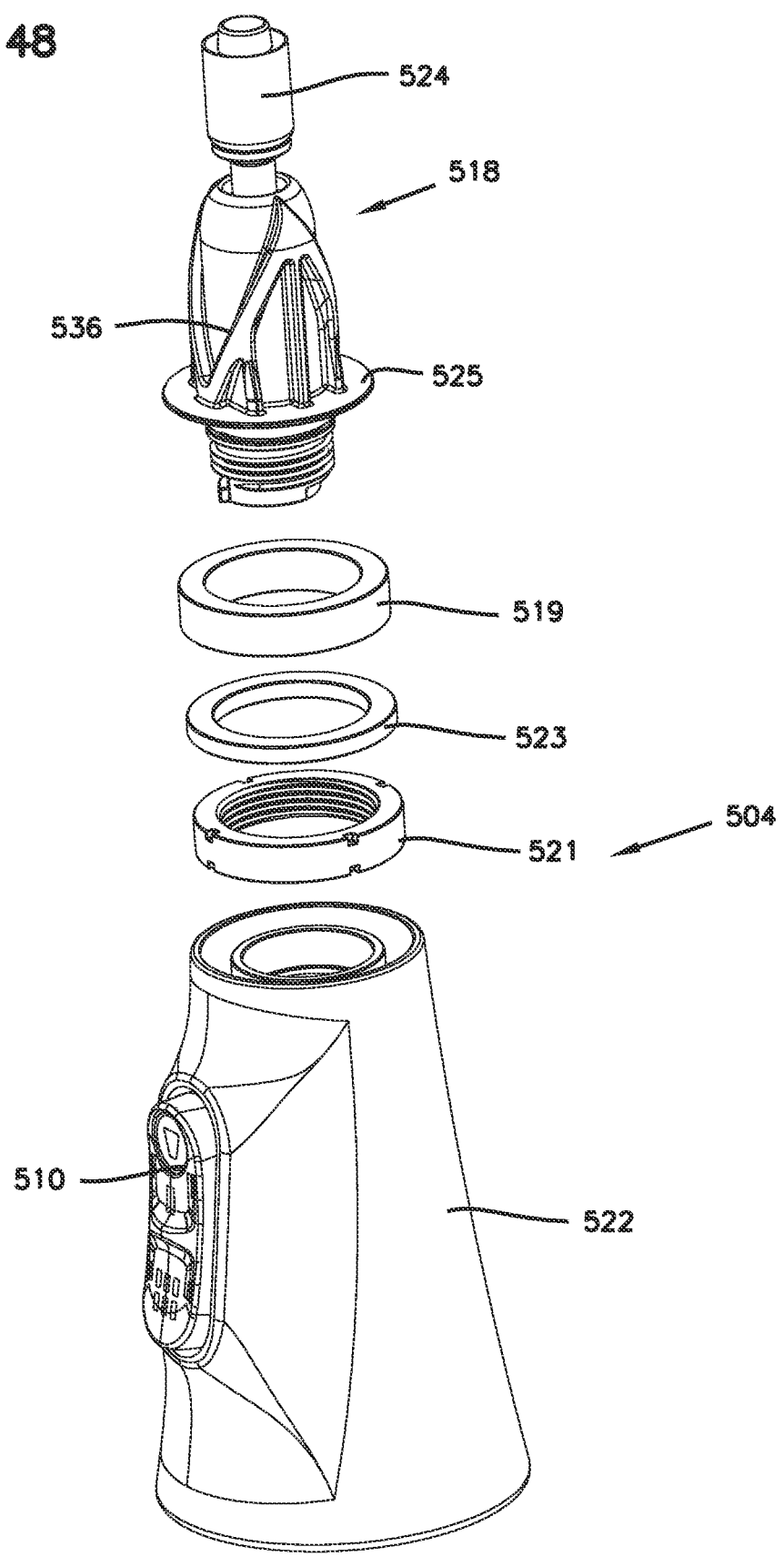
FIG. 48 illustrates a perspective partially exploded view of the spray head and the second alignment element of FIG. 47.

FIG. 47 shows the second alignment element 518 mounted to the spray head 504. FIG. 48 shows the second alignment element 518, second retention element 519, bumper 523, and positioning ring 521 spaced away from the spray head 504. In some examples, the second alignment element 518 is fixed to the spray head 504 to prevent relative movement therebetween. In some examples, the second alignment element 518 is mounted adjacent to the spray head 504. In some examples, the second alignment element 518 is positioned around the end of the water hose fitting 524. In some examples, the spray head 504 includes a cover 522.

The flange 525, attached to the second alignment element 518 in the depicted examples, helps to secure the second retention element 519 within the spray head 504. In some examples, the flange 525 is separate from the second alignment element 518. In some examples, the flange 525 acts as a buffer between the first retention element 517 and the second retention element 519.

Figure 49:
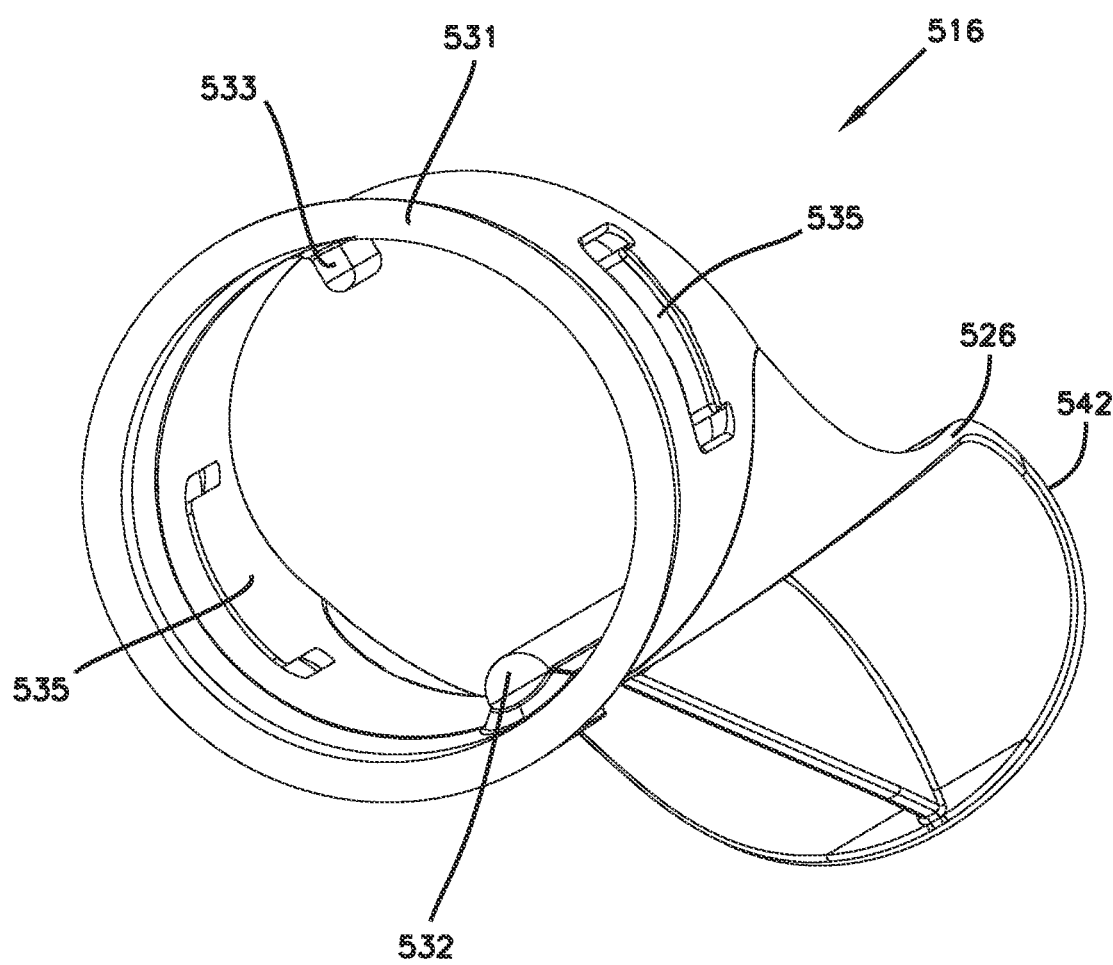
FIG. 49 illustrates a perspective view of a first alignment element of the faucet of FIG. 40.

FIG. 49 shows a perspective view of the first alignment element 516. As shown, the first alignment element 516 includes the ring 531, where the projection 532 extends radially inward therefrom. The first alignment element 516 also includes the tongue 526 with a ramped portion 542 that extends generally in an axial direction away from the ring 531. The tongue 526 is configured to at least partially guide a water hose attached to the spray head 504. In some examples, the first alignment element 516 includes an auxiliary alignment projection 533 extending radially inward from the ring 531 to aid in aligning the spray head 504. In further examples, first alignment element 516 includes at least one fastener 535 to position the first alignment element 516 behind the first retention element 517 within the faucet body 502. In the depicted example, the fastener 535 is a pair of clips.

Figure 50:
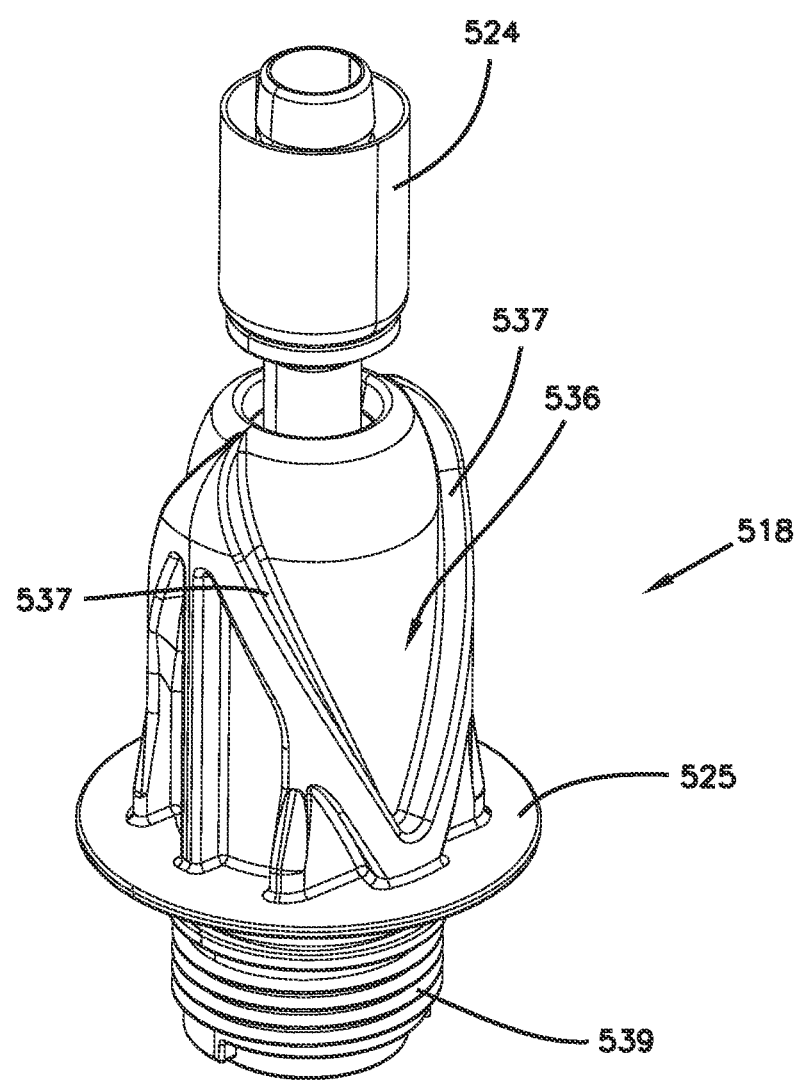
FIG. 50 illustrates a perspective view of the second alignment element and a water hose fitting of the faucet of FIG. 40.

FIG. 50 shows a perspective view of the second alignment element 518. The second alignment element 518 is generally cylindrical. As noted above, the second alignment element 518 is substantially similar to the alignment elements described above. The second alignment element 518 includes an alignment feature that includes at least one tapered groove 536 positioned at the periphery of the second alignment element 518. In some examples, the second alignment element 518 includes a pair of grooves 536, on opposite sides (i.e. separated by approximately 180 degrees) at the periphery of the second alignment element 518. Depending on the desired amount of, and position of, aligned positions, it is considered within the scope of the present disclosure that a variety of different numbers of grooves separated by a variety of different separations can be used.

The groove 536 is v-shaped and configured to interface with and contact the projection 532 of the first alignment element 516 to move the spray head 504 toward a narrower portion of the groove 536 so that the spray head 504 is moved to the aligned position during docking. When the spray head 504 is decoupled and spaced away from faucet body 502, the groove 536 and the projection 532 are not in contact with one another. The groove 536 has walls 537 that extend toward one another in a generally axial direction that guide the projection 532. In some examples, the second alignment element 518 includes threads 539 to be mated with the spray head 504. In some examples, the flange 525 is positioned on the second alignment element 518 between the groove 536 and the threads 539.

Figure 51:
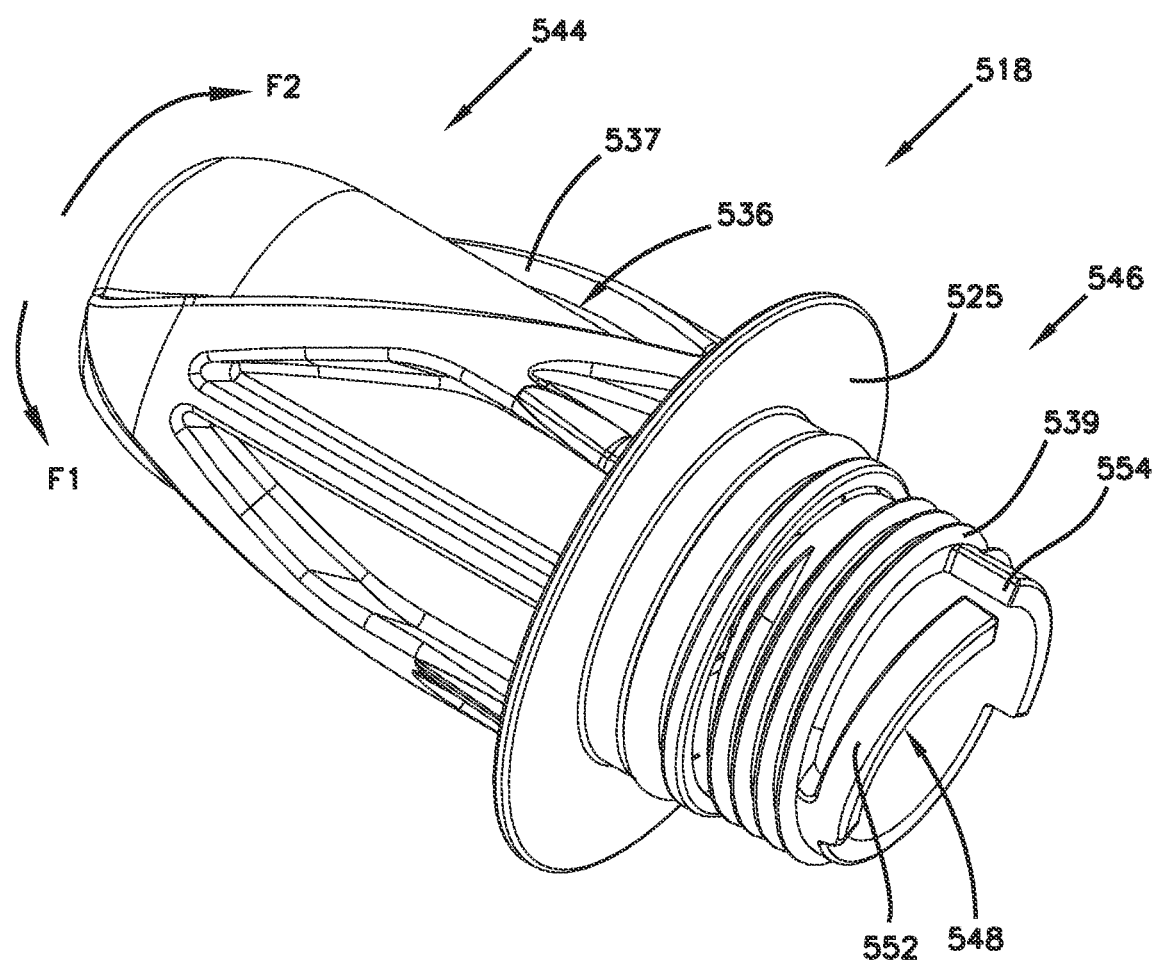
FIG. 51 illustrates another perspective view of the second alignment element of the faucet of FIG. 40.
Figure 52:
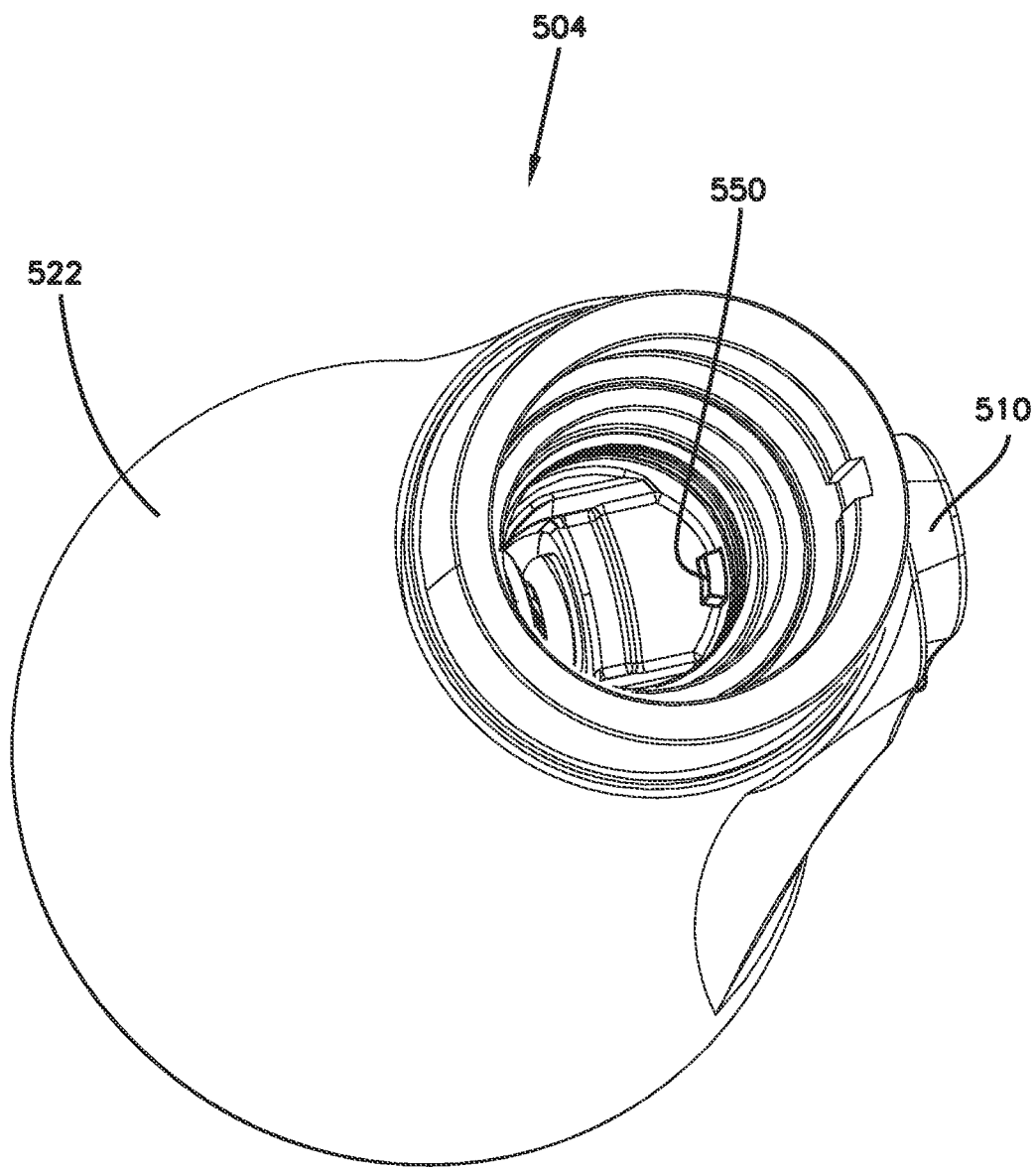
FIG. 52 illustrates a perspective view of the spray head and a spray head alignment stop of the faucet of FIG. 40.

FIG. 51 show another perspective view of the second alignment element 518. The second alignment element 518 includes a first end 544 and a second end 546. The first end 544 is configured to interface with the first alignment element 516 and the second end 546 is configured to be mated with a portion of the faucet spray head 504. The second end 546 is shown to include at least one alignment stop 548 configured to mate with a corresponding spray head alignment stop 550 of the faucet spray head 504, shown in FIG. 52. The alignment stops 548, 550 operate substantially similar to the alignment elements described above. The alignment stops 548, 550 aid in proper assembly of second alignment element 518 and spray head 504 and the alignment stops 548, 550 further aid in reducing the opportunity of the second alignment element 518 from being removed, e.g. unthreaded, from the spray head 504.

The alignment stop 548 and the spray head alignment stop 550 include at least one projection. In some examples, as shown in FIG. 51, the alignment stop 548 can be one of a projection and a recess. In the depicted example, the second end 546 of the second alignment element 518 includes more than one alignment stop. In some examples, the spray head alignment stop 550 can be the other of the projection and recess from the alignment stop 548 of the second alignment element 518.

The alignment stop 548 includes a spring-loaded tab 552 and a rotational stop 554 that are configured to reduce relative axial rotation of the second alignment element 516 in a first direction F1 and an opposite second direction F2 between the second alignment element 518 and the faucet spray head 504. When mating together, the spring-loaded tab 552 flexes over spray head alignment stop 550 and the rotational stop 554 engages the opposite side of the spray head alignment stop 550 to reduce relative rotation between the spray head 504 and the second alignment element 518. Because of this, when the second alignment element 518 is aligned properly with the spray head 504, the second alignment element 518 works with the first alignment element 516 to consistently properly align the spray head 504 with the faucet body 502.

Examples of the disclosure are reflected in the below-listing of examples, as well as the claims included herein.

In Example 1, a faucet includes a faucet body including a first alignment element located at an outlet within the faucet body and a faucet spray head being positionable at the outlet of the faucet body. The faucet spray head includes a second alignment element, the faucet spray head having an aligned position and a plurality of misaligned positions with respect to the faucet body. The first and second alignment elements form an alignment coupling, the alignment coupling including a projection and a tapered groove, wherein at least one is movable with respect to the other, and wherein, when the projection is positioned at a narrowest portion of the tapered groove, the faucet spray head is in the aligned position.

In Example 2, the faucet of Example 1 is modified in that the projection is configured to interface with walls of the tapered groove to align the faucet spray head.

In Example 3, the faucet of Example 1 is modified in that the first alignment element includes a ring and a tongue, the tongue extending in an axial direction from the ring, wherein the ring includes the projection extending radially inward therefrom within the outlet of the faucet body.

In Example 4, the faucet of Example 1 is modified in that the first alignment element includes a tongue surface, wherein the tongue surface extends within the faucet body from the outlet of the faucet body, and wherein the tongue surface is raised above a lower surface of the faucet body.

In Example 5, the faucet of Example 1 is modified in that the second alignment element is generally cylindrical, and the tapered groove has walls that extend toward one another in a generally axial direction on an outer surface of the second alignment element to form a v-shaped groove.

In Example 6, the faucet of Example 1 is modified in that the alignment coupling includes at least one centering element, wherein the at least one centering element is configured to center the faucet spray head within the outlet of the faucet body.

In Example 7, the faucet of Example 1 is modified in that the at least one centering element is a plurality of centering elements positioned at a periphery of the second alignment element.

In Example 8, the faucet of Example 1 is modified in that the faucet body includes an arcuate neck that includes the outlet, wherein an arcuate side profile is created when the faucet spray head is in the aligned position, and wherein the arcuate side profile is interrupted when the faucet spray head is in the plurality of misaligned positions.

In Example 9, the faucet of Example 1 is modified in that the alignment coupling is coupled when the first and second alignment elements are in contact with each other, and wherein the alignment coupling is decoupled when the first and second alignment elements are not in contact with each other, wherein when decoupled, the faucet spray head is spaced away from the outlet of the faucet body.

In Example 10, the faucet of Example 1 is modified to further include a water hose connected to the faucet spray head, wherein the second alignment element is secured around the water hose, wherein the water hose includes a pullback feature in communication therewith, and wherein the pullback feature pulls the faucet spray head toward the outlet of the faucet body.

In Example 11, the faucet of Example 10 is modified in that the pullback feature is a weight attached to the water hose.

In Example 12, the faucet of Example 1 is modified in that the alignment coupling is integral with the faucet body and faucet spray head.

In Example 13, the faucet of Example 1 is modified in that the alignment coupling is mounted to the faucet body and faucet spray head.

In Example 14, a faucet includes a faucet body; a faucet spray head movable with respect to the faucet body; a first alignment element mounted within the faucet body, the first alignment element having a first alignment feature, the first alignment feature including one of a projection and a tapered groove; and a second alignment element mounted to the faucet spray head, the second alignment element having a second alignment feature, the second alignment feature including the other of the projection and tapered groove. The projection is configured to interface with walls of the tapered groove to align the faucet spray head.

In Example 15, the faucet of Example 14 is modified in that the first alignment element includes a ring and a tongue, the tongue extending in an axial direction from the ring, wherein the ring includes the projection extending radially inward therefrom.

In Example 16, the faucet of Example 14 is modified in that the first alignment element includes a tongue surface, wherein the tongue surface extends within the faucet body from the outlet of the faucet body, and wherein the tongue surface is raised above a lower surface of the faucet body.

In Example 17, the faucet of Example 14 is modified in that the second alignment element is generally cylindrical, and the tapered groove has walls that extend toward one another in a generally axial direction on an outer surface of the second alignment element to form a v-shaped groove.

In Example 18, the faucet of Example 14 is modified in that the second alignment element includes a plurality of centering elements, wherein the plurality of centering elements is configured to center the faucet spray head within the outlet of the faucet body, and wherein the plurality of centering elements is positioned at a periphery of the second alignment element.

In Example 19, an alignment coupling for a faucet includes a first alignment element positionable within a faucet body, the first alignment element having a first alignment feature, the first alignment feature including one of a projection and a tapered groove, and a second alignment element being movable with respect to the first alignment element, the second alignment element having a second alignment feature, the second alignment feature including the other of the projection and tapered groove. The tapered groove includes walls that extend toward each other, and the walls guide the projection to a narrowest portion of the tapered groove.

In Example 20, the alignment coupling of Example 19 is modified in that the first alignment element includes a ring and a tongue, the tongue extending in an axial direction from the ring, wherein the ring includes the projection extending radially inward therefrom.

In Example 21, the alignment coupling of Example 20 is modified in that the first alignment element includes a faucet body alignment portion being at least one of a projection and a recess, wherein the faucet body alignment portion is engagable with a corresponding projection and recess of the faucet body to align the first alignment element within the faucet body.

In Example 22, the alignment coupling of Example 19 is modified in that the first alignment element is positionable at an outlet of the faucet body.

In Example 23, the alignment coupling of Example 19 is modified in that the second alignment element is generally cylindrical, and the tapered groove has walls that extend toward one another in a generally axial direction on an outer surface of the second alignment element to form a v-shaped groove.

In Example 24, the alignment coupling of Example 19 is modified in that the second alignment element is positionable adjacent the spray head.

In Example 25, the alignment coupling of Example 19 is modified in that the second alignment element is connected to the spray head.

In Example 26, the alignment coupling of Example 25 is modified in that the second alignment element is generally cylindrical and includes a first end and a second end. The first end is configured to interface with the first alignment element and the second end is configured to be mated with a portion of the spray head. The second end has at least one alignment stop configured to mate with a spray head alignment stop of the spray head to prevent rotation in a first direction between the spray head and the second alignment element, and the at least one alignment stop and the spray head alignment stop include at least one projection.

In Example 27, the alignment coupling of Example 26 is modified in that when the at least one alignment stop and the spray head alignment stop are mated with one another, and when the projection of the first alignment feature is positioned within the narrowest portion of the tapered groove, the spray head and faucet body are in an aligned position, wherein the faucet body includes an arcuate neck, and wherein an arcuate side profile is created when the spray head is in the aligned position with the faucet body.

In Example 28, the alignment coupling of Example 26 is modified in that the spray head includes a valve component having an attachment portion that is configured to be connected to the second end of the second alignment element, wherein the spray head alignment stop is positioned adjacent the attachment portion.

In Example 29, the alignment coupling of Example 28 is modified in that the attachment portion includes threads thereon configured to be received within the second end of the second alignment element to allow for a threaded attachment between the spray head and the second alignment element.

In Example 30, the alignment coupling of Example 26 is modified in that the spray head alignment stop is disposed on a valve component of a valve of the spray head, wherein the valve is controlled via a user input positioned on the spray head.

In Example 31, a fluid dispensing device includes a body; a spray head movable with respect to the body; a water hose being positioned within the body and connected to the spray head at a fitting, the fitting have a spherical portion positioned within the spray head; and a seal assembly positioned within the spray head and positioned at least partially around the spherical portion of the fitting. The seal assembly includes a holder defining an interior seal chamber, the interior seal chamber having a first end and a second end; a first seal positioned around the spherical portion of the fitting; a second seal having an opening positioned around the spherical portion of the fitting; a seal holder positioned between the first and second seals, the seal holder and second seal being interlocked to reduce relative rotation between the second seal and the seal holder; and a spring positioned within the interior seal chamber, wherein the spring is positioned between the first end of the seal chamber and the second seal.

In Example 32, the fluid dispensing device of Example 31 is modified to further include a further include a spring cage positioned within the interior seal chamber, the spring cage having a second seal flange and a flow portion, wherein the second seal flange contacts the second seal and the spring, and the flow portion being surrounded by the spring, wherein the flow portion has a perforated construction.

In Example 33, the fluid dispensing device of Example 32 is modified in that the flow portion of the spring cage is cylindrical.

In Example 34, the fluid dispensing device of Example 31 is modified in that the seal holder and the second seal interlock with a plurality of projections and recesses.

In Example 35, the fluid dispensing device of Example 31 is modified in that the holder, first seal, second seal, and seal holder are positioned within a main body recess of the spray head.

In Example 36, the fluid dispensing device of Example 31 is modified in that the first seal, second seal, and seal holder are not positioned within the interior seal chamber.

In Example 37, the fluid dispensing device of Example 31 is modified in that the second seal is compressible around an end portion of the spherical portion of the fitting.

In Example 38, the fluid dispensing device of Example 37 is modified in that the second seal is compressible at a side facing the interior seal chamber.

In Example 39, the fluid dispensing device of Example 37 is modified in that the second seal is compressible by water pressure.

In Example 40, a fluid dispensing device includes a body; a spray head movable with respect to the body; a water hose being positioned within the body and connected to the spray head at a fitting, the fitting have a spherical portion positioned within the spray head; and a seal assembly positioned within the spray head and positioned at least partially around the spherical portion of the fitting, wherein the seal assembly automatically increases a sealing force around the fitting when the spray head dispenses water.

In Example 41, the fluid dispensing device of Example 40 is further modified in that the seal assembly includes: a holder defining an interior seal chamber, the interior seal chamber having a first end and second end; a first seal positioned around the spherical portion of the fitting; a second seal having an opening positioned around the spherical portion of the fitting; a seal holder positioned between the first and second seals, the seal holder and second seal being interlocked to reduce relative rotation between the second seal and the seal holder; and a spring positioned within the interior seal chamber, wherein the spring is positioned between the first end of the interior seal chamber and the second seal.

In Example 42, a method of operating a fluid dispensing device includes providing a body and a spray head movable with respect to the body; providing a water hose being positioned within the body and connected to the spray head at a fitting, the fitting have a spherical portion positioned within the spray head; providing a seal assembly positioned within the spray head and positioned at least partially around the spherical portion of the fitting; automatically increasing a sealing force around the fitting using the seal assembly when the spray head dispenses water; and automatically decreasing a sealing force around the fitting using the seal assembly when the spray head does not dispense water.

In Example 43, a faucet includes a faucet body and a faucet spray head being movable from a retracted position adjacent the faucet body and an extended position away from the faucet body. In the retracted position, the faucet spray head has an aligned position with the faucet body. The faucet includes an alignment coupling. The alignment coupling includes a first alignment element connected to the faucet body and a second alignment element connected to the faucet spray head. The alignment coupling includes a projection and a tapered groove. At least one of the projection or the tapered groove is movable with respect to the other, and the tapered groove guides the projection to a narrowed portion of the tapered groove to guide the faucet spray head to the aligned position. The faucet includes a retention coupling that is configured to retain the faucet body and the faucet spray head immediately adjacent one another. The retention coupling includes a first retention element connected to the faucet body and a second retention element connected to the faucet spray head. The retention coupling is separate from the alignment coupling, and at least one of the first or second retention elements is a magnet.

In Example 44, the faucet of Example 43 is modified in that the second alignment element at least partially secures the second retention element in the faucet spray head.

In Example 45, the faucet of Example 43 is modified in that the first retention element at least partially secures the first alignment element in the faucet body.

In Example 46, the faucet of Example 43 is modified in that the second retention element in the faucet spray head is a magnet.

In Example 47, the faucet of Example 43 is modified in that the first alignment element includes a ring and a tongue, the tongue extending in an axial direction from the ring at least partially within the faucet body from an outlet of the faucet body, wherein the ring includes the projection extending radially inward therefrom within the outlet of the faucet body, wherein the second alignment element is generally cylindrical, and wherein the tapered groove has walls that extend toward one another in a generally axial direction on an outer surface of the second alignment element to form a v-shaped groove.

In Example 48, the faucet of Example 43 is modified in that the first retention element is a stainless steel ring welded into the faucet body.

In Example 49, the faucet of Example 43 is modified in that the magnet is a coated neodymium magnet.

In Example 50, the faucet of Example 48 is modified in that the magnet is held in place in the faucet spray head by epoxy.

In Example 51, the faucet of Example 48 is modified in that the magnet is positioned at least partially between the second alignment element and a bumper.

In Example 52, the faucet of Example 43 is modified in that the magnet is positioned at least partially within the faucet spray head between the second alignment element and a positioning ring.

In Example 53, the faucet of Example 52 is modified to further include a bumper positioned between the magnet and the positioning ring.

In Example 54, the faucet of Example 43 is modified in that the alignment coupling is coupled when the first and second alignment elements are in contact with each other, and wherein the alignment coupling is decoupled when the first and second alignment elements are not in contact with each other, wherein when decoupled, the faucet spray head is spaced away from an outlet of the faucet body.

In Example 55, the faucet of Example 43 is modified to further include a water hose connected to the faucet spray head, wherein the second alignment element and second retention element are positioned around the water hose.

In Example 56, the faucet of Example 43 is modified in that the second alignment element is generally cylindrical and includes a first end and a second end, wherein the first end is configured to interface with the first alignment element and the second end is configured to be mated with a portion of the faucet spray head, the second end having at least one alignment stop configured to mate with a spray head alignment stop of the faucet spray head to reduce rotation in a first direction between the faucet spray head and the second alignment element, and wherein the at least one alignment stop and the spray head alignment stop include at least one projection.

In Example 57, the faucet of Example 56 is modified in that the at least one alignment stop includes a spring-loaded tab that is configured to contact the spray head alignment stop.

In Example 58, the faucet of Example 57 is modified in that the at least one alignment stop includes a rotational stop, wherein the spring-loaded tab and the rotational stop are configured to reduce relative rotation in the first direction and a second direction between the second alignment element and the faucet spray head.

In Example 59, the faucet of Example 43 is modified in that the faucet spray head has a plurality of misaligned positions with respect to the faucet body.

In Example 60, the faucet of Example 43 is modified in that the first alignment element is positioned at least partially between an outlet of the faucet body and an apex of an arcuate neck of the faucet body.

In Example 61, the faucet of Example 43 is modified in that the first retention element is positioned adjacent an outlet of the faucet body.

In Example 62, a faucet includes a faucet body having an outlet and a hose positioned within the faucet body and passing through the outlet. The hose is movable within the faucet body. The faucet includes a faucet spray head being connected to the hose and movable between an extended position and a retracted position. When in the extended position, the spray head is spaced away from the outlet of the faucet body, and, when in the retracted position, the spray head is positioned immediately adjacent the outlet. The faucet includes an alignment coupling that includes a first alignment element connected to the faucet body; and a second alignment element connected to the faucet spray head. The alignment coupling aligns the faucet spray head with the faucet body. The faucet includes a retention coupling that is configured to retain the faucet body and the faucet spray head immediately adjacent one another. The retention coupling includes a first retention element connected to the faucet body, adjacent the first alignment element and a second retention element positioned in the faucet spray head by, at least partially, the second alignment element. At least one of the first or second retention elements is a magnet.

In Example 62, the faucet of Example 61 is modified in that the second alignment element is generally cylindrical and includes a first end and a second end, wherein the first end is configured to interface with the first alignment element and the second end is configured to be mated with a portion of the faucet spray head, the second end having at least one alignment stop configured to mate with a spray head alignment stop of the faucet spray head, wherein the at least one alignment stop and the spray head alignment stop include at least one projection, and wherein the at least one alignment stop includes a spring-loaded tab and a rotational stop that are configured to reduce relative rotation in a first direction and a second direction between the second alignment element and the faucet spray head.

In Example 63, a faucet includes a faucet body and a faucet spray head being positionable at, and separable from, an outlet of the faucet body. The faucet spray head has an aligned position with the faucet body. The faucet includes a retention coupling configured to retain the faucet body and the faucet spray head immediately adjacent one another. The retention coupling includes a first retention element connected to the outlet of the faucet body. The first retention element includes a securing feature configured to aid in reducing relative movement between the first retention element and the outlet. The retention coupling includes a second retention element positioned within the faucet spray head by way of a flange. When the faucet body and the faucet spray head are immediately adjacent one another, the flange is positioned between the first retention element and the second retention element. At least one of the first or second retention elements is a magnet.

In Example 64, the faucet of Example 63 is modified to further include an alignment coupling, the alignment coupling comprising: a first alignment element connected to the faucet body and a second alignment element connected to the faucet spray head, wherein the alignment coupling includes a projection and a tapered groove, wherein at least one of the projection or the tapered groove is movable with respect to the other, and wherein the tapered groove guides the projection to a narrowed portion of the tapered groove to guide the faucet spray head to the aligned position.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A faucet comprising:
    a faucet body;
    a faucet spray head being movable from a retracted position adjacent the faucet body, and an extended position away from the faucet body, wherein in the retracted position the faucet spray head has at least one aligned position with the faucet body;
    a water hose slidably disposed at least partially within the faucet body;
    a water hose fitting coupled to one end of the water hose, the water hose fitting including a spherical portion;
    an alignment coupling including:
        a first alignment element connected to the faucet body; and
        a second alignment element having a first end coupled to the spherical portion and an opposite second end coupled to the faucet spray head, wherein a seal assembly is disposed within the first end and engages with the spherical portion such that a ball-joint connection is formed between the water hose fitting and the second alignment element, and wherein the seal assembly includes a spring cage and a spring, the spring providing a biasing force against the spherical portion of the water hose fitting;

wherein the alignment coupling includes a projection and a tapered groove, wherein at least one of the projection or the tapered groove is movable with respect to the other, and wherein the tapered groove guides the projection to a narrowed portion of the tapered groove to guide the faucet spray head to the at least one aligned position; and a retention coupling configured to retain the faucet body and the faucet spray head immediately adjacent one another, the retention coupling including:
 a first retention element connected to the faucet body; and
 a second retention element connected to the faucet spray head, wherein the second retention element is a magnet, wherein the retention coupling is separate from the alignment coupling.

2. The faucet of claim 1, wherein the seal assembly further includes at least one seal supported on the spring cage.

3. The faucet of claim 1, wherein the seal assembly further includes a holder threaded into a main inner cavity of the second alignment element.

4. The faucet of claim 1, wherein the first alignment element includes a ring having the projection extending radially inward therefrom within an outlet of the faucet body and the first retention element is positioned around the ring of the first alignment element.

5. The faucet of claim 1, wherein the tapered groove is positioned on the second alignment element, and wherein the projection extends away from an inner wall of the faucet body.

6. The faucet of claim 1, wherein the second alignment element at least partially secures the second retention element in the faucet spray head.

7. The faucet of claim 1, wherein the first retention element at least partially secures the first alignment element in the faucet body.

8. The faucet of claim 1, wherein the alignment coupling is coupled when the first alignment element and the second alignment element are in contact with each other, and wherein the alignment coupling is decoupled when the first alignment element and the second alignment element are not in contact with each other, wherein when decoupled, the faucet spray head is spaced away from an outlet of the faucet body.

9. The faucet of claim 1, wherein the second alignment element and the second retention element are positioned around the water hose.

10. The faucet of claim 1, wherein the first end of the second alignment element is configured to interface with the first alignment element and the second end of the second alignment has at least one alignment stop configured to mate with a spray head alignment stop of the faucet spray head to reduce rotation in a first direction between the faucet spray head and the second alignment element, and wherein the at least one alignment stop and the spray head alignment stop include at least one projection.

11. The faucet of claim 10, wherein the at least one alignment stop includes a spring-loaded tab that is configured to contact the spray head alignment stop.

12. The faucet of claim 11, wherein the at least one alignment stop includes a rotational stop, wherein the spring-loaded tab and the rotational stop are configured to reduce relative rotation in the first direction and a second direction between the second alignment element and the faucet spray head.

13. The faucet of claim 1, wherein the second alignment element includes a flange, the flange covering the second retention element within the faucet spray head.

14. The faucet of claim 13, wherein the flange is at least partially exposed on the faucet spray head.

15. The faucet of claim 1, wherein the retention coupling further includes a cushioning bumper in the faucet spray head immediately adjacent the second retention element.

16. A faucet comprising:
 a faucet body;
 a faucet spray head being movable from a retracted position adjacent the faucet body, and an extended position away from the faucet body, wherein in the retracted position the faucet spray head has at least one aligned position with the faucet body;
 a water hose slidably disposed at least partially within the faucet body;
 a water hose fitting coupled to one end of the water hose, the water hose fitting including a spherical portion; and
 an alignment coupling including:
  a first alignment element connected to the faucet body; and
  a second alignment element having a first end coupled to the spherical portion and an opposite second end coupled to the faucet spray head, wherein a seal assembly is disposed within the first end and engages with the spherical portion such that a ball-joint connection is formed between the water hose fitting and the second alignment element, and wherein the seal assembly includes a spring, the spring providing a biasing force against the spherical portion of the water hose fitting;
 wherein the alignment coupling includes a projection and a tapered groove,
 wherein at least one of the projection or the tapered groove is movable with respect to the other, and wherein the tapered groove guides the projection to a narrowed portion of the tapered groove to guide the faucet spray head to the at least one aligned position.

17. The faucet of claim 16, further comprising a retention coupling configured to retain the faucet body and the faucet spray head immediately adjacent one another, the retention coupling including:
 a first retention element connected to the faucet body; and
 a second retention element connected to the faucet spray head, wherein the second retention element is a magnet.

18. The faucet of claim 16, wherein the first alignment element includes a ring positioned immediately adjacent an outlet of the faucet body, wherein the ring includes a projection extending radially inward therefrom within the outlet of the faucet body.

19. The faucet of claim 16, wherein the seal assembly further includes a spring cage.

20. A faucet comprising:
 a faucet body;
 a faucet spray head being movable from a retracted position adjacent the faucet body, and an extended position away from the faucet body, wherein in the retracted position the faucet spray head has at least one aligned position with the faucet body;
 a water hose slidably disposed at least partially within the faucet body;
 a water hose fitting coupled to one end of the water hose, the water hose fitting including a spherical portion; and
 an alignment coupling including:
  a first alignment element connected to the faucet body; and a second alignment element having a first end coupled to the spherical portion and an opposite second end coupled to the faucet spray head, wherein a seal assembly is disposed within the first end and engages with the spherical portion such that a ball-joint connection is formed between the water hose fitting and the second alignment element, and wherein the seal assembly includes a spring cage and a spring, the spring providing a biasing force against the spherical portion of the water hose fitting;

wherein the alignment coupling includes a projection and a tapered groove, wherein at least one of the projection or the tapered groove is movable with respect to the other, and wherein the tapered groove guides the projection to a narrowed portion of the tapered groove to guide the faucet spray head to the at least one aligned position.

* * * * *